WINDER

Filed Dec. 20, 1960 42 Sheets-Sheet 1

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 2

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 3

INVENTOR.
WAYNE C. TROST
BY
Carlson, Pitzner, Hubbard & Wolfe
ATTORNEYS

WINDER

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 5

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 6

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 7

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 8

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

WINDER

Filed Dec. 20, 1960 42 Sheets-Sheet 10

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 11

INVENTOR.
WAYNE C. TROST
BY
Olson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 14

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 15

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

WINDER

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 21

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 24

INVENTOR.

WAYNE C. TROST

BY

Coulson, Pitzner, Hubbard & Wolfe,

ATTORNEYS

Jan. 16, 1962 W. C. TROST 3,017,129

WINDER

Filed Dec. 20, 1960 42 Sheets-Sheet 25

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolf
ATTORNEYS

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 29

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 34

INVENTOR.
WAYNE C. TROST
BY
Carlson, Pitzner, Hubbard & Wolfe
ATTORNEYS

Jan. 16, 1962 W. C. TROST 3,017,129

WINDER

Filed Dec. 20, 1960 42 Sheets-Sheet 35

INVENTOR.

Wayne C. Trost

BY

Wolfe, Hubbard, Voit & Osann

ATTORNEYS

INVENTOR.
Wayne C. Trost
BY
Wolfe, Hubbard, Voit & Osann
ATTORNEYS

Jan. 16, 1962 W. C. TROST 3,017,129

WINDER

Filed Dec. 20, 1960 42 Sheets-Sheet 37

INVENTOR.
Wayne C. Trost
BY
Wolfe, Hubbard, Voit & Osann
ATTORNEYS

Jan. 16, 1962 W. C. TROST 3,017,129

WINDER

Filed Dec. 20, 1960 42 Sheets-Sheet 38

INVENTOR.
Wayne C. Trost
BY
Wolfe, Hubbard, Voit & Osann
ATTORNEYS

INVENTOR.
Wayne C. Trost
BY
Wolfe, Hubbard, Voit & Osann
ATTORNEYS

Jan. 16, 1962 W. C. TROST 3,017,129

WINDER

Filed Dec. 20, 1960 42 Sheets-Sheet 40

INVENTOR.
Wayne C. Trost
BY
Wolf, Hubbard, Voit & Osann
ATTORNEYS

INVENTOR.
Wayne C. Trost
BY
Wolfe, Hubbard, Voit & Osann
ATTORNEYS

INVENTOR.
Wayne C. Trost
BY
Wolfe, Hubbard, Voit & Osann
ATTORNEYS

United States Patent Office 3,017,129

Patented Jan. 16, 1962

3,017,129

WINDER

Wayne C. Trost, Rockford, Ill., assignor to Barber-Colman Company, Rockford, Ill., a corporation of Illinois Filed Dec. 20, 1960, Ser. No. 77,244
51 Claims. (Cl. 242—35.6)

This invention relates to the winding of thread from a plurality of relatively small supply masses or bobbins to form a larger mass or package which may be tapered or cylindrical and is hereafter referred to as a "cheese." In certain of its aspects, the invention has more particular reference to a winder of the type shown in Colman Patent 1,611,890 for tying successive threads together and winding the same uninterruptedly until the cheese has attained a desired size.

In the patented winder, a thread pulled off from the active bobbin by the rotating cheese runs successively through a thread detector, a tension reducer controlling the point of thread breakage, a quick acting knotter, and finally through a device for maintaining a slack loop in the thread between the knotter and the cheese. When the running thread breaks or is exhausted, the slack loop is released and the knotter is actuated to tie the trailing thread end to the next reserve thread, the tying being effected before the slack of the loop is used up.

The general object of the present invention is to provide a continuous winder which, as compared to the patented or other prior machines, is capable of operating at higher speeds and more reliably through prolonged service use, which is more economical to manufacture, and which occupies substantially less floor space.

A second object is to arrange the various thread handling and guiding devices in a novel manner such as to permit the running thread to travel therethrough in a substantially straight path.

A third object is to hang up the reserve thread in a novel shape which facilitates its presentation to the knotter at the proper time.

A more detailed object is to achieve lateral compactness by arranging the thread detector, tension reducer, knotter, and slack loop former and the winding drum in compact vertically spaced relation along the axis around which the reserve bobbins are indexed and brought successively into active unwinding position.

A fifth object is to utilize the bobbin indexing motion in a novel way to produce or time the actuation of various elements of the winding machines.

A sixth object is to dispose the running thread and next adjacent reserve thread in a novel positional relation such as to condition these threads for tying a so-called weaver's knot immediately upon the detection of a thread break.

A seventh object is to support successive lengths of each reserve thread in angularly spaced relation around the index axis for advance to the knotter automatically in successive indexing motions of the bobbin magazine.

An eighth object is to provide a novel safety control for disabling the winder and preventing entanglement of the threads therein in the event of failure of the knotter and associated parts to properly unite the broken and reserve threads for continuance of the winding.

A ninth object is to facilitate starting of the winder by conditioning the various thread handling devices for normal automatic operation following manual tying of the next reserve thread to the cheese.

A tenth object is to dispose of the cut off end of the new running thread in a novel manner.

The invention also resides in the novel construction of the thread break detector and the tension reducer and the manner of resetting the same in relation to a new running thread.

Other objects and advantages of the invention will become apparent from the following detailed description taken in connection with the accompanying drawings, in which FIGURE 1 is a side elevational view of a winding machine embodying the novel features of the present invention, certain of the operating parts having been omitted.

*General construction and operation*

Figures 1, 2:
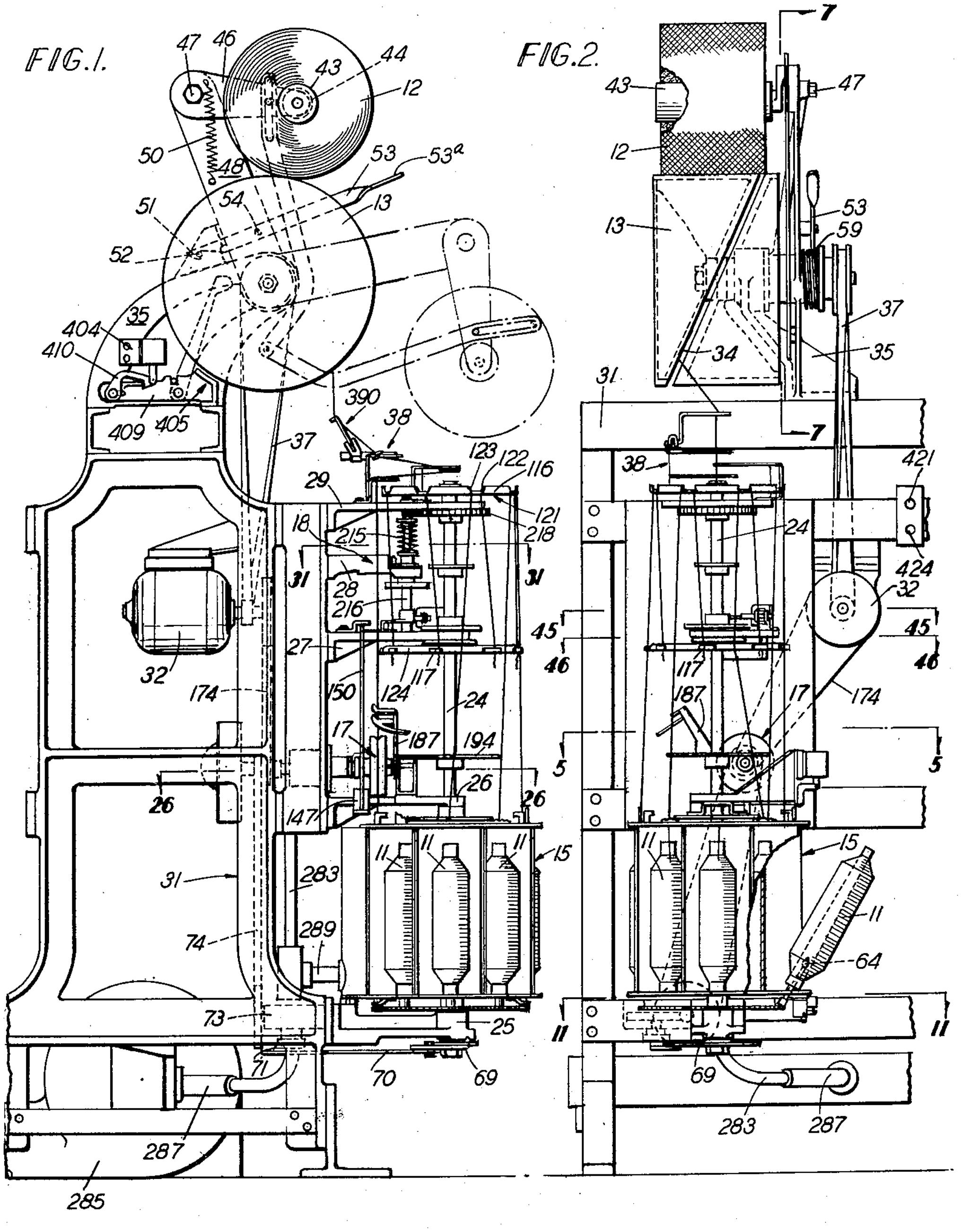
FIG. 2 is a front elevational view.

In the two forms selected for purposes of illustration, the winder is of the continuous type and operates on the same general principle as that shown in the Colman patent in drawing thread off from an active bobbin 10 (FIGS. 3 and 5) and successive reserve bobbins 11, tying the successive threads together, and winding the thread of the active bobbin onto a larger package or cheese 12, while the latter rests against a power rotated winding drum 13. The bobbins are disposed in outwardly opening pockets 14 of a magazine 15 adapted to be indexed step by step around an upright axis to bring the reserve bobbins successively into active winding position and hold the leading end of the next reserve thread in position for tying to the trailing end of a broken or exhausted thread.

Figures 3, 4:
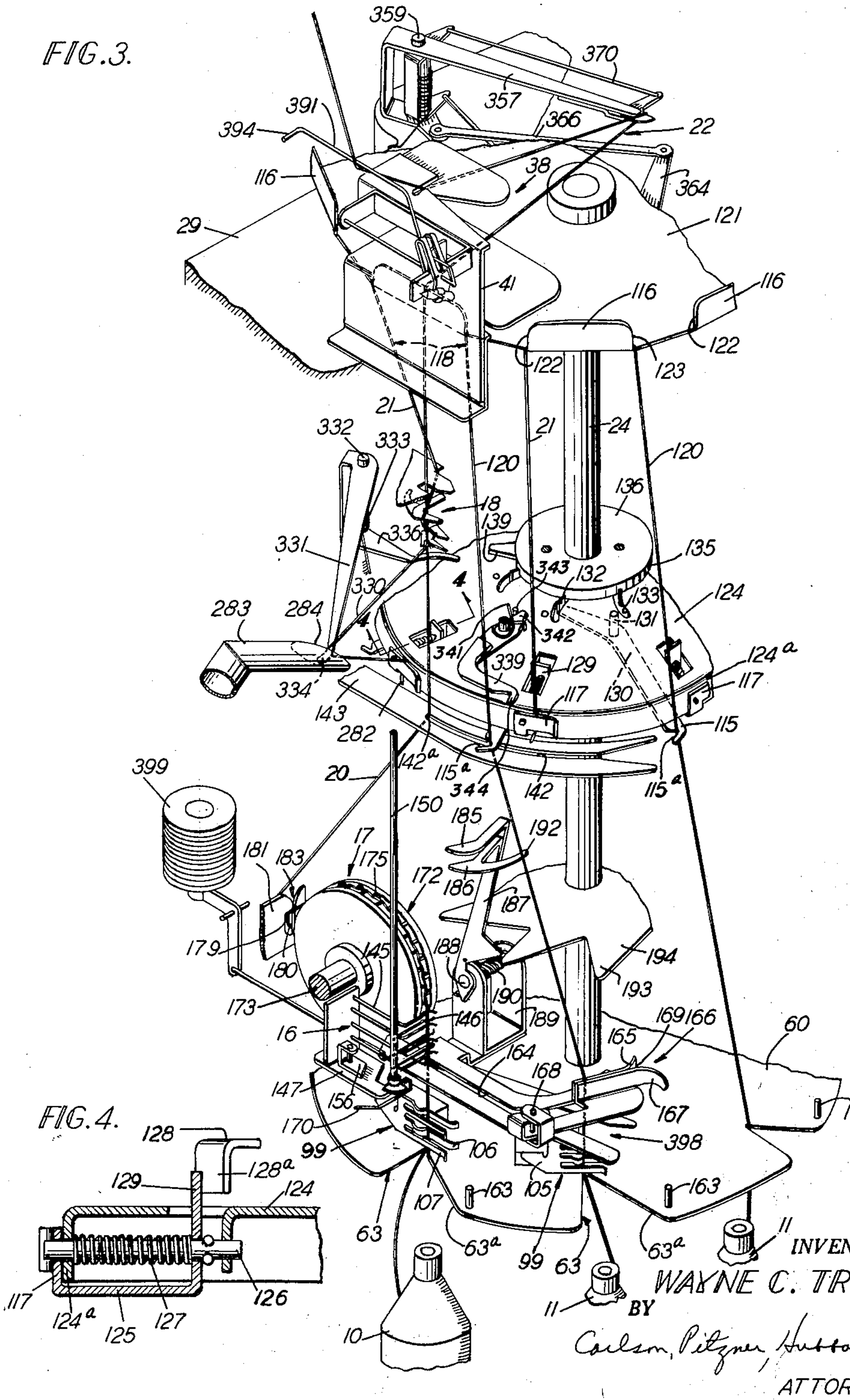
FIG. 3 is a fragmentary perspective view showing the principal parts.
FIG. 4 is a fragmentary section taken along the line 4—4 of FIG. 3.
Figure 19:
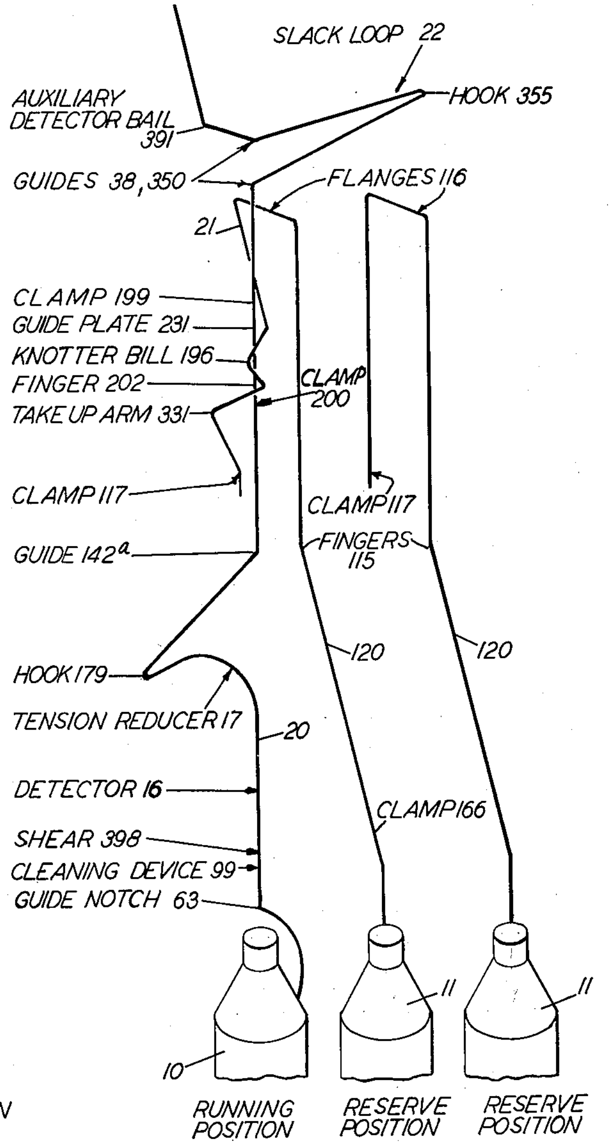
FIG. 19 is a diagrammatic view showing the shape and relation of the running thread and the first two reserve threads during normal operation.

In traveling from the active bobbin to the cheese as shown in FIGS. 3 and 19, the running thread 20 moves post a detecting device 16 (FIGS. 3, 5, 15 and 20) for sensing interruption of the thread and then passes through a rotary device 17 (FIGS. 3, 24, 25, 26, and 27), hereinafter referred to as the tension reducer, which forces the breaks in weakened portions of the thread to occur in the portion of the thread engaged by the detector 16 thus insuring that the breaks will occur in that region. At a point spaced beyond the tension reducer, the running thread passes a knotter 18 (FIGS. 2, 29, 32 and 37–42) by which the trailing end of a broken or exhausted thread may be tied to the leading end 21 of the next reserve bobbin. The knotted is actuated by a load and fire mechanism so that it acts instantaneously as soon as it is released by the thread detector 16. Between the knotter and the cheese, the running thread passes around the guide elements of a device for forming in the thread a loop 22 which when released produces enough slack to permit the winding to continue while the knotter is uniting the broken thread with the next reserve thread.

The elements thus generally identified operate in two cycles initiated simultaneously in response to the detection of a break in the running thread 20. In the tying cycle which is executed instantaneously the loop 22 and the knotter 18 are released, the slack thus provided by the loop permitting continuance of the winding while the trailing end is held in the knotter and being tied to the next reserve thread. The other or indexing cycle then continues; the reserve bobbin magazine is advanced one step during which the detector 16 is opened to receive the reserve thread which thus becomes the running thread 20; the next reserve thread end 21 is moved into operative association with the knotter; the new running thread 20 is laid into the tension reducer 17; and a new slack loop 22 is drawn in the new running thread.

Figure 62:
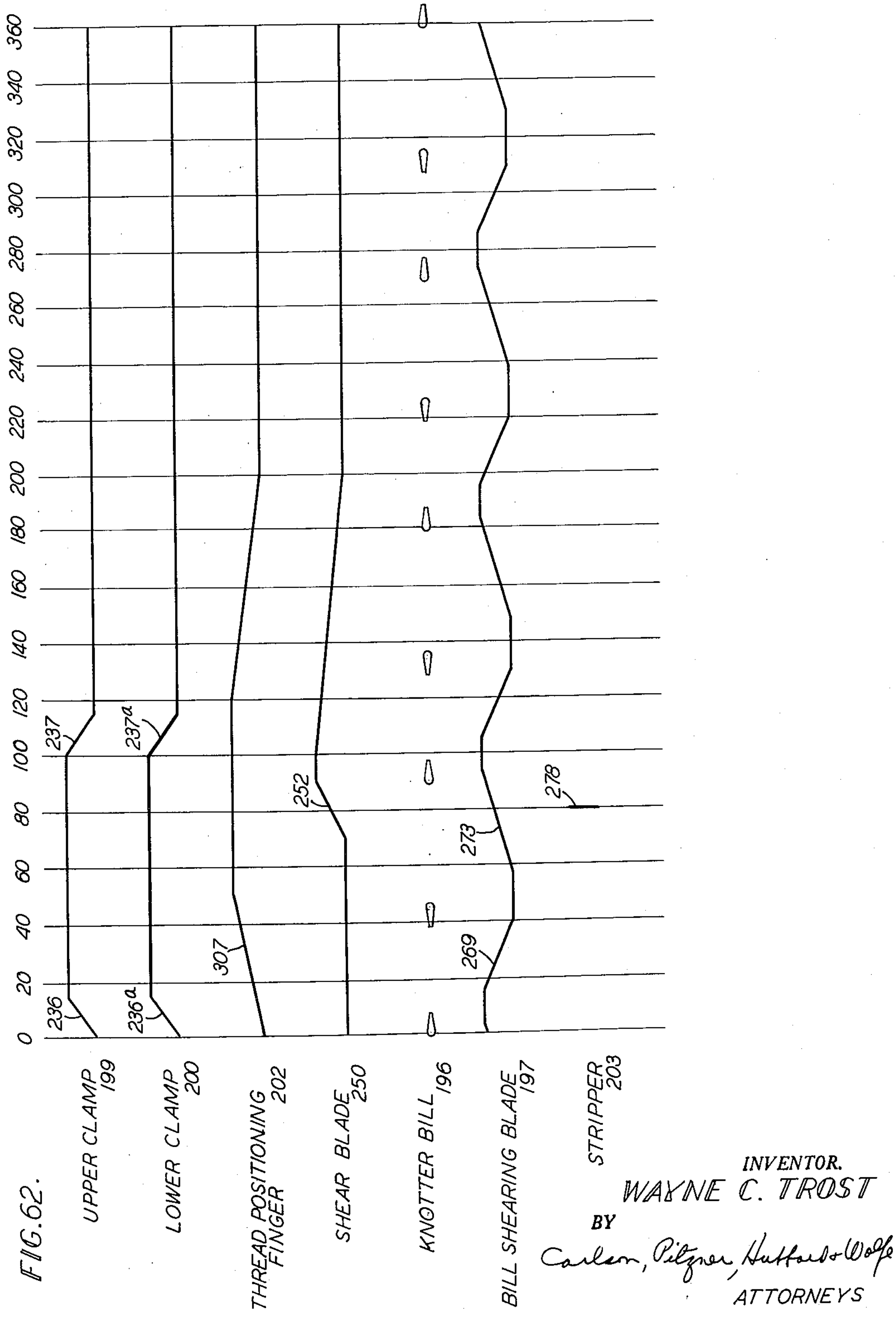
FIG. 62 is a time chart of the knotter cycle.

The primary aim of the present invention is to provide a winder of the above general character adapted for practical operation at greatly increased winding speed with the successive threads joined by knots 23 (FIGS. 42, 43) of minimum bulk as required in modern weaving. In the present winder, the operating speed is as high as 1200 yards a minute and the knotter operates in about .015 of a second (see chart FIG. 62) following a thread break to tie the broken thread to the next reserve thread by a so-called weaver's knot illustrated in FIG. 42. Firing of the knotter initiates a cycle for reconditioning the various parts for proper operation in response to the next thread break. This cycle charted in FIG. 63 involves indexing the bobbin magazine, rethreading the break detector and tension reducer, positioning the new running thread and the next reserve thread in the knotter, reloading the knotter actuator, and drawing a new slack loop 22. The indexing motion is executed in about one second and occupies ⅛ of a revolution of the bobbin magazine.

In carrying out its primary aim, the present invention contemplates a novel arrangement of the bobbin magazine, the detector, the tension reducer, the knotter, the slack loop former, and the cheese in vertically spaced relation so that the thread 20 runs past the knotter in a generally straight line (see FIG. 19) and the indexing of the bobbin magazine may be utilized to perform numerous thread handling and positioning functions incident to reconditioning the knotter for tying a knot in response to the next breakage or exhaustion of the running thread. Such vertical spacing of the main thread handling devices is also advantageous in minimizing the overall horizontal width of the winding machine.

Figure 6:
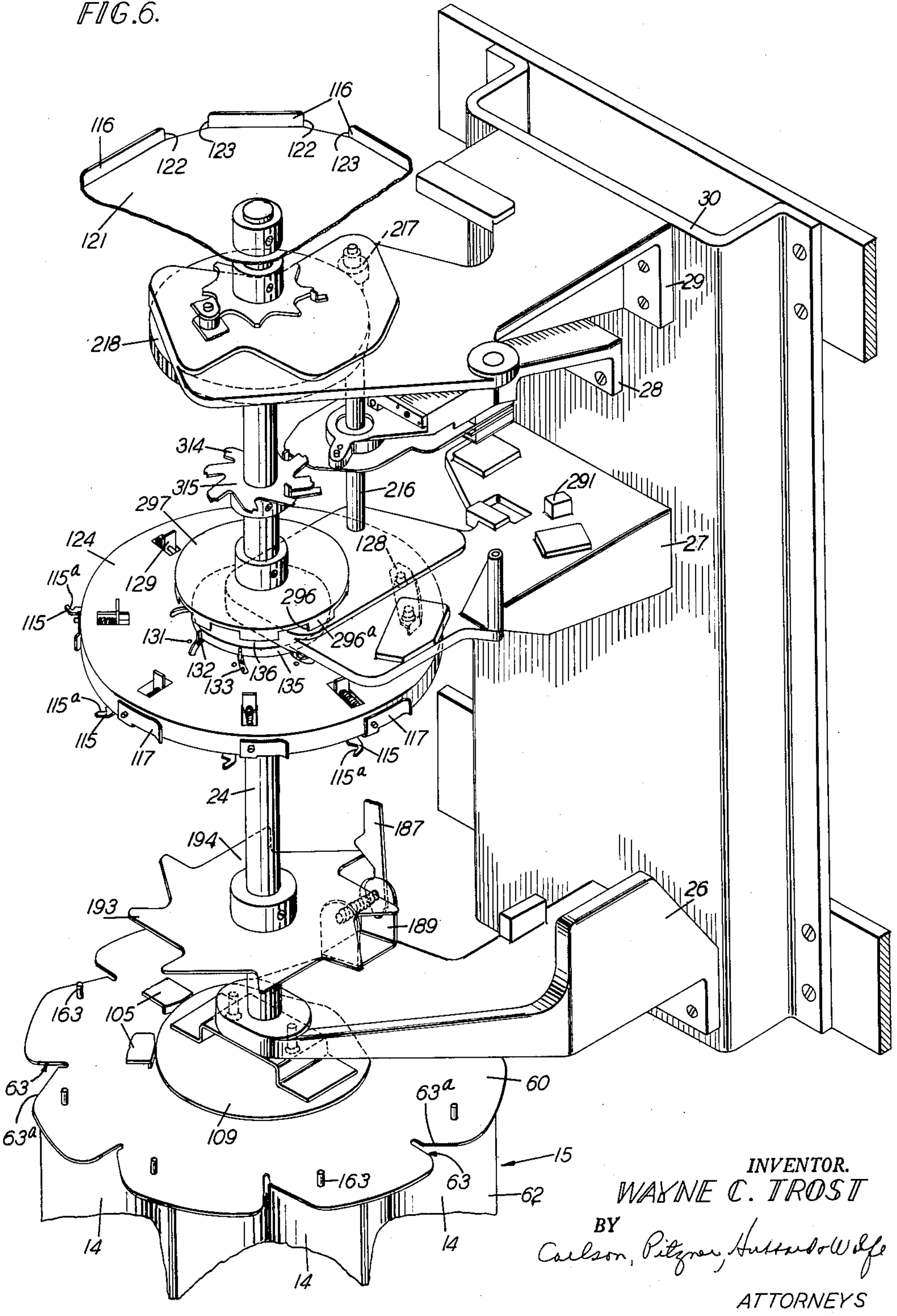
FIG. 6 is a fragmentary perspective view of the machine frame, and the parts carried by the main cam shaft.

The various thread handling and positioning functions involved in the reconditioning of the knotter are performed directly by indexing of the bobbin magazine and through the action of a series of cams (see FIG. 6) spaced along a single upright shaft 24 which defines the indexing axis of the magazine 15.

The shaft 24 is journaled at spaced points along its length in bearings on the forward ends of four vertically spaced brackets 25, 26, 27, and 29 (FIGS. 1 and 6) projecting horizontally from an elongated channel 30 (FIG. 6) whose flanges are secured to the front of bars attached to a column 31 resting on the floor and formed by a rigid box-like frame. Within the frame and mounted on a bracket thereon is a motor 32 from which the indexing motion of the main shaft 24 is derived.

*Winding drum and thread guide (FIGS. 1, 2, 7–10)*

The winding drum 13 is formed in two parts joined at a rigid central hub 33 (FIG. 10) and separated by the usual groove 34 (FIG. 2) for traversing the running thread back and forth across the cheese. It is disposed above and spaced somewhat behind the upper end of the shaft 24 and is supported at the upper end of a forwardly curved bracket 35 secured to the top of the frame 31. The hub 33 (see FIG. 10) is fast on one end of a shaft 35$^a$ journaled in spaced bearings in a horizontal sleeve 36 on the upper end of the bracket 35. At its other end, the shaft carries a sheave 36$^a$ driven from the motor 32 through a belt 37 and at a speed sufficient to provide the desired winding speed, 1200 yards per minute, of the thread.

Figure 54:
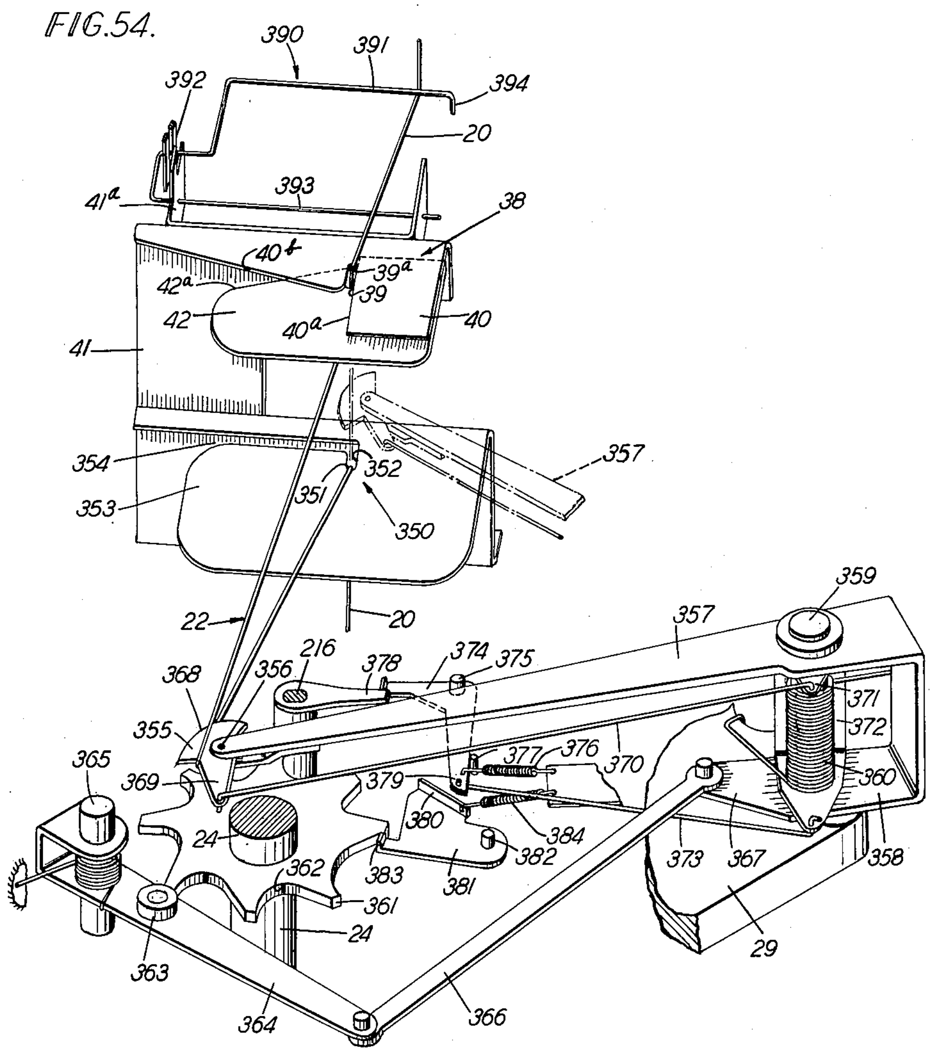
FIG. 54 is a perspective view of the slack loop forming mechanism and the auxiliary thread break detector.

The running thread is led at the proper angle into the groove of the winding drum through a stationary guide 38 (FIGS. 3, 14 and 54) arranged to be threaded manually preparatory to starting the winder. This guide is the rear closed end 39$^a$ of a slot 39 formed in a horizontally disposed plate 40 and having a long side defined by an edge 40$^a$ and an opposed short side at the end of an incline 40$^b$. The plate is the forwardly projecting flange on a bracket 41 (FIG. 1) upstanding from the upper frame bracket 29 immediately in front and below the winding drum. Underlying the plate 40 is a plate 42 having an edge 42$^a$ extending transversely of the slot 39 and intersecting the edge 40$^b$ short of this slot so that a thread moved laterally and to the right into and through the V-shaped throat defined by the edges 40$^b$ and 42$^a$ will pass the overlapping portions of these edges and become disposed in the bottom of the slot 39 as shown in FIG. 54.

*Mounting and doffing of cheese (FIGS. 1, 2, 7–10)*

The large thread mass or cheese is wound on a tubular core 43 (FIGS. 2 and 7) telescoped onto a tubular spindle 44 and releasably held in fixed axial position by a suitable releasable gripping device (not shown). The spindle is journaled in spaced bearings on a stub shaft 45 fixed at one end to and projecting laterally from the free end of a link 46 connected by a pivot 47 to the end of an arm 48. A hub 49 (see FIG. 10) on the latter is journaled on the sleeve 36 at the upper end of the winding drum bracket 35. When in running position (FIG. 7) the cheese is urged against the top of the drum by a spring 50.

The cheese supporting arm 48 is latched releasably in normal winding position by a hook 51 engageable with a pin 52 on the bracket 35. The hook is on the rear end of a lever 53 fulcrumed at 54 on the arm 48 and having a handle 53$^a$ projecting forwardly from and disposed at the right end of the winding drum. By grasping and depressing the handle, the hook may be released and the arm 48 with the cheese thereon swung forwardly and downwardly to the position shown in FIG. 8 and phantom in FIG. 1 which is determined by engagement of a projection 48$^a$ on the arm with a stop 55 on the bracket. In this position of the cheese arm, the cheese is prevented from engaging the winding drum by virtue of the engagement of a pin 46$^a$ on the link 46, which is also part of the full size device, with the end of a slot 56 in a link 57 whose other end is coupled through a pin and slot connection 58, 58$^a$ with the bracket 35.

Figure 7:
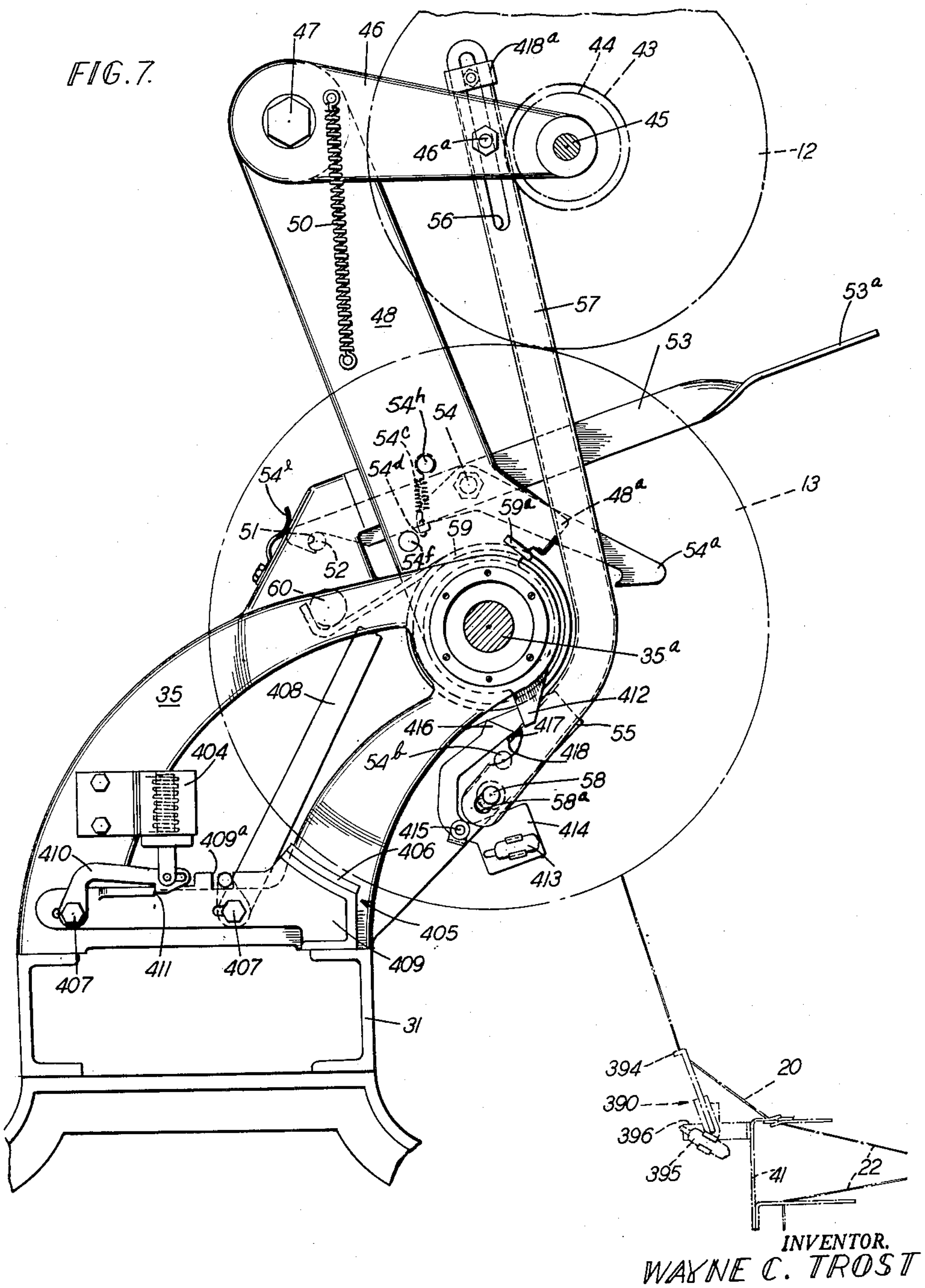
FIG. 7 is a section taken along the line 7—7 of FIG. 2.
Figures 8, 9, 10:
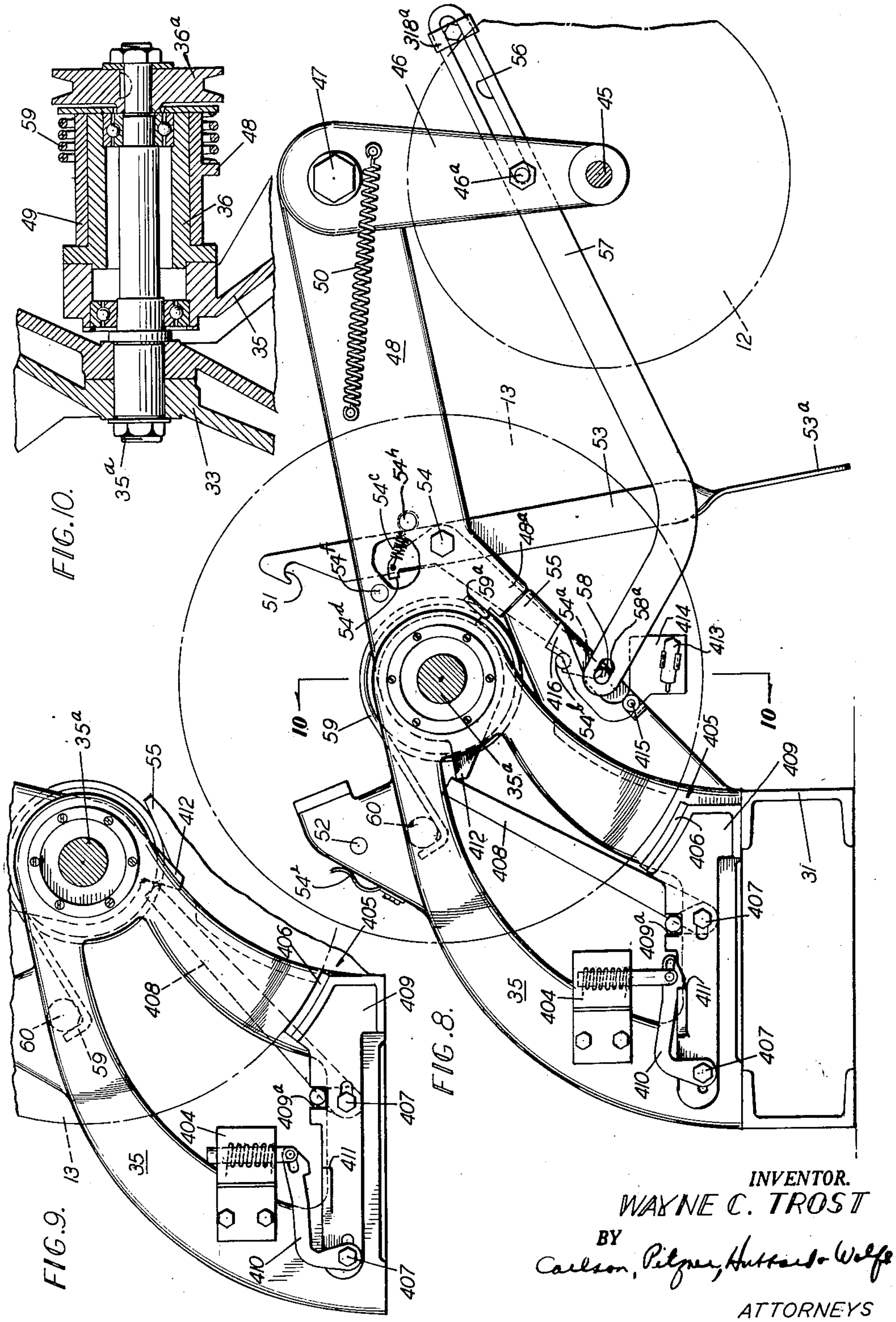
FIGS. 8 and 9 are similar views showing different positions of the parts.
FIG. 10 is a fragmentary sectional view taken along the line 10—10 of FIG. 8.

In the doffing position of the parts shown in phantom in FIG. 1 and in full in FIG. 8, the cheese is disposed at a height within the convenient reach of an attendant standing in front of the winder. At this time, the weight of the arm 48 and the cheese are partially counterbalanced by a torsion spring 59 (FIGS. 7 and 10) coupled at one end 59$^a$ to the arm and at the other end to a pin 60 on the bracket 35. The spring is designed to substantially balance the weight of the arms 46 and 48 and a full cheese. To prevent the spring from swinging these arms upwardly during the mounting of a new cheese core on the spindle 45 or after doffing an undersize cheese, a hook 54$^a$ is fulcrumed on the pin 54 in a position to interengage with a pin 54$^b$ on the bracket 35 when the arm 48 is lowered to doffing position (FIG. 8). The hook has a tail 54$^d$ urged by a spring 54$^c$ against the handle 53 (FIG. 7) so that upward swinging of the latter from the doffing position (FIG. 8) first releases the hook 54$^a$ from the pin 54$^b$ and then, after the handle comes against a pin 54$^f$, raises the arm 48.

After the cheese attains the desired size as evidenced by the full size signal later described, it is swung forwardly and removed from the spindle 44. A new core 43 is fitted onto the latter and, after normally starting the winding of the thread of a new bobbin with the core in the doffed position, the arm 48 is swung upwardly to the position shown in FIG. 7. In approaching this position, the hook 51 engages and slides over the top of the pin 52 where it becomes held by a leaf spring 54$^e$ (FIG. 7).

To enable the handle to perform the several functions above described, its swinging motion relative to the arm 48 is limited to the positions shown in FIGS. 7 and 8. Such lost motion is provided by pins 54$^f$ and 54$^h$ disposed on opposite sides of the hook 51. The pin 54$^h$ constitutes the anchor for the spring 54$^c$.

*Bobbin magazine (FIGS. 1, 3, 5 and 48)*

The bobbin magazine 15 is located at the lower end of the main shaft and comprises generally upper and lower disks 60 and 61 fixed to the shaft and rigidly joined by channels 62 which open outwardly and define the bobbin pockets 14. Preferably the upper disk is formed with peripheral notches 63, the V-shaped bottoms, of which properly locate the thread both radially and circumferentially as it is unwound from the bobbin. A skewer 64 upstanding from the bottom of each pocket is adapted for detachable telescoping with one end of the bobbin spindle. If desired, these skewers may be swiveled on the disk 61 to swing outwardly as shown at the right in FIG. 2 so as to facilitate the removal of an empty bobbin and the substitution of a filled bobbin.

By locating the running thread 20 behind the shaft 24 and in front of the frame 31 as shown in FIG. 1 and by disposing the bobbin magazine at the lower end of the shaft with the break detector 16, the tension reducer 17, the knotter 18, and the slack loop 22 spaced upwardly along the shaft, the bobbins in the reserve positions and the other parts requiring the operator's attention are conveniently accessible from a position in front of the winder.

*Magazine indexing (FIGS. 1, 2, 11, 12, and 13)*

After the bobbin in winding position becomes exhausted or its thread broken and the trailing thread end is tied to the leading portion 21 of the first reserve thread, the magazine 15 is advanced one step to bring the bobbin of the latter thread into active winding position and the leading end portion of the next reserve thread into operative association with the knotter and associated devices. Herein, such indexing of the main shaft extends over one eighth of a revolution, there being eight bobbins in the magazine.

While various types of indexing mechanisms may be employed, the one shown herein is of the ratchet type having a power reciprocated pawl 65 coacting with a ratchet wheel 66 fast on the main shaft 24 below the main magazine 15. The teeth 67 of the wheel are spaced according to the pitch of the bobbins in the magazine and the leading end portions 21 of the successive reserve threads when the latter are hung up in angularly spaced relation as described later.

Figures 11, 12:
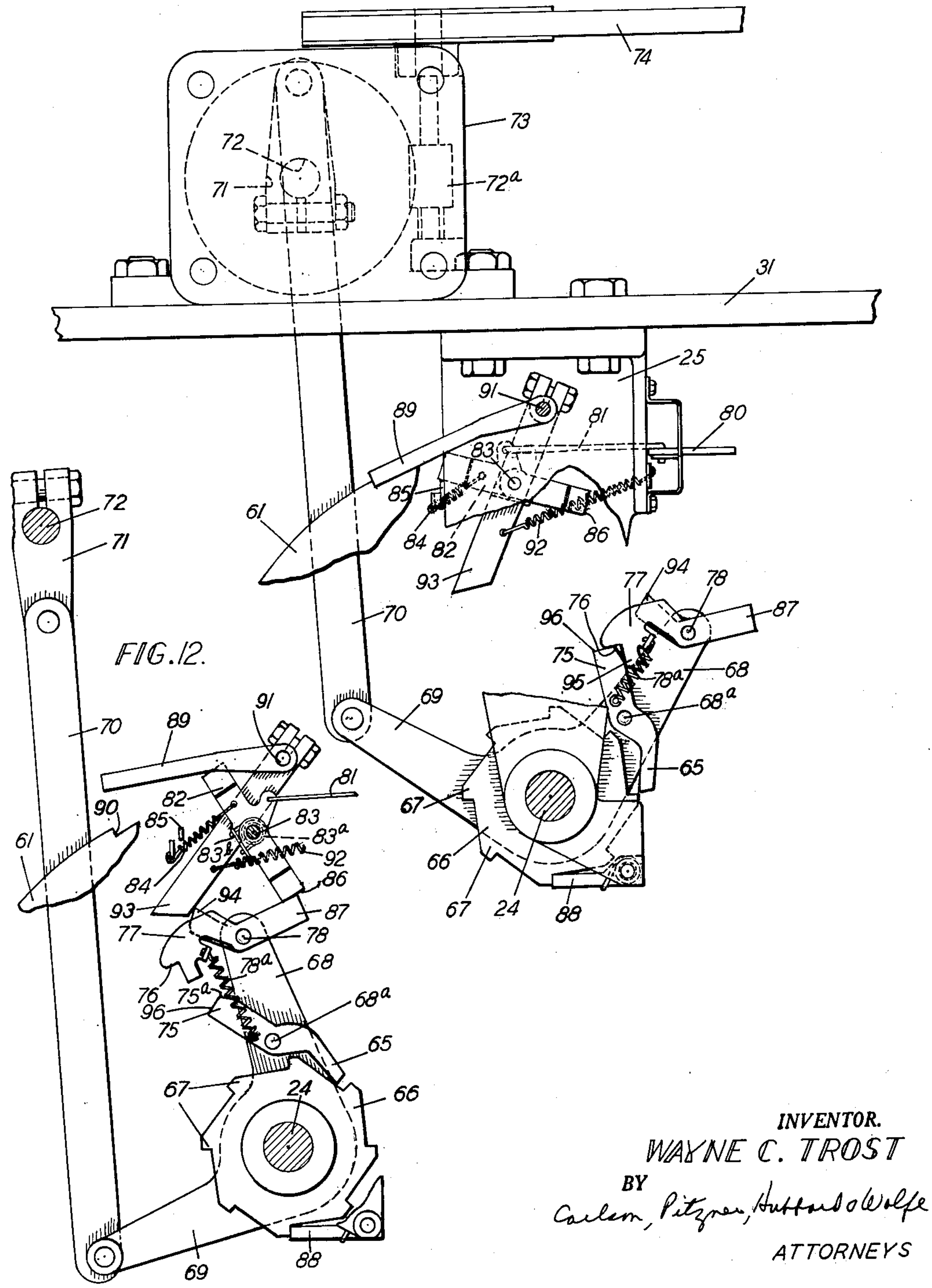
FIG. 11 is a section taken along the line 11—11 of FIG. 2 showing the magazine indexing mechanism.
FIG. 12 is a view similar to FIG. 11 with the parts in a different position.

The actuating pawl 65 is pivoted at 68$^a$ on an arm 68 of a bell crank 69 which is fulcrumed on the main shaft 24 and continuously oscillated back and forth between the positions shown in FIGS. 11 and 12 and at a rate of about 30 oscillations per minute. To this end, the other arm of the bell crank is joined by a link 70 to the free end of a crank 71 fast on the output shaft 72 of a gear reducer mounted in a casing 73 (FIGS. 1 and 11) near the lower end of the frame 31 and the gearing includes a worm wheel meshing with a worm 72$^a$ on a shaft driven from the motor 32 through a belt 74.

Normally the tail end 75 of the pawl lever 65 is seated (FIG. 11) in a notch 76 on one end of a latch 77 pivoted at 78 on the free end of the oscillating bell-crank arm 68. In this relation which is normally maintained by a spring 78$^a$ the active end of the pawl 65 is held outwardly beyond the tips of the ratchet teeth 67 and thus passes idly by the latter in the active clockwise stroke of the pawl and the bell-crank 68, the parts being positioned as shown in FIG. 11 at the end of the idle advance stroke. But when the latch 77 is released as shown in FIG. 12, the pawl moves inwardly against the periphery of the ratchet and thus picks up the tooth 67 and advances the wheel 66 in the clockwise stroke of the actuating arm.

In the present instance, the latch 77 is released by power derived from the oscillating pawl support, such release being controlled by a solenoid 79 (FIGS. 2 and 13) which, as will be described later, is energized in response to the firing of a knotter 18. For this purpose, the armature of the solenoid is coupled to a rocker arm 80 on the lower frame bracket 25 and joined by a link 81 to a lever 82 fulcrumed intermediate its ends on a stud 83 fixed to underside of the bracket 25. In response to energization and deenergization of the solenoid, the lever is swung back and forth between the positions shown in full outline in FIGS. 11 and 12. A spring 84 normally holds the lever 82 against a stop 85 on the bracket (see FIGS. 11, 12 and 13) in which the end 86 of the lever 82 is offset from the path of oscillation of an arm 87 projecting from the latch 77.

Figure 13:
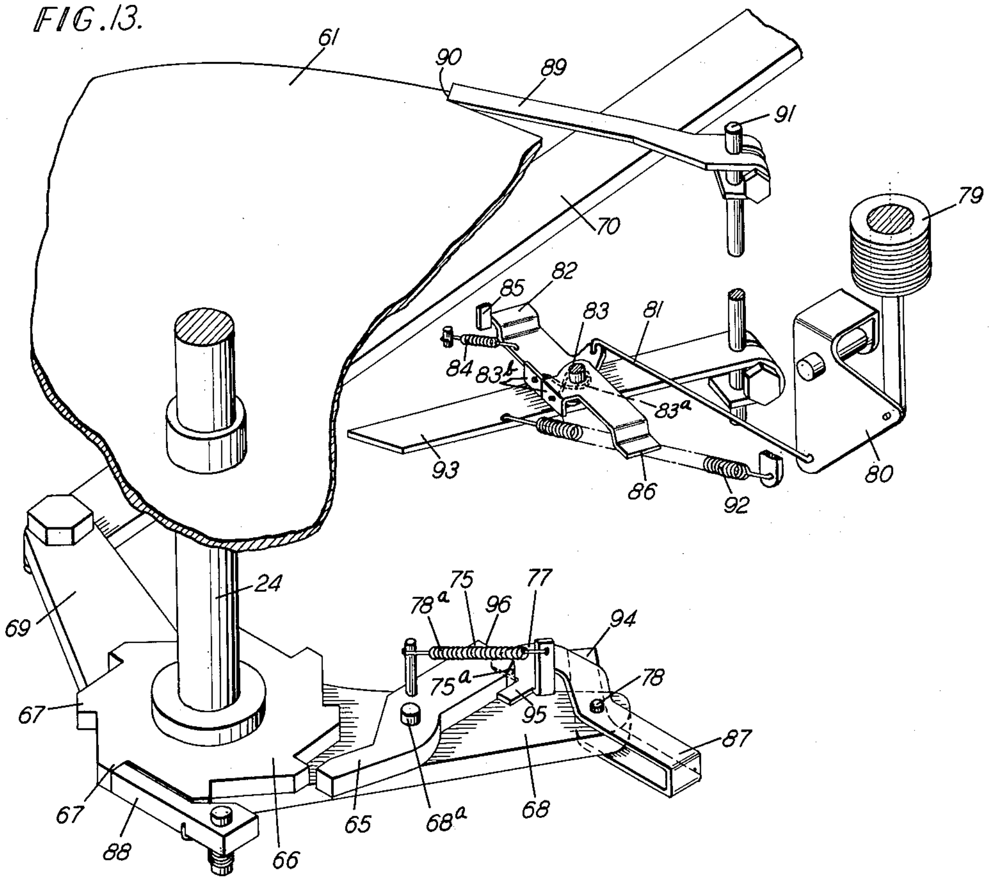
FIG. 13 is a perspective view of the main parts of the magazine indexing mechanism.

Now when the solenoid is energized and the lever 82 swung to the position shown in FIG. 12, the arm 87 will come against the lever end 86 and be blocked by the latter in the final part of the retracting stroke of the pawl carrier 68. As this motion is continued, the latch thus blocked will be swung clockwise to the position shown in FIG. 12, thus moving the notch 76 out of the way of the tail end 75 of the pawl 65 and tripping the latter for inward swinging against the ratchet wheel under the action of the spring 78$^a$. The pawl is thus positioned (FIG. 12) to pick up a tooth of the ratchet and advance the latter during the next active or clock-wise stroke of the actuating bell crank. As shown in FIG. 13, the lever 82 is made in two parts both fulcrumed on the stud 83 and urged by a torsion spring 83$^a$ into alinement determined by engagement of lugs 83$^b$. The connection thus formed is adapted to yield if a thread break occurs and the solenoid 79 is energized at the time when the pawl carrier 68 is fully retracted and the arm 87 is disposed opposite the path of the arm 86.

Normally the bobbin magazine is held against reverse or counterclockwise turning by a detent 88 (FIGS. 11, 12 and 13) stationarily mounted and constantly urged against the ratchet teeth by a sprding. Clockwise rotation is normally prevented by a detent 89 engaging at one of a plurality of notches 90 properly spaced around the periphery of the magazine disk 61. At its other end, this detent is clamped to an upright rockshaft 91 and urged by a spring 92 in a direction to hold the detent against the disk 61. At its lower end, the shaft carries an arm 93 positioned for engagement (see FIG. 12) near the end of the idle stroke of the actuating pawl with a lug 94 rigid with the arm 87. Upon such engagement, the detent 89 is withdrawn from its normal engagement in the notch 90 and is held inactive during the initial part of the next or active stroke of the actuating pawl 65. In the latter part of the stroke, the lug is retracted from the arm 93 allowing the detent to swing inwardly against the edge of the disk 61 and enter the next notch presented thereto as the indexing of the magazine is completed.

Resetting of the latch 77 is effected automatically in the subsequent idle or counterclockwise swinging of the pawl carrier 68. At the beginning of this motion, and as a result of the clockwise movement of the pawl carrier in its previous active or indexing stroke, the latch will be urged counterclockwise by the spring 78$^a$ with its lug 95 abutting the tail end 96 of the pawl, as the carrier is turned counterclockwise with the pawl 65 resting against the inclined back surface of a ratchet tooth 67, the pawl will be turned counterclockwise by the cam action of this surface and the end 96 thus shifted to the left and across the end of the lug 95. Just before the tip of the pawl reaches the tip of the ratchet tooth, the surface 96 will have passed the lug 95 whereupon the corner of the latter engages an inclined side surface 75$^a$ on the pawl which surface, under the action of the spring 78$^a$, becomes effective to continue the swinging of the pawl far enough to present the notch 76 to the pawl end 96 and allow the latter to become seated in the notch as shown in FIG. 11.

*Thread cleaning (FIGS. 3, 5, 6, 17, 24, 58 to 61)*

Each thread, while being unwound from its bobbin, is freed of slubs or other imperfections by passing through a cleaning device 99 one of which is provided for each bobbin in the magazine (FIGS. 3, 5 and 17) while one device serves all of the bobbins in the form shown in FIGS. 58 to 61. The individual cleaning devices are attached to the upper magazine disk 60 and each overlie the bottom of one of the thread guide notches 63. It comprises a so-called snick plate in the form of a flexible blade 100 (FIG. 17) having a serrated edge 100$^a$ facing outwardly and extending tangentially across the apex of the notch 63 when in retracted position. The blade is fulcrumed on an anchor 101 on the top of a block 103 and thus adapted to be raised by a slub on the traveling thread by yielding of a spring 102 underlying the inner end of the blade.

The block 103 provides a radially disposed guideway 104 (FIG. 5) angularly spaced ahead of the snick plate and receiving a slide 105 having vertically spaced fingers 106 and 107 lying in a common vertical plane paralleling the blade edge 100$^a$ and alternately bent in opposite directions to form a throat whose walls converge in the direction of the magazine indexing. One of the fingers 107 is disposed at the level of the blade edge 100$^a$ for coaction therewith in stripping slubs from the thread.

Figure 24:
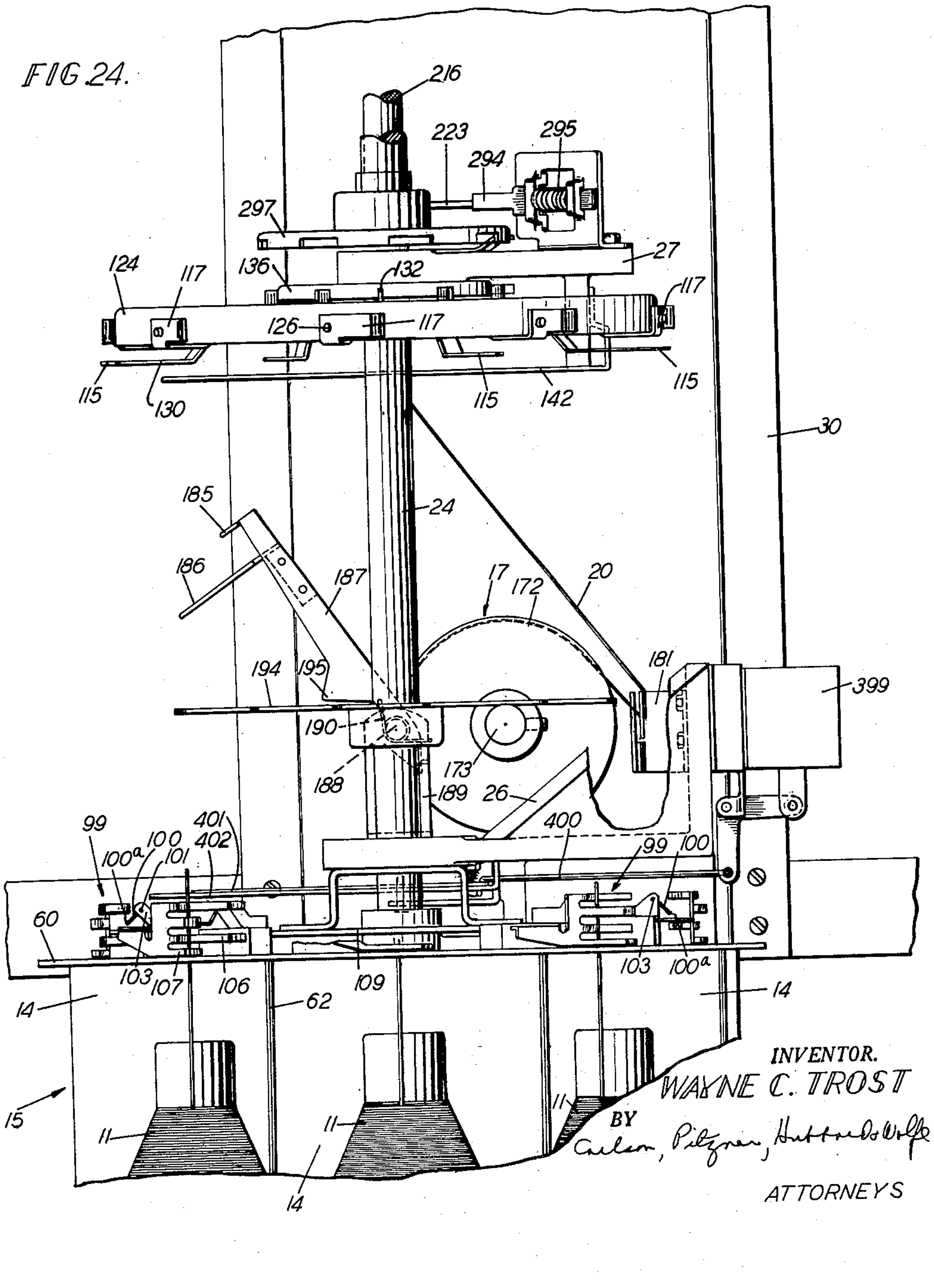
FIG. 24 is a fragmentary front view of the winder.

A compression spring 108 (FIG. 17) urges the slide 105 inwardly holding its inner end against the periphery of a stationary cam 109 fixed to the brackets 26 (see FIG. 24). In all except the active and reserve positions, the cam 109 holds the slides 105 and the guide fingers thereon outwardly away from the blade edge 100$^a$ as shown in the lower part of FIG. 5. In this position, a thread manually drawn upwardly from a newly placed supply bobbin and moved laterally into the magazine notch 63 along the edge 63a thereof will be guided into the throat defined by the fingers 106 and 107 and thereby brought into proper operative association with the blade edge 100a.

Figure 5:
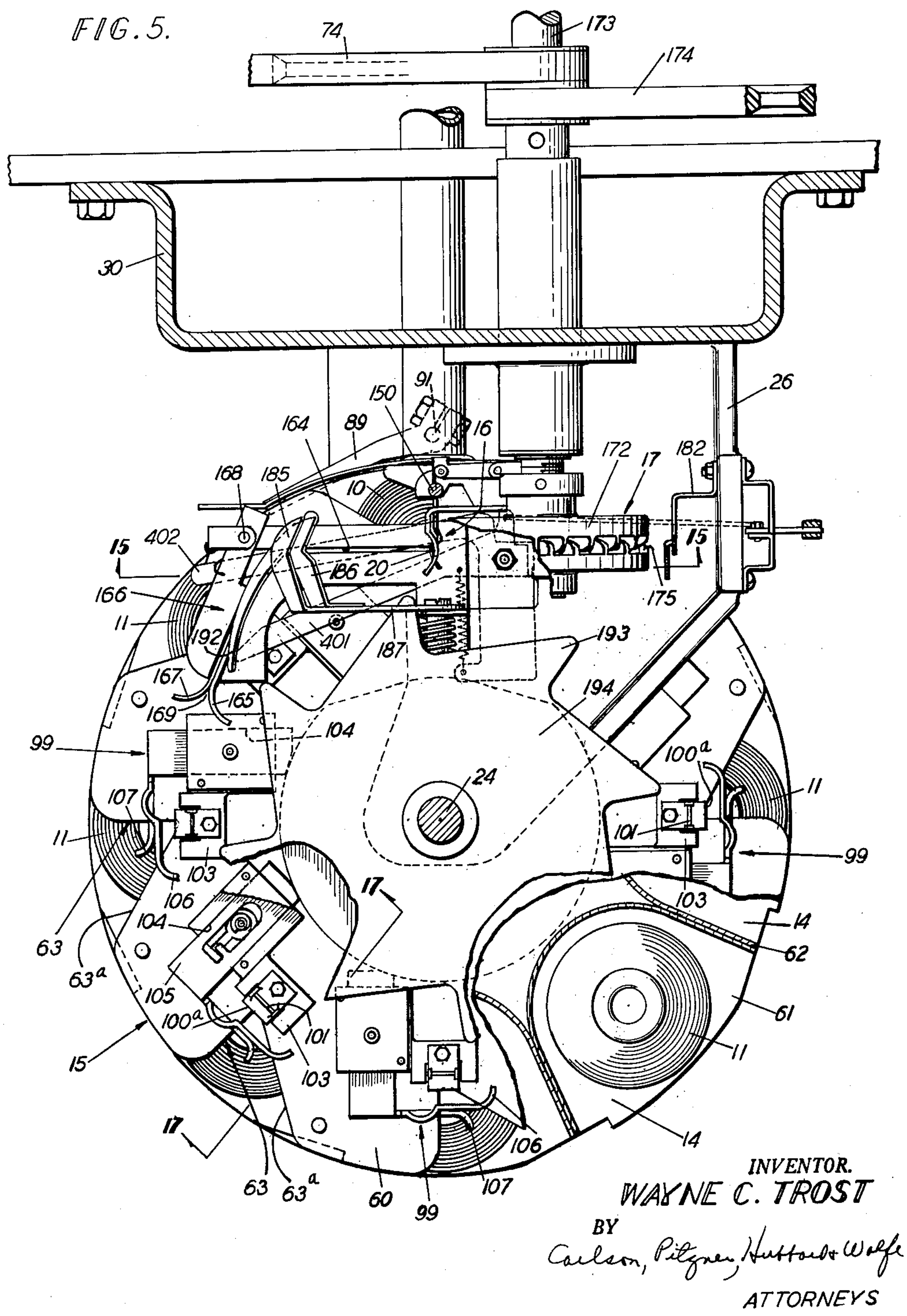
FIG. 5 is a fragmentary plan sectional view taken along the line 5—5 of FIG. 2.

As any bobbin and its associated snick place approaches the reserve position next adjacent the active or rearmost position shown in FIG. 5, the slide 105 encounters a depression on the cam 109 and moves inwardly far enough to bring the thread into engagement with the blade edge 100a. Then, during unwinding of the bobbin, the thread travels upwardly through the fingers 106 and 107. When a slub of objectionable size is encountered by the edge, the blade is swung upwardly enough to pinch the thread against the backing provided by one of fingers 107. This forces breakage of the thread in the desired manner.

Figures 58, 59, 60:
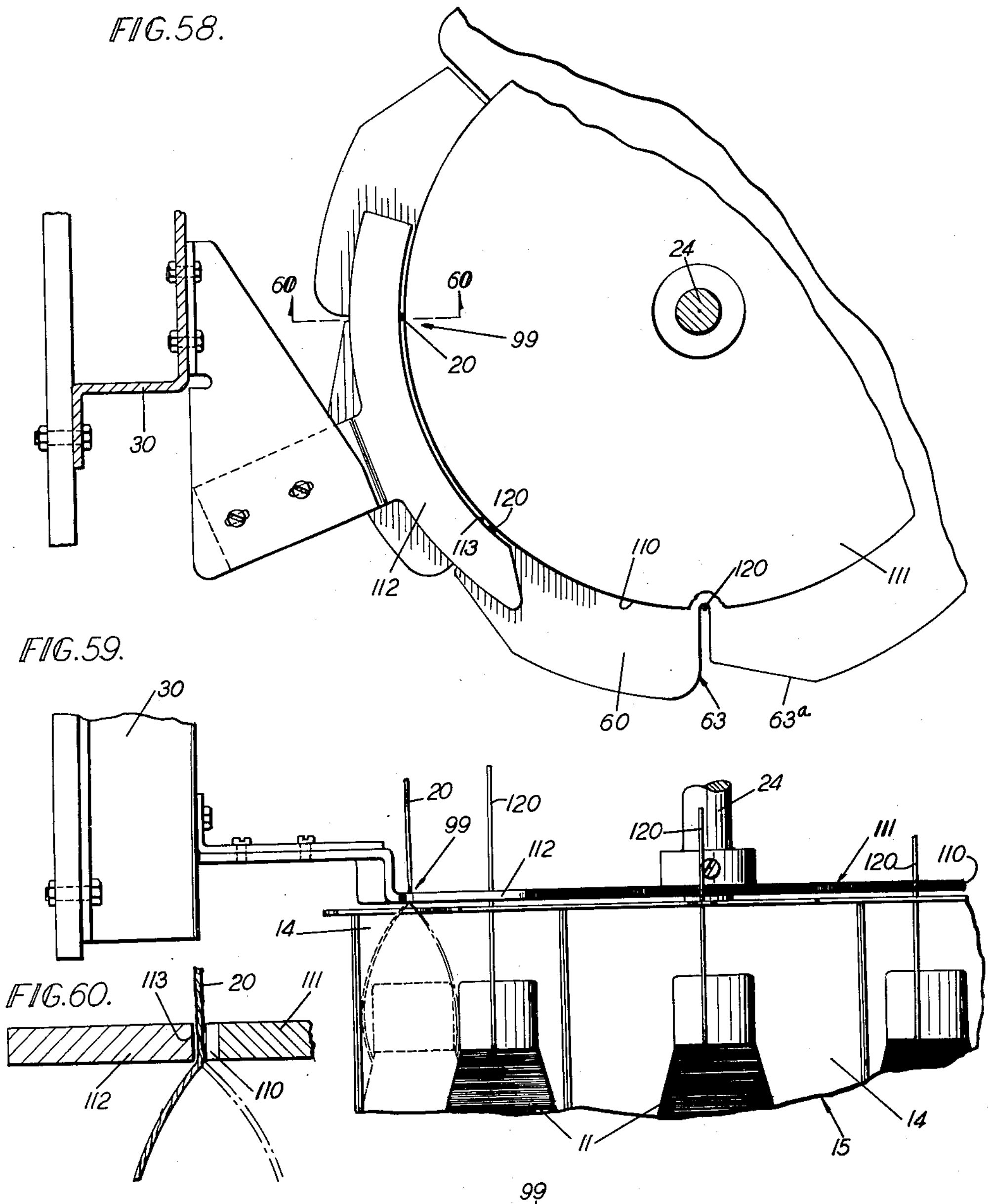
FIG. 58 is a fragmentary plan view similar to FIG. 5 showing a modified form of yarn clearer.
FIG. 59 is a fragmentary elevational view of the parts shown in FIG. 58.
FIG. 60 is an enlarged fragmentary section taken along the line 60—60 of FIG. 58.
Figure 61:
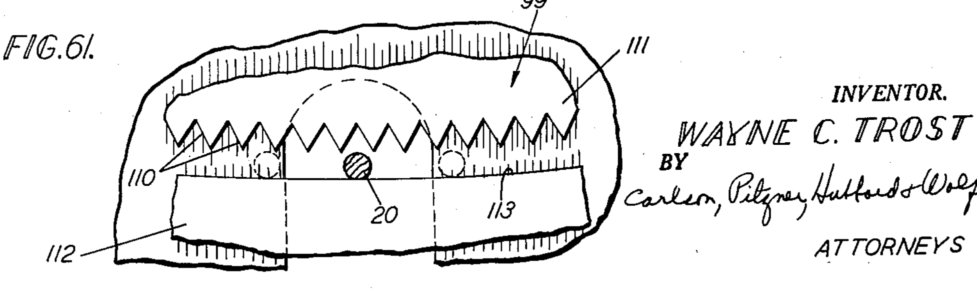
FIG. 61 is an enlarged fragmentary plan view of a portion of FIG. 58.

The overall construction may be simplified by employing the arrangement shown in FIGS. 58 to 61 in which the cleaning action is effected during running of the thread between the outer periphery 110 of a disk 111 and the inner edge 113 of an arcuate shoe 112 disposed opposite the active or unwinding position as shown in FIG. 58 and mounted on the column 30. The periphery 110 is serrated and defined by fine teeth (FIG. 61) which are disposed close enough to the edge 113 to catch slubs of objectionable size and cause breakage of the thread.

As a bobbin is placed in one of the pockets 14 and the loose end of its thread is led into a notch 63 and hung up as will be described later, the thread will be disposed close to the tips of the teeth 110 and be carried along with the latter in the successive indexing motions. Then as the thread approaches the active or running position, it will pass the inclined end of the shoe 112 whose edge 113 then becomes effective in holding the thread in the proper relation with respect to the teeth 110 to provide the desired cleaning action while the thread is being drawn upwardly from its bobbin when the latter is disposed in the active winding position.

*Manual positioning and shaping of reserve threads (FIGS. 2, 3, 19, and 43)*

After a new bobbin has been placed in a pocket of the magazine 15 and the thread led into the bottom of guide notch 63, the operator continues to draw the thread upwardly leading the thread first around a hook shaped positioning finger 115, then around and over a guide 116 and finally downwardly into a clamp 117. The thread is thus hung up above the magazine in the form of an inverted J-shaped loop 118 (see FIGS. 3 and 19) having its closed end disposed above the level of the knotter 18 and its short leg formed by the depending leading end 21 of the thread. This end is angularly spaced ahead of the long leg 120 so as to be carried into operative association with the knotter while the long leg remains spaced backwardly and out of engagement with the thread detector 16. At the same time, in the machine shown in FIGS. 1 to 64, the short leg 21 is radially spaced inwardly from the long leg so these two legs traverse different arcuate paths in entering the knotter in successive indexing or knotter reconditioning cycles.

For these purposes, a flat disk or wheel 121 carrying the loop forming guides 116 is fixed to the shaft 24 above the knotter. This disk is of generally polygonal shape and the guides are formed by flanges upstanding at the sides of the polygon and angularly separated by intervening notches. Opposite ends 122 and 123 of each flange are spaced different distances from the shaft axis so as to locate the leading thread portions 21 at a shorter radius (see FIG. 55) than the long leg 120 of the loop. In the present instance, the shaft is indexed in steps of 45 degrees and therefore the guide flanges 116 are correspondingly spaced apart around the disk 121. If desired, the edges of the disk 121 are notched as indicated at 121a (FIG. 78) to facilitate hanging the threads over and around the flanges 116.

The clamps 117 are disposed approximately in vertical alinement with the leading ends 122 of the associated guide flanges 116 and are carried by a disk 124 fast on the shaft 24 and disposed below the knotter and above the detector 16 and tension reducer 17. Each clamp (FIGS. 3, 4, and 24) comprises a short bar lying along a depending peripheral flange 124a on the disk and formed integral with the outer end of a U-shaped member 125 (FIG. 4) straddling the disk flange and carried by a rod 126 guided in the flange and a lug struck downwardly out of the disk. The clamp bar is fixed to the outer end of the rod 126 which supports a compression spring 127 urging the member 125 and the bar inwardly against the flange to provide the clamping force. The free trailing end of the clamp bar is bent outwardly to facilitate guiding the thread into the clamp.

Each clamp remains closed during the major portion of the revolution of the bobbin magazine but is opened in the initial movement away from the active winding position. This is accomplished by a stationary cam 128 (see FIGS. 4, 6 and 46) fixed to the bracket 27 in a position for its inclined end 128a to engage an end 129 of the clamp member 125 projecting upwardly through a hole in the disk 124.

The positioning finger 115 for each reserve thread projects outwardly beyond the flange 124a immediately below the latter and is angularly spaced behind the clamp 117 of the thread nearly the full length of the indexing motion. Thus, the finger for one reserve thread is spaced only a short distance ahead of the clamp for the succeeding reserve thread (see FIG. 3) and also ahead of the bobbin from which the first thread is led. As a result, the long leg 120 of the thread bends slightly in passing around the finger so that between the disks 121 and 124 this leg of the thread is inclined forwardly (see FIG. 19) slightly from the bobbin and the notch 63 by which the thread is guided.

Each finger 115 opens circumferentially in the direction of the indexing motion and the bottom of a notch 115a in the finger is spaced outwardly a short distance (FIGS. 3 and 43) beyond the associated clamp 117. This, together with the outward location of the upper end of the thread leg 120 as determined by the trailing end of the guide flange 116 positions this leg of the thread for entry into the proper guides as the thread approaches the active winding position.

Figure 46:
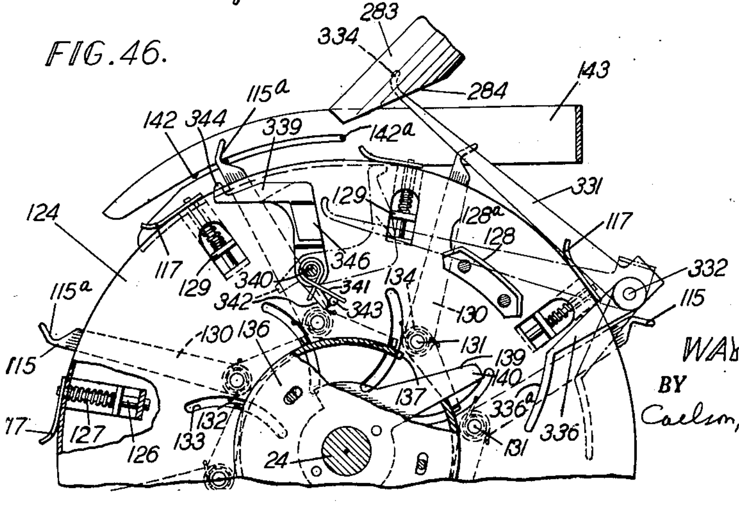
FIG. 46 is a section taken along the line 46—46 of FIG. 2.
Figures 49, 50:
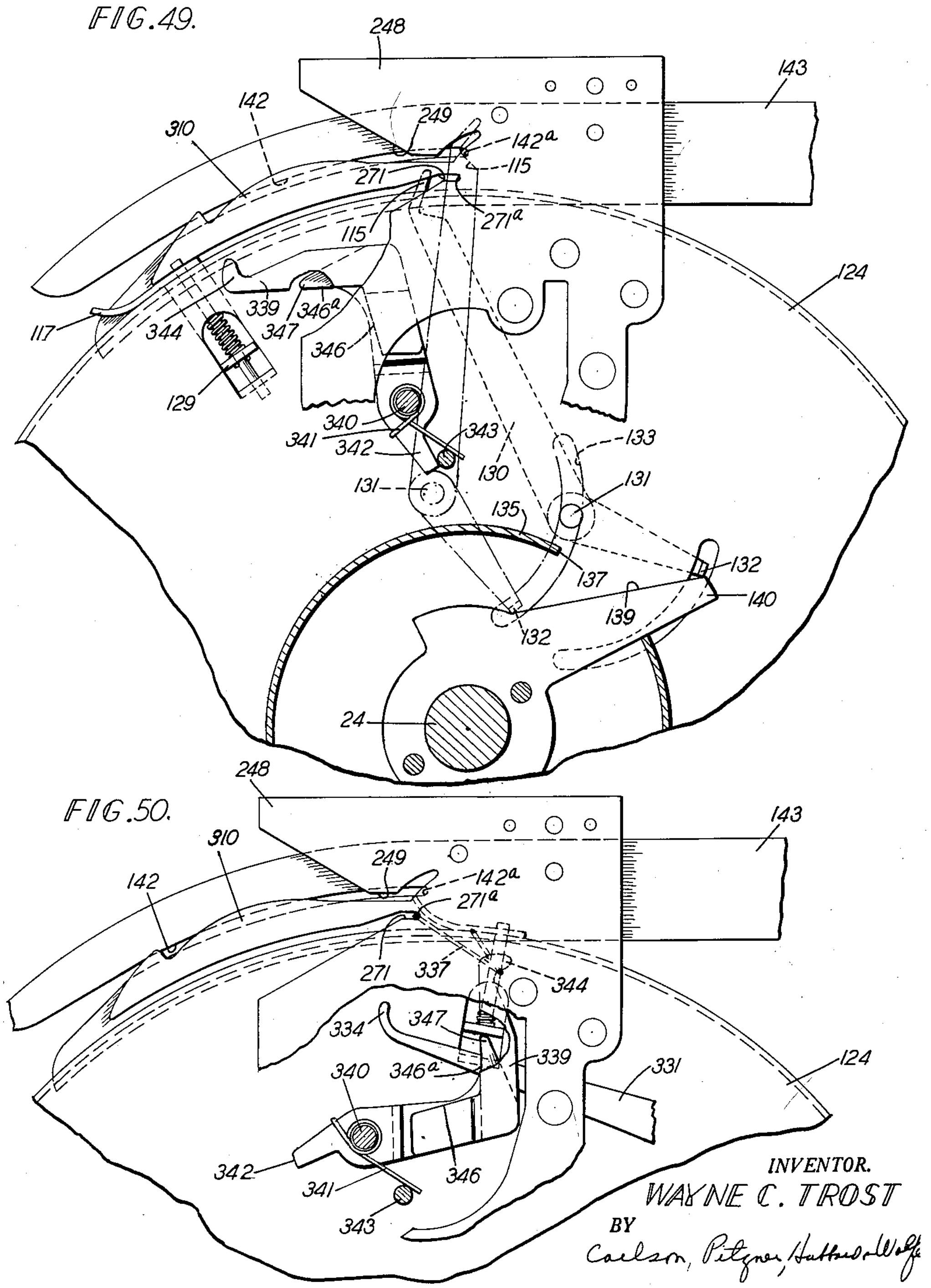
FIGS. 49 and 50 are enlarged fragmentary views similar to FIG. 46 illustrating the positioning of the running thread.

The fingers 115 are on the outer ends of radially disposed arms of bell cranks 130 (FIGS. 3, 44, 46, and 49) underlying the disk 124 and fulcrumed intermediate their ends on studs 131 riveted to and depending from the disk about midway between the inner and outer peripheries thereof. The other or inner arm 132 of each bell crank is bent upwardly through an arcuate slot 133 in the disk 124 to form a follower urged by a torsion spring 134 against the downturned flange 135 of a disk 136 secured to the bracket 27. At the start of the indexing motion, the follower 132 of the finger engaging the first reserve thread drops into a notch 137 in the cam flange 135 as shown in FIGS. 46 and 49 thus swinging the finger forwardly until as shown in dot-dash outline in FIG. 49, the follower encounters a stationary surface 139 on a projection 140 attached to the underside of the cam disk 136. As the follower 132 continues to turn with the shaft 24, it rides outwardly along an inclined surface 139 and is thus carried out of the notch 137 to the outer end of the surface 139 as shown in FIG. 49, and eventually rides off from this surface so as to be swung backwardly by its spring 134 against the cam flange 135.

To form the inverted J-shaped loop above described, the operator first draws the reverse thread upwardly from the bobbin into the corresponding notch 63 and then leads it laterally into the throat of the fingers 106, 107 associated with the cleaning device 99. From this guide, the thread is drawn upwardly and somewhat forwardly and led first around one of the fingers 115 and then around the trailing end 123 of the proper guide flange 116. By pulling the end laterally along the top of the disk 121, the thread may be looped around this flange after which the free end is drawn straight downwardly and inserted into the proper clamp 117 by a sidewise movement.

When thus hung up on parts movable with the bobbin magazine, the J-shaped loops of the successive bobbins will be advanced step by step around the upright center axis of the winder and brought successively into active winding position. In the final step before reaching this position, the long leg 120 of the J is carried by its finger 115 into the converging throat (FIGS. 3, 43, 46 and 49) of an elongated arcuate slot 142 extending around the periphery of the disk 124 just outside of but disposed below the flange 124^a^. This slot is formed in a curved bar 143 fixed to the frame bracket 27, the closed end 142^a^ of the slot being located at the active winding position. When the running thread 20 is disposed in this end of the slot (see FIG. 3), the long leg 120 of the first or next adjacent reserve thread will be disposed about midway between the ends of the slot in each rest position of the bobbin magazine.

With the unwound portion of the reserve threads hung up on the flanges 116 as shown in FIGS. 3 and 19, the short leg 21 of the inverted J-shaped thread of each bobbin 11 will be spaced angularly ahead of that bobbin a distance at least equal and preferably somewhat greater than the angle through which the magazine 15 is indexed after each thread break. Such spacing, which is determined by proper location of the flanges 116 relative to the corresponding bobbin pockets, insures that the short leg 21 of the first reserve thread will be carried into tying position along side the running thread when the bobbin of the latter thread is in active winding position.

*Thread break detector 16 and automatic threading thereof (FIGS. 3, 5, 15 and 20–23)*

Immediately above the cleaning device 99, the thread running from the bobbin in the active position passes through the break detector 16 which comprises a grid formed by stationary and movable fingers 145 and 146 alternating with each other in vertically spaced relation so as to engage opposite sides of the running thread (FIGS. 20 and 21) but to move past each other (FIG. 22) when the thread breaks. The stationary fingers are vertically spaced and include a plurality of L-shaped rigid wires projecting cantilever fashion from an L-shaped bracket 147 on the bracket 26 and shaped adjacent their free ends to form V's 148 which face circumferentially in a direction opposite to the indexing motion of the bobbin magazine so as to guide an oncoming leg 120 of the reserve thread into a position determined by the apices of the V's. The latter are alined vertically approximately with the axis of the bobbin in the active position and with the bottom of one of the guide notches 63 when the magazine comes to rest.

The movable fingers 146 are vertically spaced along and project horizontally from a vertical shaft 150 whose shouldered ends are journaled in a bracket (FIG. 1) on the bracket 27 and in the horizontal arm of the bracket 147. Near their free ends and opposite the V's of the stationary fingers, the fingers 146 are bent to form oppositely facing V's which alternate in vertical spacing with the fingers 145. A light torsion spring 151 (FIG. 20) encircling the shaft 150 and anchored on the frame tends to turn the shaft counterclockwise as viewed in FIGS. 20, 21 and 45. Thus, when a running thread is disposed between the fixed and movable fingers and in the registering V's thereof (FIGS. 15, 20 and 21), the fingers 146 will be blocked and prevented from moving past the fingers 145 under the small force of the spring 151. On the other hand, if the running thread is broken or exhausted, the fingers 146 will be free to swing counterclockwise past the fingers 145 through a quarter revolution to the position shown in FIG. 22. The released position is determined by engagement of a depending arm 152 on the detector shaft 150 in the bottom of a notch 153 (see FIGS. 20 and 22) formed in the inner edge of the arm of the bracket 147. Herein, the arm 152 is a piece of wire bent outwardly at its upper end and anchored in the detector shaft below the movable fingers 146 (see FIG. 20).

Figure 20:
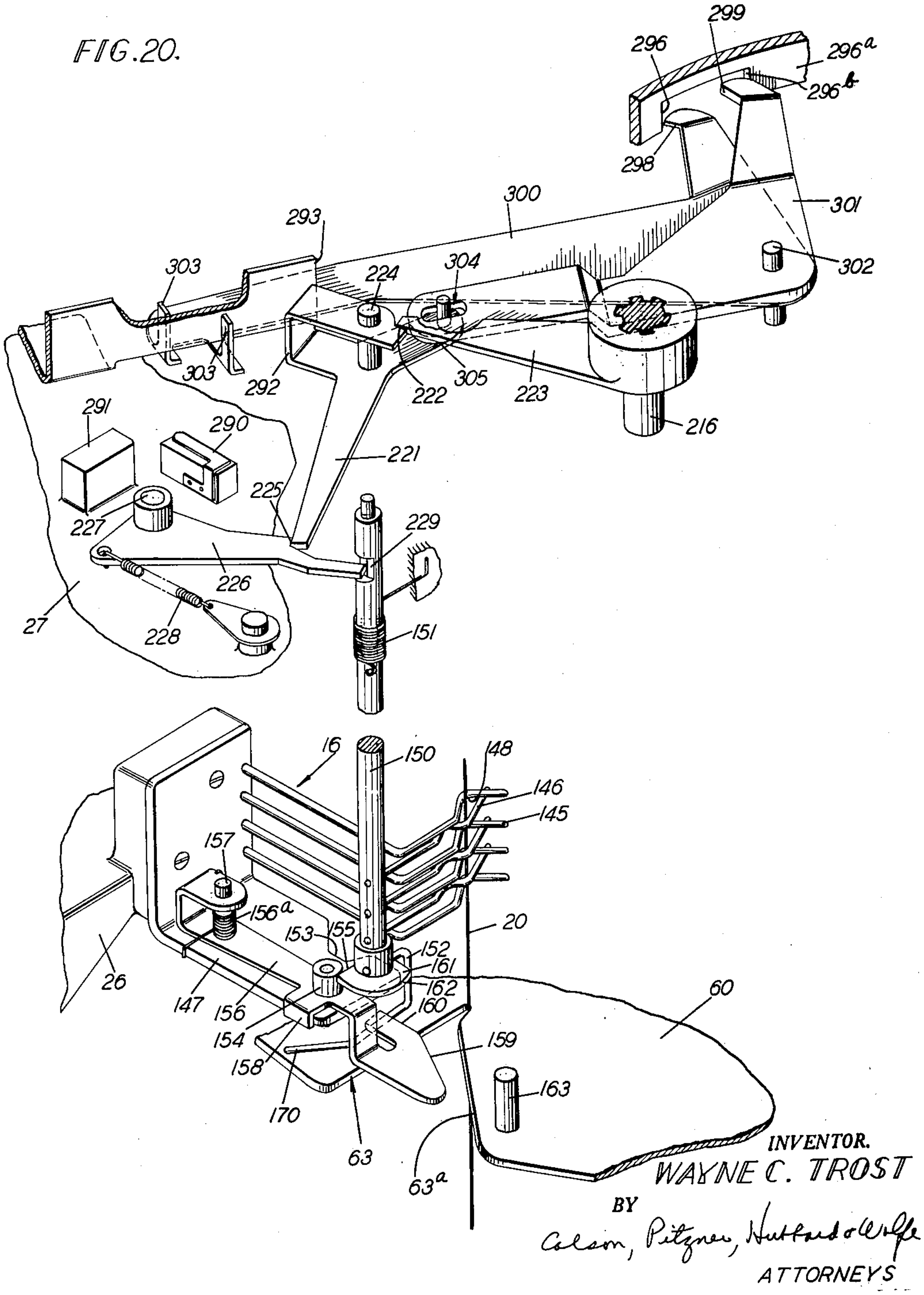
FIG. 20 is a fragmentary perspective view of the primary detector and the control for firing the knotter.

The fore of the spring 151 urging the movable fingers 146 against the running thread is necessarily small, so that the development of a sudden abnormally high tension in the thread would overcome the spring force and throw the fingers and the shaft reversely. If permitted to occur, this might introduce a short but nevertheless objectionable delay in the action of the detector to sense a thread break. Such reverse turning of the shaft 151 is limited by an abutment 154 engageable behind a projection 155 on the shaft and mounted for movement into an out of the way position during the rethreading of the detector. The abutment takes the form of a roller upstanding from an arm 156 fulcrumed on a pin 157 on the bracket 147 and urged toward the shaft by a torsion spring 156^a^. This motion is limited as shown in FIG. 20 by engagement of the bracket by a down turned lug 158 on the arm 156. The free end of this arm is bent downwardly and formed with an inclined inner edge 159 merging with a straight edge 160 and positioned, when the detector is released, in the path of pins 163 upstanding from the magazine disk 60 near the periphery thereof. These pins are angularly spaced ahead of the reserve thread guide notches 63 so as to operate at the proper time in the indexing movement of the bobbin magazine.

Figures 21, 22, 23:
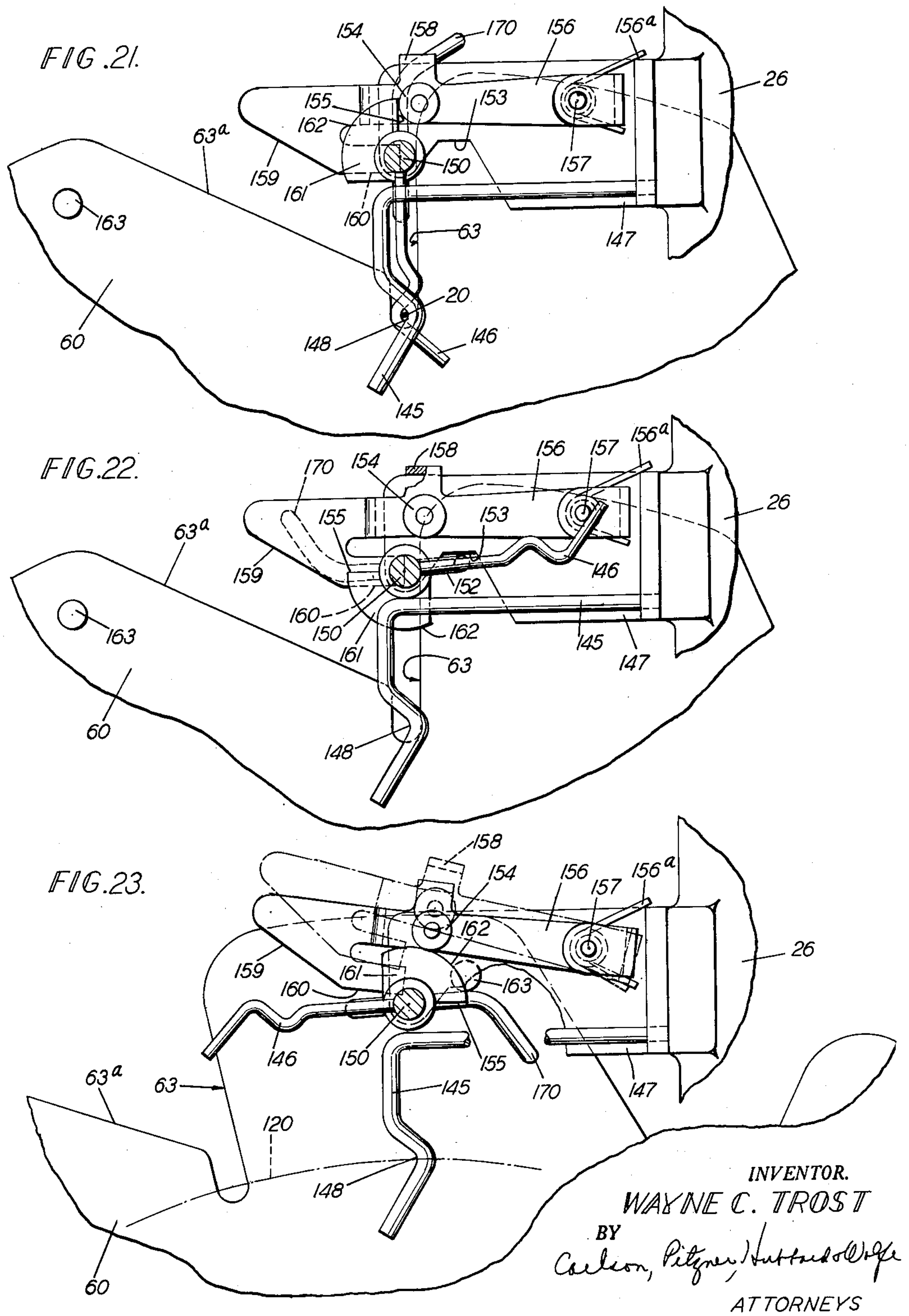
FIGS. 21, 22 and 23 are fragmentary sectional views taken along the line 21—21 of FIG. 15 and showing different positions of the primary detector during rethreading thereof.

The projection 155 is a radially disposed edge of a segment 161 having a hub pinned to the shaft 150 and an arcuate periphery 162 which the roller 154 rides (see FIG. 23) during the resetting of the detector. This cam surface is shaped to control the return motion of the arm 156 and thus delay this motion until the detector has been fully reset to running position as shown in FIG. 21. When the trailing end of the surface 16 passes the roller 154, the latter drops in behind the surface 155 (see FIG. 21) thus preventing reverse or clockwise swinging of the detector shaft 150.

After release of the detector in response to a thread break, the actuating pins 163 are utilized to actuate the movable fingers 146 in the ensuing indexing of the bobbin magazine and reset the detector 16 with respect to the new running thread whose long leg 120 is advanced into the detector along an elongated stationary slot 164 (FIGS. 3 and 5) defined by curved bars 165 fixed to the frame bracket 26 and extending backwardly around the top of the bobbin magazine to a point above the first reserve bobbin.

Each reserve thread enters the guide slot 164 through a gripper 166 which, for a purpose to appear later, exerts a friction drag on the thread drawn from the first reserve bobbin. To this end, a flange turned up along the inner guide bar 165 forms a stationary jaw coacting with a movable jaw 167 on an arm constituting an extension of the outer guide plate and fulcrumed on a stud 168 at the end of the latter plate. A torsion spring (not shown) encircling the stud urges the jaw 167 toward the fixed jaw thus providing for gripping of the intervening thread with the desired pressure. As the portion 120 of the reserve thread approaches the first reserve position, it enters a throat 169 formed by bending the ends of the jaws away from each other, this throat serving to guide the thread into the gripper from which the thread enters the guide slot 164 in the next indexing motion.

For resetting of the detector 16, the wire 152 forming the detector shaft stop arm is bent laterally below the arm 156 (see FIG. 20) and the outer end portion is bent and inclined as indicated at 170 in the direction of the indexing motion. After release of the detector shaft 150 and counterclockwise turning thereof through a quarter revolution, and against the stop 153 (FIG. 22) the wire end 170 will be inclined outwardly and backwardly and thus positioned in the path of the next actuating pin 163. In the ensuing indexing motion, this pin first engages the incline 159 and cams the arm 156 outwardly as indicated at 156$^c$ (FIG. 63) after which the pin passes the edge 160 at 156$^b$. The pin also engages the wire end 170 and then cams the latter, the detector fingers 146 and the shaft 150 clockwise through a half revolution as indicated at 145$^a$ (FIG. 63) to the position shown in FIG. 23 as the pin 163 approaches and passes the shaft 150. The area of the engagement shifts first outwardly and then inwardly along the end 170 in reaching the position shown in FIG. 23. In this movement, the fingers 145 are swung backwardly past the normal operative position so that the oncoming thread 120 may be carried into the notches of the fingers 145 along the arcuate path shown in phantom in FIG. 23.

Finally, and after the reserve thread has come against the stationary fingers 145, the pin 163 passes the wire end 170 at 145$^b$ (FIG. 63) freeing the fingers 146 and the shaft 150 for counterclockwise turning under the action of the spring 151. The new thread thus trapped between the V's of the two sets of fingers limits the turning of the shaft to a position (FIG. 21) in which the roller 154 is free at 156$^d$ (FIG. 63) to drop in behind the projection 155 under the action of the spring 156$^a$. The detector is thus fully reconditioned to resume its function of sensing a break or exhaustion of the running thread.

*Tension reducer and automatic conditioning thereof (FIGS. 1, 2, 3, 5, 18, 24–27)*

The tension reducer 17 engages the running thread immediately above the detector 16 and operates frictionally against the thread at a speed somewhat greater than the winding speed so as to maintain that portion of the thread engaging the detector under somewhat greater tension than the tension in the upper part of the running thread. By such concentration of the tension, the breaks will normally occur in the region of the detector thus leaving a trailing end of thread long enough for tying to the next reserve thread in the ensuing instantaneous cycle of the knotter.

At the same time, the reducer operates automatically to compensate for abnormal increases in thread tension and maintain a substantially uniform tension in the thread beyond the reducer. Such tension changes occur for example when a slub passes the cleaning device 99 or during unwinding from different parts of the bobbin. In effecting such compensation, the reducer responds to tension increases and correspondingly increases the friction force exerted on the passing thread.

In the present instance, the reducer comprises a wheel 172 disposed tangent to the running thread leaving the detector 16 and fast on a horizontal shaft 173 projecting forwardly from the channel 30 and driven at the proper speed from the motor 32 through a belt 174. Herein the wheel comprises two disks secured to the shaft and having fins 175 projecting from the inner faces of the disks and interfitting with each other in staggered relation near the outer peripheries of the disks.

Figures 26, 27:
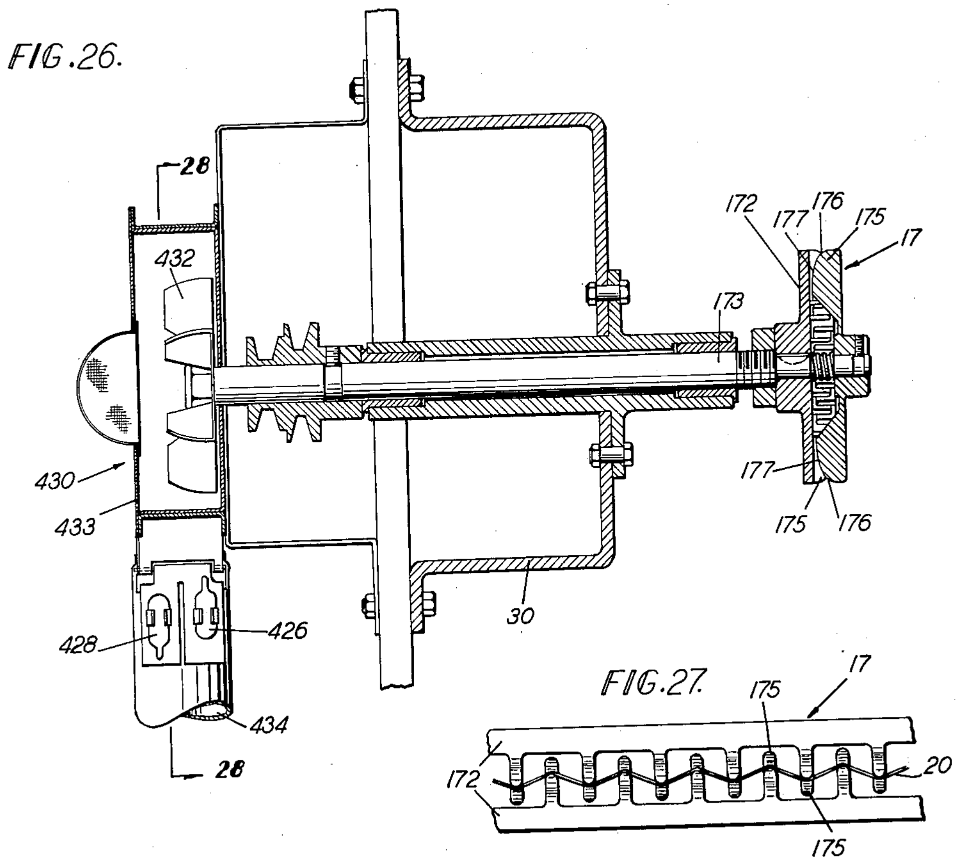
FIG. 26 is a section through the tension reducer shaft taken along the line 26—26 of FIG. 1.
FIG. 27 is a partial development view of the tension reducer.
Figure 28:
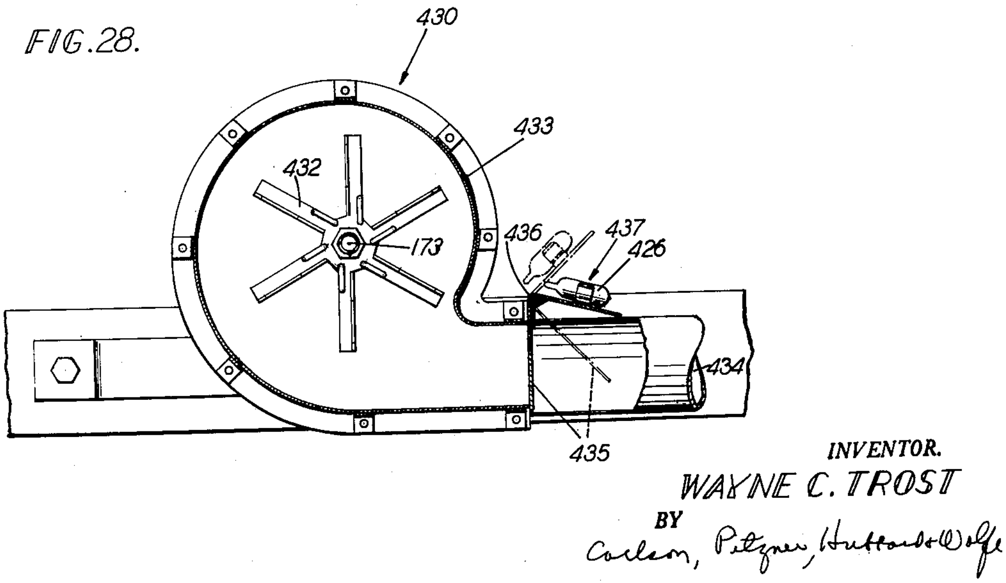
FIG. 28 is a section taken through the pneumatic time delay means along the line 28—28 of FIG. 26.

As shown in FIGS. 26 and 27, the edges of the fins are rounded and each edge curves inwardly toward the opposed disk first gradually as indicated at 176 and then more abruptly at 177. Thus, the surfaces converge inwardly to form a groove for receiving the thread 20 and then project past each other so as to overlap by amounts which increase progressively as the thread moves inwardly in finding an equilibrium position corresponding to the prevailing tension in the thread.

After passing upwardly through the detector 16, the running thread comes into tangential contact with the surface defined by the fins 175 and then passes upwardly and over the top of the wheel 172 through an arc of about a half revolution. On the downwardly moving side of the wheel, thread is led off tangentially and passes through a downwardly opening hook 179 (FIG. 25) beyond which the thread is inclined upwardly and backwardly to the closed end of the stationary guide plate 142$^a$ (FIG. 3) approximately in vertical alinement with the guides of the detector 16.

With the reducer thus constructed, it will be apparent that the rotating wheel 172 exerts a friction force on the thread thus unwinding the thread from the active bobbin and drawing the same through the associated cleaning device 99 and the detector 16 whose fingers form a grid which places enough drag on the thread to enable the desired amount of tension to be developed in the thread ahead of the reducer. In operation, the tension in the thread changes from time to time for example, upon engagement of a slub with the cleaning blade 100. Such an increase causes the thread to be drawn deeper into the wheel groove thereby increasing the arc of contact with the edges of the fins 175. This correspondingly increases the friction force exerted on the thread and overcomes the increased drag without an accompanying change in the thread tension beyond the reducer. As a result, the reducer operates automatically to compensate for abnormal tension changes and thus maintain a substantially uniform tension in the thread beyond the wheel in the area of the knotter. At the same time, the reducer performs its primary function of maintaining a higher tension in the portion of the thread passing the detector 16 than in the portion passing the knotter.

Provision is made for threading up the tension reducer 17 automatically as an incident to starting the winding of thread off from a new bobbin. This involves grasping the thread as it leaves the detector 16, laying it over the top of the wheel 172, and finally moving the thread past the tip 180 of the hook 179 and then laterally into the hook. To these ends, the hook is formed on the end of a plate 181 projecting from the bracket 26 on the side of the wheel opposite the detector. At its inner end, the upper corner 182 (FIGS. 3 and 25) of the plate is curved and cooperates to form a downwardly converging guide throat 183 with a reversely curved edge 184$^a$ on a projection 184 formed integral with the plate and spaced a short distance from the latter toward the wheel 172. The edge of the projection overlaps the plane of the hook opening so that a thread moved downwardly and sidewise into and beyond the throat 183 will be shifted laterally as it passes the tip of the hook. Then, when the tension is restored, the thread will be trapped in and held by the hook.

Such rethreading of the tension reducer and its hook 179 is effected during the indexing motion when a new bobbin and thread are being brought into the active winding position and the detector 16 is being conditioned for normal operation on such thread. At this time, the thread extends substantially vertically from the detector to the end 142$^a$ of a guide notch 142. The rethreading of the hook 179 is effected by hooks 185 and 186 projecting laterally from an upright arm 187 (FIGS. 3, 24 and 25) fast on a rockshaft 188 which is journaled in spaced plates of a bracket 189 secured to the frame arm 26 just inside of the detector 16. A torsion spring 190 encircling the shaft normally holds the arm 187 in the upright position shown in full in FIGS. 3 and 24 as determined by a lug 191 on the bracket. In this normal position, the curved back surfaces of the hooks 185, 186 including a tail extension 192 of the lower hook are disposed in the path of the long leg 120 of the reserve thread next to be advanced to running position. In the ensuing indexing motion, this thread comes against the hooks (see the dotted position in FIG. 25) just before the positioning finger 115 is advanced by its cam 135 as above described. This carries the thread outwardly along the tail 192 and around the outer ends of the hooks after which the thread moves inwardly in front of and spanning the hooks to the position shown in dot-dash outline in FIG. 25.

Figure 25:
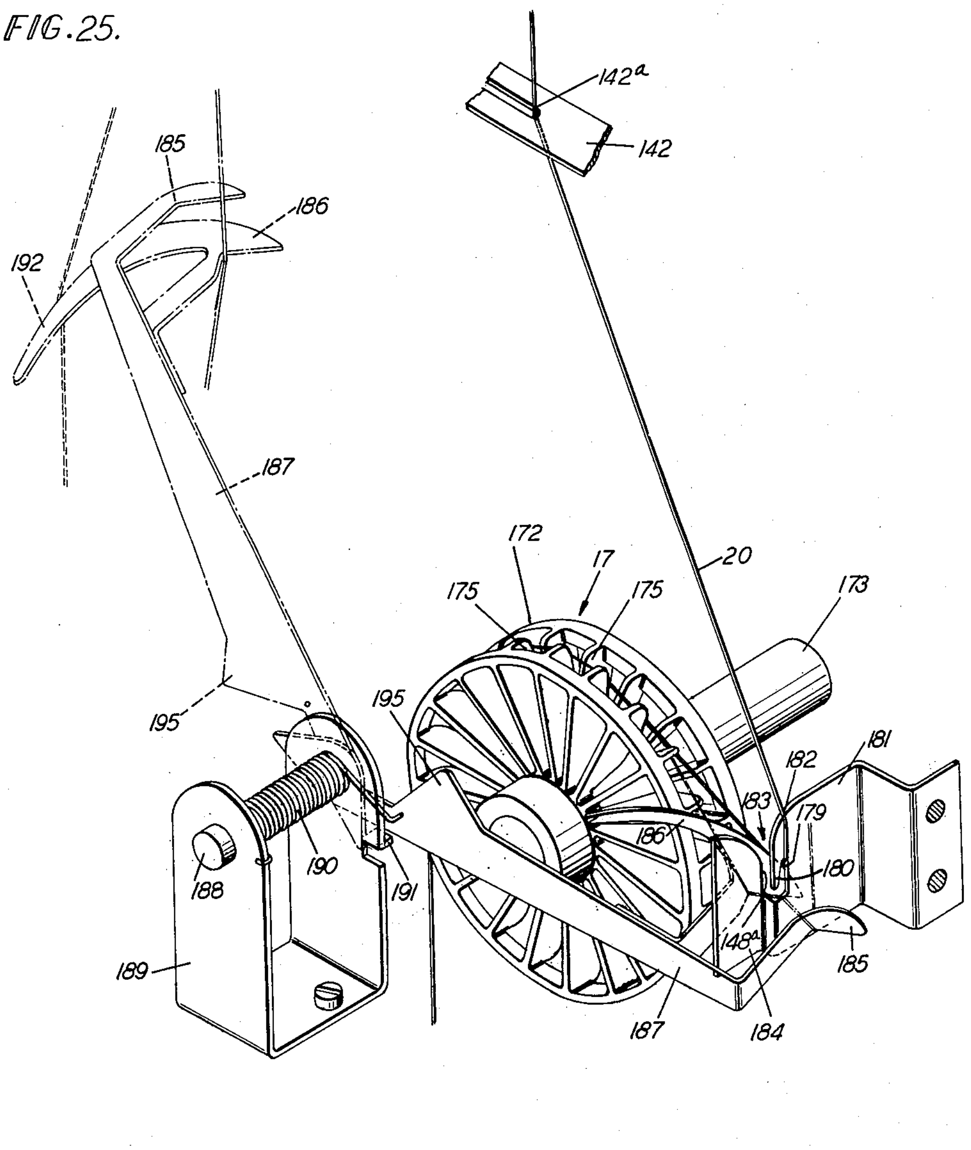
FIG. 25 is a fragmentary perspective view showing the tension reducer.

With the thread thus disposed, threading of the tension reducer is completed simply by swinging the arm 187 forwardly and downwardly to the horizontal position shown in full in FIG. 25. This is effected in the latter part of the indexing motion by a lobe 193 on a cam 194 which is fixed to the shaft 24 just above the level of the pivot of the arm 187 (FIG. 24). As the lobe is advanced, its tip rides under a lug 195 on the arm 187 and, after encountering the bottom of a notch therein, swings the arm forwardly and downwardly as indicated at $\mathbf{187^a}$ (FIG. 63), the thread being picked up at $\mathbf{187^b}$. Before the tip of the lobes passes laterally and off from the arm 187, the latter will have reached the horizontal position shown in FIG. 25. In approaching the latter, the hooks 185, 186 carry the intervening portion of the thread downwardly through the throat 183 and below the tip of the hook 179 whereupon the inner surface $\mathbf{184^a}$ cams the thread laterally and into the hook. After the lobe passes, the spring 190 returns the arm to its normal upright position against the stop 191.

*Knotter 18* (*FIGS. 3, 29 to 43*)

The standard weaver's knot 23 (FIG. 42) for uniting the trailing end of the running thread 20 and the leading end 21 of the next reserve thread includes a loop 280 in the running thread. The held end 274 of the reserve thread extends under the closed end of this loop, then under one leg of the loop 280 after which it passes over both of the legs to form a loop 279. The other leg of the latter loop extends above the second leg of the loop 280 crossing under the held end of the reserve thread and finally over the first leg of the loop 280. As a result, the desired locking effect characteristic of a weaver's knot is achieved.

The knot is tied instantaneously, that is, in about .005 to .015 of a second, following the sensing of a thread break by the detector 16. In general, this is accomplished by a loop forming bill 196 and a shearing bill 197 power actuated by a load and fire mechanism coacting with upper and lower clamps 199 and 200 for holding the running thread during tying of the knot, a shear 201 for cutting off the running thread adjacent the knot after the latter is tied, a finger 202 for shifting the positions of the threads in the course of the tying, a stripper 203 which removes the completed knot from the bills.

Figures 37, 38, 39, 40:
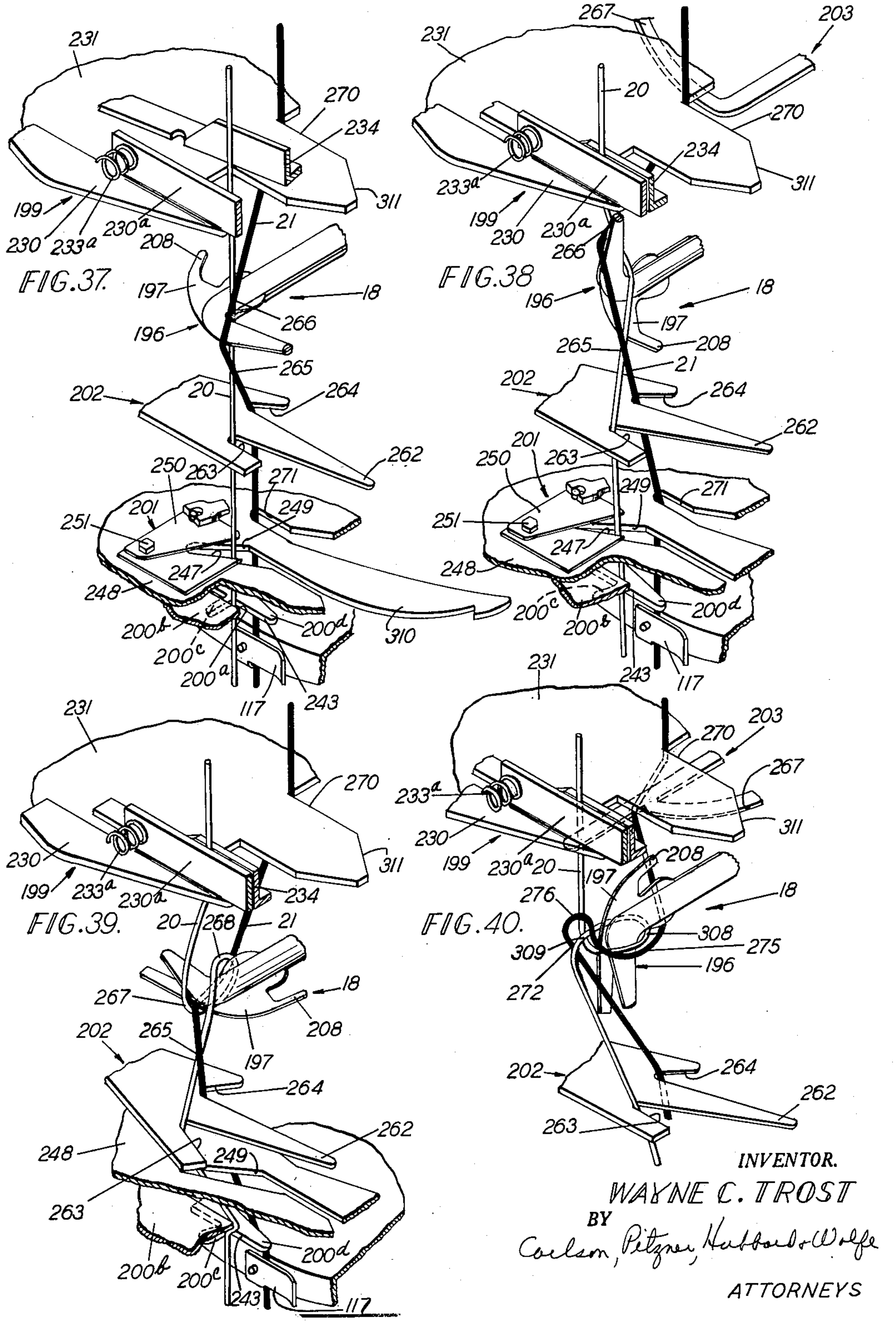
FIGS. 37 through 42 are fragmentary perspective views showing different steps in the formation of the weaver's knot.
Figure 41:
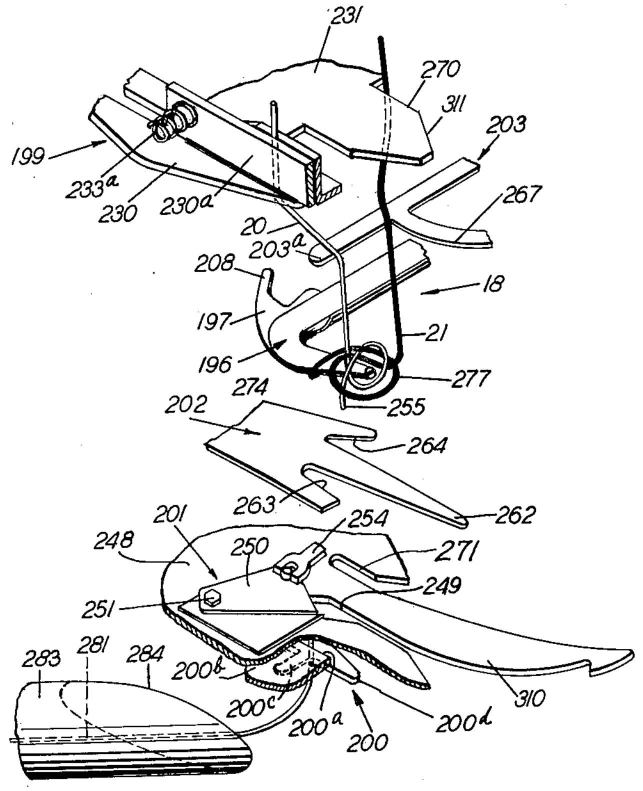

*Knotter bills*.—As in common practice in the art, the bill 196 comprises the short tapered legs of two L-shaped parts $\mathbf{196^a}$ and $\mathbf{196^b}$ (FIG. 30) joined by a band-like clip 207 and projecting rigidly from the outer end of a shaft 204 journaled intermediate its ends (see FIGS. 32, 33 and 51) in a bearing mounted on an extension 205 of the bracket 28 with the axis of the shaft lying on a radius of the main shaft 24. The bill $\mathbf{196^b}$ and the bill $\mathbf{196^a}$ are disposed at somewhat less than a right angle relative to the shaft 204 and their opposed flat sides provide a guideway in which the flat shearing bill 197 is disposed and swings about a pivot pin 206 at the heel of the bill. The bill spring $\mathbf{196^a}$ is flat and bent at $\mathbf{196^c}$ so as to press the shearing blade 197 against the bill $\mathbf{196^b}$ and provide a scissor-like action in gripping and severing the reserve thread (FIGS. 39 to 41).

The shearing blade 197 is stamped from resilient sheet metal with a narrow tail 208 disposed on the other side of the shaft 204 and inclined backwardly at an acute included angle somewhat less than that included between the shaft and the bill. An enlargement 209 integral with the heel of the blade extends along the shaft 204 and provides projecting follower lobes 210 which ride the internal heart-shaped surface 211 of a tubular cam 212 (FIG. 34) surrounding the shaft 204 and telescoping in a recess 213 formed eccentrically of the shaft. By adjusting the cam angularly in its mounting, the positions of the shaft at which the bills will be opened and closed may be varied to achieve proper timing in the operation of the knotter relative to the associated parts. The edge $\mathbf{197^a}$ of the bill 197 is sharpened so as to coact with the corresponding edge of the bill $\mathbf{196^a}$ in cutting off of the reserve thread as the knot is being tied. As in ordinary knotter constructions, the blade 197 coacts with the bill $\mathbf{196^b}$ to clamp and hold the severed end of the thread.

*Load and fire actuator*.—Turning of the knotter bills to form the knot instantaneously is effected by energy stored in a torsion spring 215 (FIG. 32) which is released or fired when a thread break occurs and is reloaded in the ensuing indexing of the main shaft 24. Herein the spring 215 is a helix coiled about an upright shaft 216 journaled at opposite ends in bearings on the frame brackets 27 and 29. The upper end of the coil is fastened to the hub of a pinion 217 loose on the shaft 216 and meshing with a larger spur gear 218 pinned to the main shaft 24 and holding the spring end fixed when the shaft is at rest. At its lower end, the spring coil is secured to the hub of the stripper 203 which is fixed to a bevel gear 219 pinned to the knotter shaft 216 and meshing with a beveled pinion 220 fast on the end of the shaft 204 opposite the knotter bills. Thus, when the shaft 216 is tripped from a normal set position, the energy stored in the spring is released thereby quickly turning the bills through about four revolutions while the shaft 216 is turning through a little more than one revolution before the stored energy is dissipated.

It is important, as will appear later, that after the knotter has been fired, the bills come to rest in the same position they occupy during normal operation of the winder. This is made possible by rewinding of the spring from its upper end during the ensuing indexing motion of the main shaft 24.

*Firing the knotter*.—During normal operation of the winder, the knotter shaft 216 and therefore the bills 196, 197 are latched in well defined positions in which the bills are disposed in proper relation to the running and reserve threads 20 and 21 for initiating the tying of the knot immediately upon release or firing of the knotter. Such holding of the shaft is effected in the present instance by latch 221 (FIG. 20, 45 and 47) whose laterally projecting lub 222 blocks the tip of an arm 223 fast on the knotter shaft 216 just above the bracket 27. The latch is fulcrumed on a pin 224 on the bracket 27 and its tip normally projects into engagement with a shoulder 225 on a detent 226 pivoted at 227 and urged toward the latch finger by a spring 228.

When the detector shaft 150 above described is in normal rest position (FIGS. 20 and 45), a notch 229 thereon is presented to the tip of the detent 226 allowing the latter to move inwardly far enough for the shoulder 225 to block the latch 221. Then, when the detector senses a thread break and allows the shaft 150 to turn as above described through about a quarter revolution to the position shown in FIG. 47, a cam formed by the bottom of the notch 229 moves the detent 226 away from the tip of the latch 221 thus releasing the latter for swinging clockwise (FIG. 20) under the torque exerted by the knotter spring 215. The lug 222 is thus carried out of the way of the arm 223 freeing the latter for rapid rotation until the energy stored in the actuator spring 215 is dissipated, this being in a little more than a revolution of the knotter shaft 216.

In such swinging movement, the latch 221 engages and actuates a switch 290 and comes against a stop 291 (FIGS. 20 and 47) fixed to the frame bracket 27. As above described, the switch energizes the solenoid 79 to initiate the indexing of the bobbin magazine.

When the knotter shaft is latched in normal rest position (FIG. 45), the knotter bills 196, 197 are substantially closed and disposed horizontally (FIGS. 29, 31) and project generally tangentially of the circular path (see FIG. 51) traversed by the reserve thread during indexing but in a direction opposite to this motion. Upon firing of the knotter, the bills swing upwardly and then continue for about four revolutions counterclockwise (FIG. 29) and through the successive positions shown in FIGS. 37 to 43. Since the knot is tied and stripped from the bills in the first revolution, the bills turn idly in the succeeding revolutions.

*Thread clamps and actuation thereof (FIGS. 29, 32, 33, 37–42)*

Immediately upon firing of the knotter, the running thread 20 is gripped by the lower clamp 200 a short distance below the knotter bills and then by the upper clamp 199 which is disposed above the bills. The intervening portion of the thread is thus held taut during the tying cycle. The upper clamp is of the yieldable pincher type so as to grip the thread firmly while permitting the same to slip downwardly therethrough as an additional length of the running thread is needed in the course of forming the loops of the knot. For this purpose, the clamp comprises a yieldable jaw 230[a] in the form of an upturned flange on a blade 230 resting on top of a plate 231 on top of the bracket 28 and fulcrumed on a pin 232. A yieldable backing in the form of a compression spring 233[a] normally urges the jaw to the right to a position (FIGS. 29 and 33) determined by the slack in a pin and slot connection 233.

A flange 234 forming the movable jaw of the clamp lies along the right edge of the guide notch in the plate 231 and is formed on one arm of a U-shaped yoke 235 also fulcrumed on the pin 232 to swing across the top of the plate. Such closing and opening of the clamp 199 to grip and release the thread occurs at 236 and 237 (chart FIG. 62) in the cycle of the knotter shaft 216 and is produced by a groove 238 (FIG. 36) on a cam disk 239 fast on this shaft. The cam follower is on one end of a lever 240 fulcrumed at 241 and coupled at its other forked end to a roller 242 on the yoke 235.

The lower clamp 200 is of the overlapping blade type comprising the edge 200[a] (FIG. 33) of a horizontal plate 200[b] fixed to the bracket 28. Underlying this edge is a lug 200[c] projecting laterally from the edge of a blade 200[d] formed as an extension of the lower arm of the yoke 235. This clamp is thus closed on the thread at 236[a] (FIG. 62) prior to the gripping action of the upper clamp. It is opened at 237[a] by the cam 238 along with the upper clamp 199, the blade edge 243 moving past and beneath the fixed edge 200[a] to bend the thread around the coacting edges whereby to grip the same firmly while permitting some upward slipping if necessary during tying of the knot.

The openings defined between the jaws of the two clamps when open are alined vertically with a notch 244 in stationary plate 231 and a guide edge 245 (FIG. 29) on the plate 200[b] facing circumferentially of the path of the indexing so as to receive the portion 120 of the first reserve thread as the latter is advanced into active running position during such indexing.

*Shear 201 for the running thread.*—This device (see FIGS. 29, 33 and 37) which severs the running thread immediately below the loop forming bill comprises a knife edge 247 on a blade fixed to a guide plate 248 and lying alongside the closed end portion of a throat 249. The edge 247 by which the thread is guided into active winding position, coacts with an overlying blade 250 fulcrumed at 251 and normally inclined away from the edge 247 to permit the running thread to enter between the edges of the shear. At 252 (chart FIG. 62), a cam groove 253 (FIG. 36) on the disk 239 rocks a lever 254 to the position shown in full in FIG. 41 thus engaging and shearing off the thread leaving only a short end 255 projecting below the knot 23.

*Positioning finger 202 and actuation thereof*

Figures 35, 36:
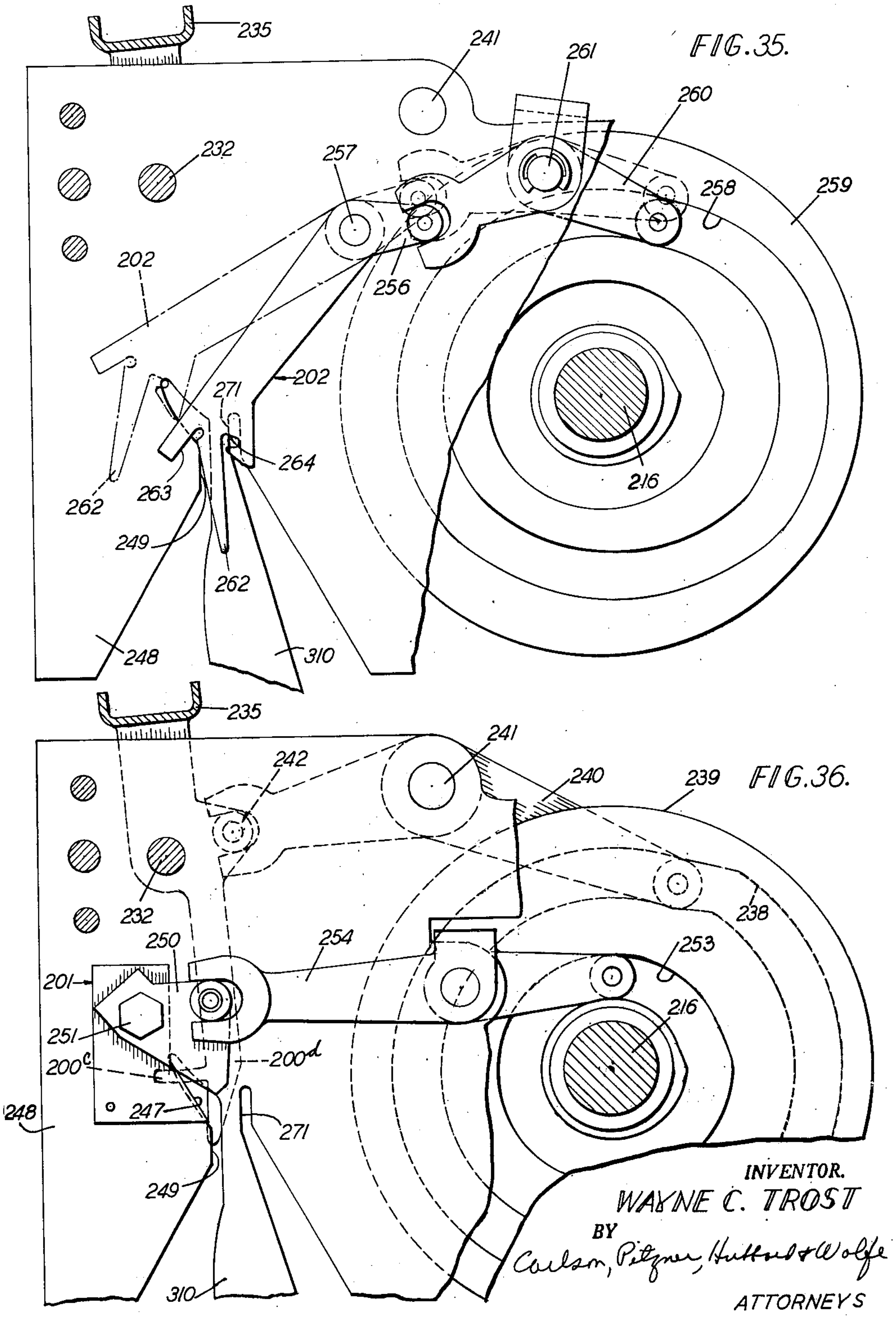
FIGS. 35 and 36 are fragmentary sectional views taken respectively along the line 35—35 of FIG. 32.

As shown in FIGS. 29, 33, 35 and 37, this finger is disposed between the guide plates 231 and 248 and comprises the elongated end of a lever 256 (FIG. 35) fulcrumed at 257 on the bracket 28 to swing horizontally between the normal and actuated positions respectively shown in full and in phantom in FIG. 35. These back and forth motions occur in the course of the tying cycle and are produced by a groove 258 on the cam disk 259 fixed to the knotter shaft 216 immediately above the disk 239. A follower roller riding the grove is on one end of a lever 260 fulcrumed at 261 and forked at the opposite end to receive a roller on the short arm of the lever 256.

Figures 29, 30:
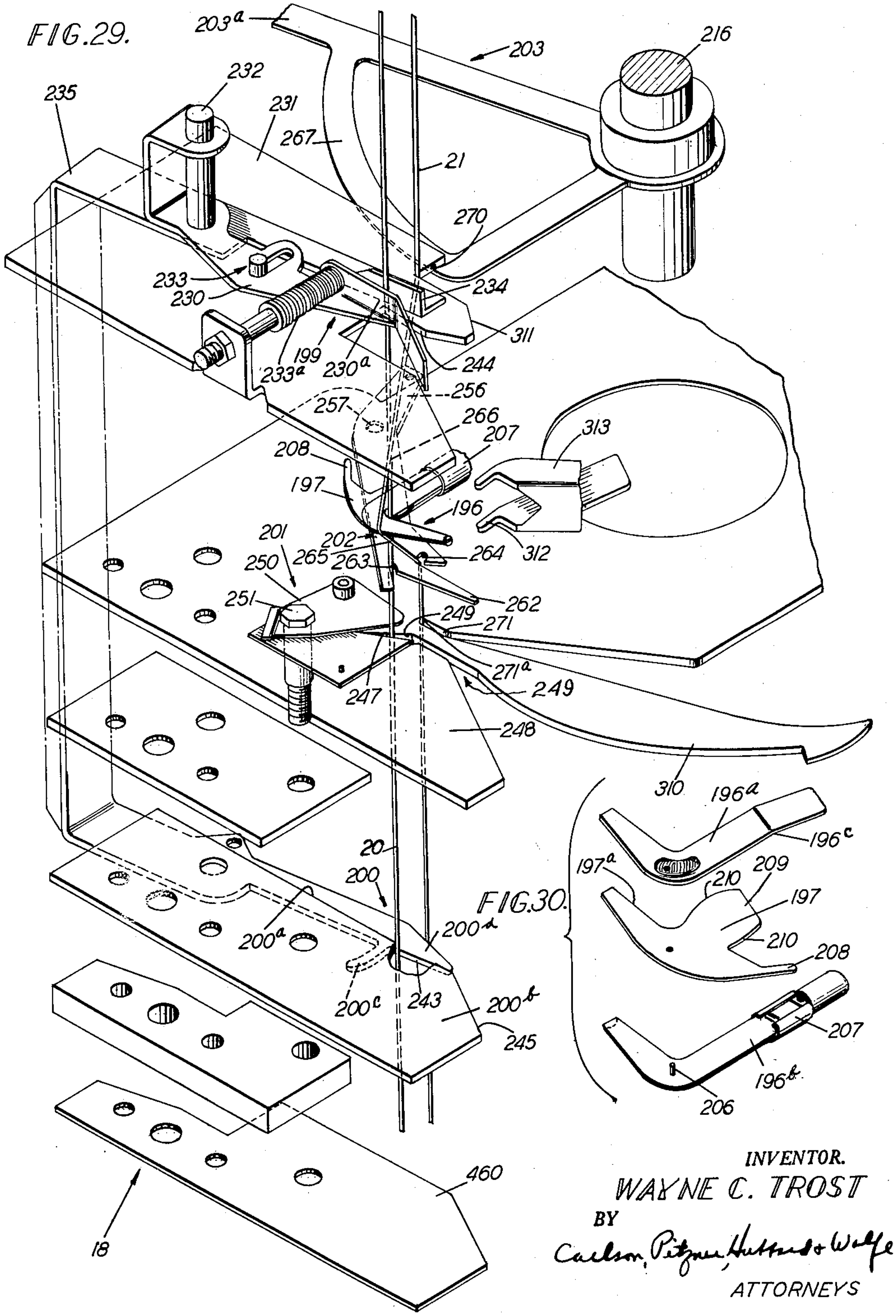
FIG. 29 is a fragmentary exploded perspective of the knotter parts.
FIG. 30 is a perspective view of the knotter bills.

The free end of the finger 202, which is disposed substantially tangent to the path of indexing of the running and reserve threads is formed to taper sharply to a tip 262 which projects in a direction opposite to the indexing. The left side of the projection merges with and guides the running thread into the bottom of a notch 263 disposed on the straight line of the running thread 20 which as shown in FIG. 29 is disposed in the apex of the V defined by the knotter bills and their supporting shaft. In a similar way, the leading end portion of the reserve thread 21 is guided along the other side of the tip 262 of a projection 202 into the rounded bottom of a notch 264 which is spaced inwardly from the running thread so that the reserve thread 21, when seated in the notch 264 and extended upwardly and around the outer side of the knotter bills, crosses the running thread at 265 and 266 and is disposed close to the latter.

*Knot stripper (FIGS. 29–33, 40 and 41)*

Figures 31, 32:
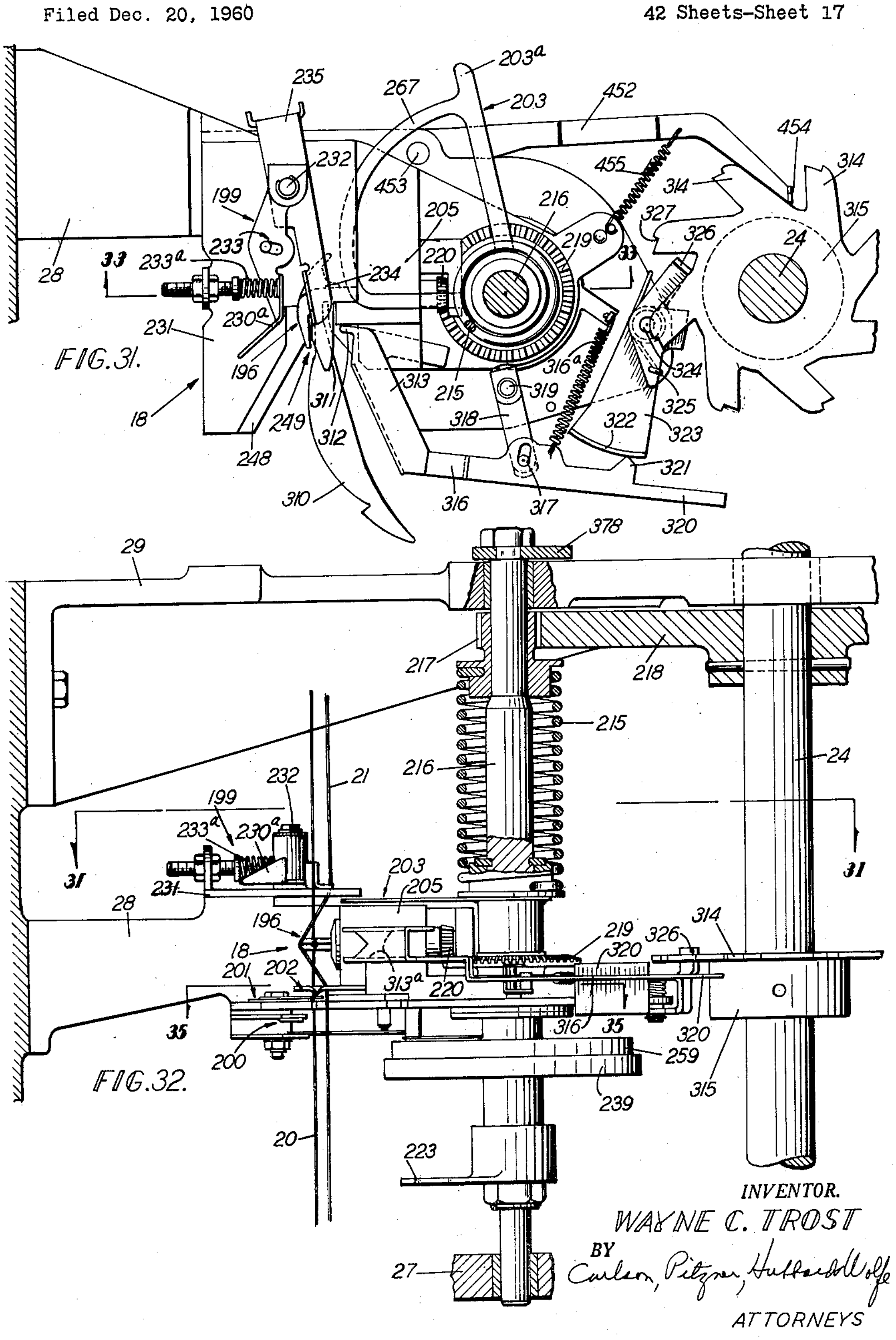
FIG. 31 is a plan section of the knotter taken along the line 31—31 of FIG. 1 and of FIG. 32.
FIG. 32 is a fragmentary side view of the knotter with parts broken away.
Figure 42:
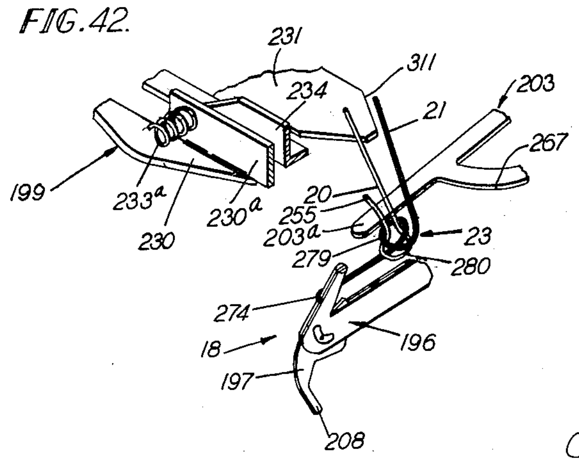

After the knot has been completely formed, the running thread has been cut off, and the excess of the reserve thread is being cut off by the knotter bills, provision is made for stripping the knot off from the bills 196 and 197 and freeing the adjacent loop from the upper guides and clamp. This is accomplished by a finger 203[a] on the stripper 203 projecting outwardly from the trailing edge of a segment 267 whose hub is fast on the knotter shaft 216 immediately below the upper guide plate 231 (FIG. 32). As the shaft turns counterclockwise from the normal rest position shown in FIG. 31, the segment swings with the shaft and at the proper point in the tying cycle, the outer edge of the segment cams the reserve thread laterally into the path of the tail 208. Shortly thereafter as indicated at 278 (FIG. 62), the tip 203[a] of the stripper engages both the running and reserve threads 20 and 21 above the bills and moves these threads and the partially formed knot 23 carrying them outwardly and away from the upper clamp 199 and guide plate 231 as shown in FIG. 42.

*Operation of knotter (FIGS. 29, 37–43 and 62)*

Figure 33:
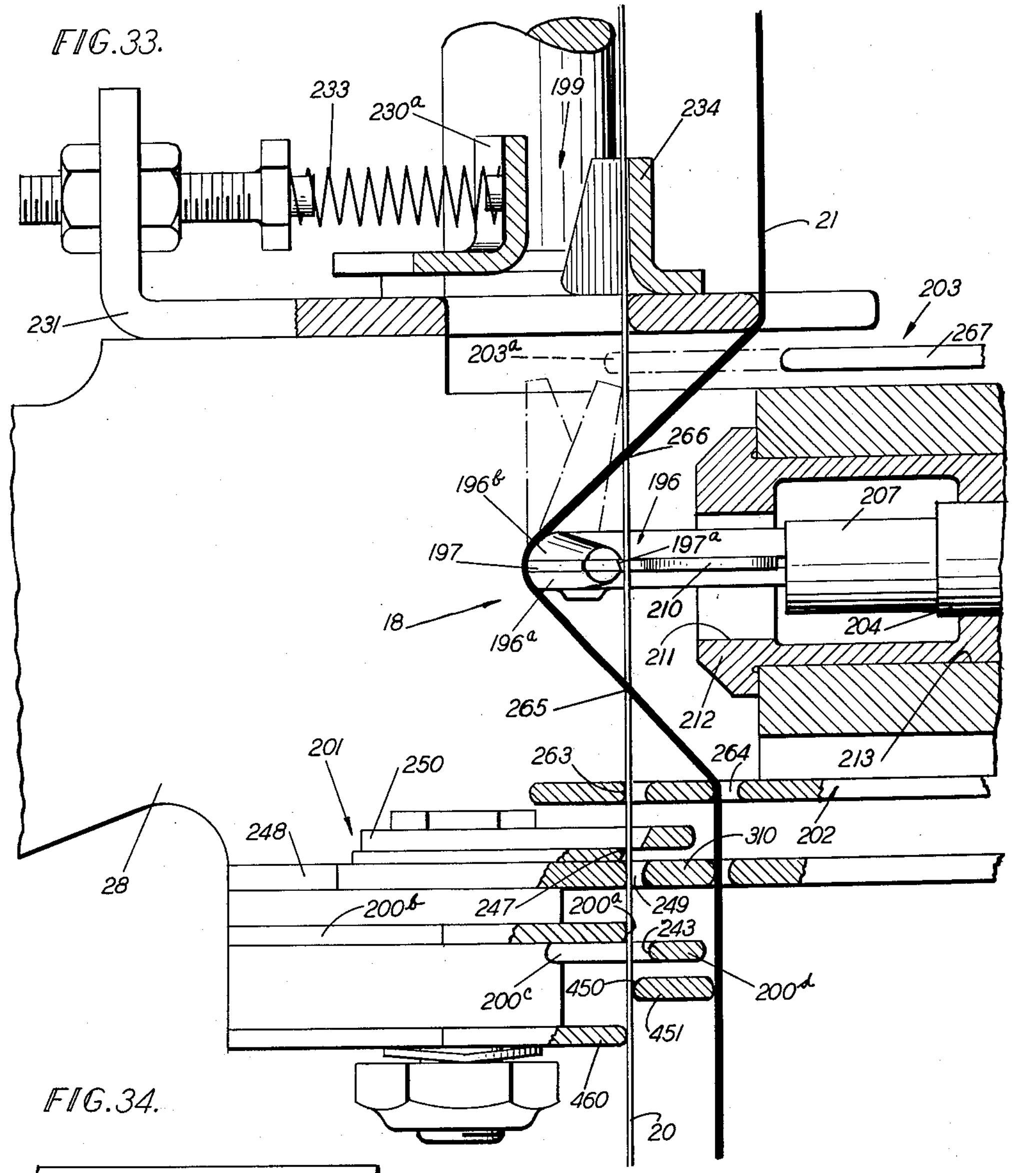
FIG. 33 is an enlarged fragmentary section taken along the line 33—33 of FIG. 31.
Figure 34:
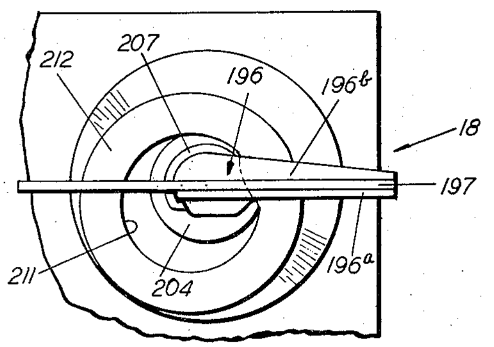
FIG. 34 is a face view of the knotter bills and the cam for actuating the same.

During normal winding of a thread off from the bobbin in active position and onto the cheese, the thread extends in a straight vertical line between the lower and upper stationary guides 248 and 231 and is disposed as shown in FIGS. 29 and 33 between the jaws of the lower clamp 200, near the bottom of the guide notch 249, in the bottom of the notch 263 of the positioning finger 202, inside of and therefore out of contact with the heels of the knotter bills 196 and 197, and between the jaws of the upper clamp 199. At the same time, the leading end 21 of the next reserve thread is disposed close to and in front of the running thread, being stretched lightly between its supporting flange 116 (FIG. 3) and the clamp 117. Thus, it extends downwardly as shown in FIGS. 29, 31, and 37 through a notch 270 in the upper guide plate 231 and adjacent the stripper segment 267 and then bends laterally across and adjacent the running thread at 266 and around the outer side of the knotter bills adjacent the heels thereof. Then this thread is bent reversely beneath the bills and recrosses the running thread at 265 as it is led into the bottom of the notch 264 in the positioning finger 202. From the latter, the thread extends vertically down through the bottom of a guide notch 271 in the plate 248. By bending the reserve thread to form the crosses 265 and 266, the running thread 20 may travel through the knotter in the desired straight line.

Upon firing of the knotter as described above, the shaft 216 turns counterclockwise as viewed in FIG. 29 through a little more than one revolution as determined by the stressing of the spring 215. During this revolution, the knotter bills turn through four revolutions and operate to tie the knot 23 in their first revolution as illustrated in FIGS. 37 to 42. Early in the first revolution, the movable jaws 200$^d$ and 234 of the clamps 200 and 199 are actuated successively as indicated at 236$^a$ and 236 (FIG. 62) to grip the lower portion against the jaw 230$^a$ (FIG. 38), so as to leave the intervening portion of the thread taut but free to slip through the clamp during formation of the knot. The latter thus shifts the thread to the left to a well defined position for properly locating the thread crossing 266.

As the bills swing upwardly from the horizontal rest position, they come against the cross 266 and spread the intervening portions of the threads somewhat apart as the first quarter revolution is completed as shown in FIG. 38. At this time, the tip of the tail 208 will be disposed to the right of the lower cross 265. As the turning continues, the bill tips pass over the cross 266 and into the V above thus drawing the cross downwardly to form a loop 267 in the running thread as permitted by slipping of the thread through the lower clamp.

In completing the first half revolution (FIG. 39), the tail 208 passes to the right of the lower cross 265 and cams the latter to the left as the cross slides inwardly along the outer edge of the tail. At this time, the portion of the running thread adjacent the loop 267 will be looped upwardly and over the heel of the bills on the inside of the heel as indicated at 268. The thread then extends downwardly ahead of the loop 267 and behind the reserve thread.

Early in the cycle as indicated at 307 (chart FIG. 62), the positioning finger 202 is shifted by its cams 258 to the left and to the position shown in FIG. 38 and in phantom in FIG. 35. This shifts the lower part of the running thread to the left into the shear 201 and out of the path of the knotter bills. The adjacent portion of the reserve thread is thus positioned for entry between the bills 196 and 197 as the latter approaches the three quarter revolution position (FIG. 40). Before reaching this position, the shearing bill 197 is swung outwardly as indicated at 269 (FIG. 62) by the cam 211.

In the third quarter revolution, the loops 267 and 268 are formed into a single loop 308 encircling the heel of the knotter bills and crossing at 309. The reserve thread extends downwardly behind the shank of the bills, then upwardly in front of the bill 196 over the running thread and finally across the latter at 272 and downwardly between this thread and the loop 308 therein. Thus, the reserve thread is shaped into two loops 275 and 276.

By this time, the outer edge of the stripper segment 267 will have engaged the reserve thread and cammed the same laterally beneath the plate 231 as shown in FIG. 40 and far enough to place the upper part of the thread in the path of the tip of the tail 208. In the continued turning of the bills, the curved outer edge of the tail cams the thread to the left from the position shown in FIG. 40 and outwardly around the heel of the knotter bills. As a result, the loops 275 and 276 are converted into a single closed loop 277 (FIG. 41).

During this same turning beyond the position shown in FIG. 40, the lower part of the reserve thread enters between the bills 196 and 197 which become closed at 273 (FIG. 62) to sever the thread but to grip and hold the end as indicated at 274 (FIG. 41) as the bills complete the first revolution. About this same time, the shear blade 250 is actuated by its cam 253 as indicated at 252 (FIG. 62) thus severing the running thread just below the loop 308. The cut off end remains held in the clamp 200 and its loose end is sucked away and disposed of in a manner to be described later.

In the fourth quarter revolution of the bills, and after the two loops 275, 276 of the reserve thread are combined into the closed loop 277, the latter becomes interlocked with the previously formed loop 308 in the running thread. By this time, the tip 203$^a$ of the stripper 203 will have passed beneath the upper clamp 199 and engaged both the reserve and running threads as shown in FIG. 41 thus starting to carry the threads forwardly and shift the loop 308 outwardly along the bills and past the held end 274 as the latter is drawn through the loop 308 and around and behind the running thread. In its continued advance, the stripper rolls the partially formed knot outwardly and off from the tips of the bills illustrated in FIG. 42. The end 274 remains held by the bills thus tightening the previously formed loops into the forms indicated at 279 and 280. While the reserve thread remains held by the bills as shown in FIG. 42, the loops 279 and 280 are contracted and tightened into the final knot as the stripper continues past the knot and out of engagement with the threads. The knot is thus formed and stripped off from the bills about the time that the slack of the loop 22 has been taken up by continuance of the winding during the knot-tying cycle.

*Disposal of cut-off threads (FIGS. 3, 41, 43 and 48)*

The end 281 (see FIGS. 41 and 43) which is cut off from the broken running thread 20 by the shear blade 250 in the knotter cycle and the end 282 which remains held by the clamp 117 after the reserve or new running thread has been severed by the knotter bills are sucked away through a stationary tube 283 connected to a suitable vacuum system. The mouth 284 of the tube faces toward and is disposed adjacent the knotter and therefore in a position to receive the loose ends at the times of their cut off or release.

Herein, a power driven blower 285 (FIG. 48) is mounted on the machine frame with its inlet communication with a duct 286 having branches 287 connected to the suction tubes 283 of a plurality of the winding units which may be arranged side by side. Preferably the mouths 284 of the tubes for any winding unit are located between the disk 124 and below the knotter 18 and substantially opposite the clamp 117 holding the free end 282 of the reserve thread. In this position, the tube mouth is in close proximity (see FIGS. 3 and 41) to the shear 250 that upon operation of the latter in each knotter cycle as above described, the cut off end 282 will be sucked into the tube and thus disposed of.

Figures 43, 44:
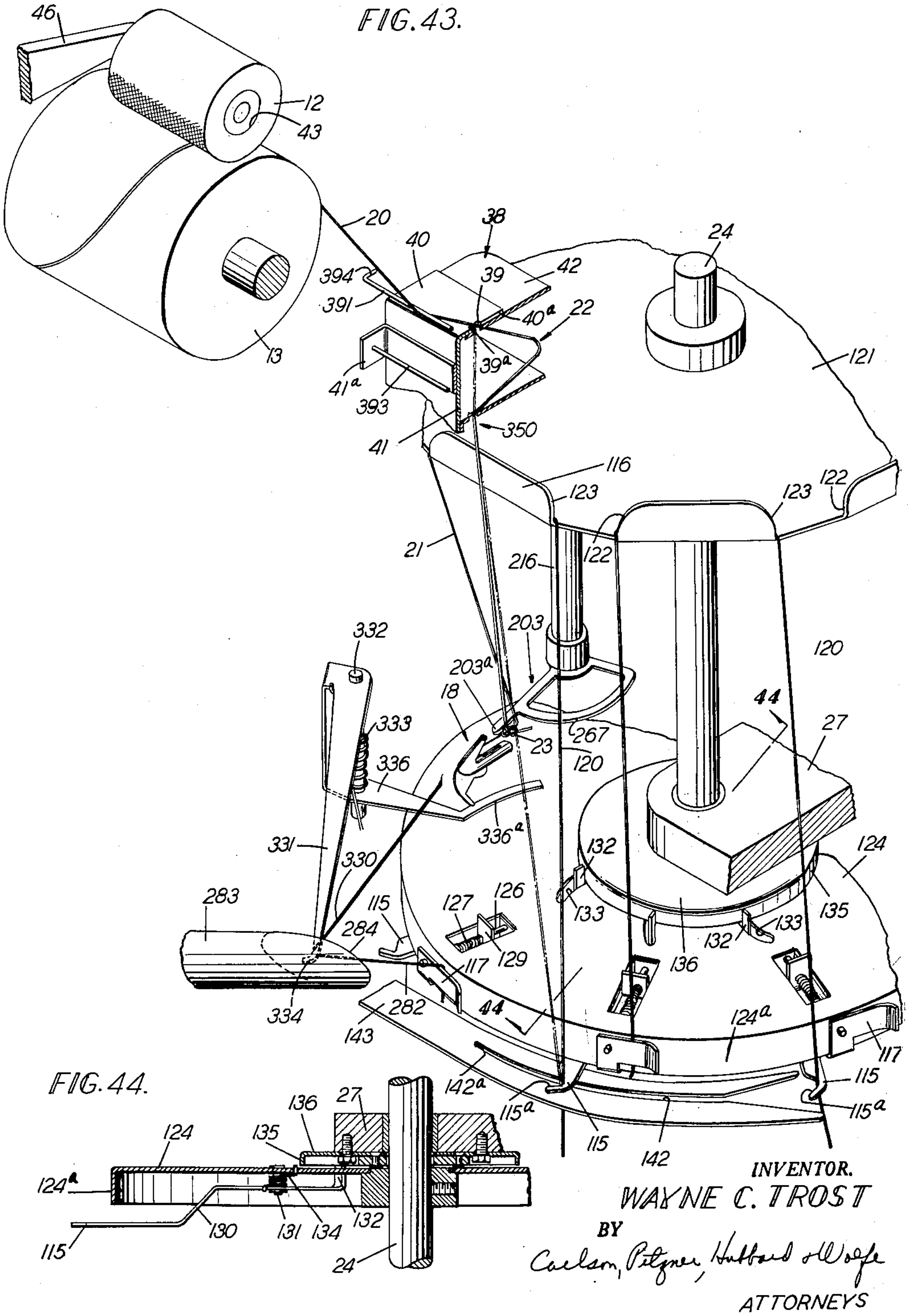
FIG. 43 is a partial perspective view of the knotter and associated parts while the completed knot is being stripped off from the knotter bills.
FIG. 44 is a fragmentary section taken along the line 44—44 of FIG. 43.

In this location of the tube mouth 284 it will be evident that upon severance of the reserve thread by the shear blade 250, the cut off portion of this thread will be sucked into the tube as shown in FIG. 43. While the other end is still held in the clamp 117 in which it is positioned manually during the initial hanging up of that portion of the thread. Opening the clamp 117 and thus permitting the cut off part of the reserve thread to be disposed of is effected by the stationary cam 128 (FIGS. 4, 6, and 46) which as above described, has an end 128$^a$ disposed in the path of the upstanding tab 129 so as to cam the clamp 117 outwardly and release the held portion of the reserve thread long enough to allow the latter to be sucked into the tube 283.

If desired, the vacuum producing apparatus may be utilized to remove lint from various parts of the winder. For example, branch inlets 289 (FIG. 48) may be extended from the pipe 287 to a position adjacent the bobbin pocket 14 disposed in the winding position. The running thread thus moves past the mouth of the inlet 289 which sucks away lint which might otherwise interfere with the proper operation of the detecting and tying mechanism.

*Positioning and resetting of knotter parts after firing (FIGS. 20, 45 and 47)*

Figure 47:
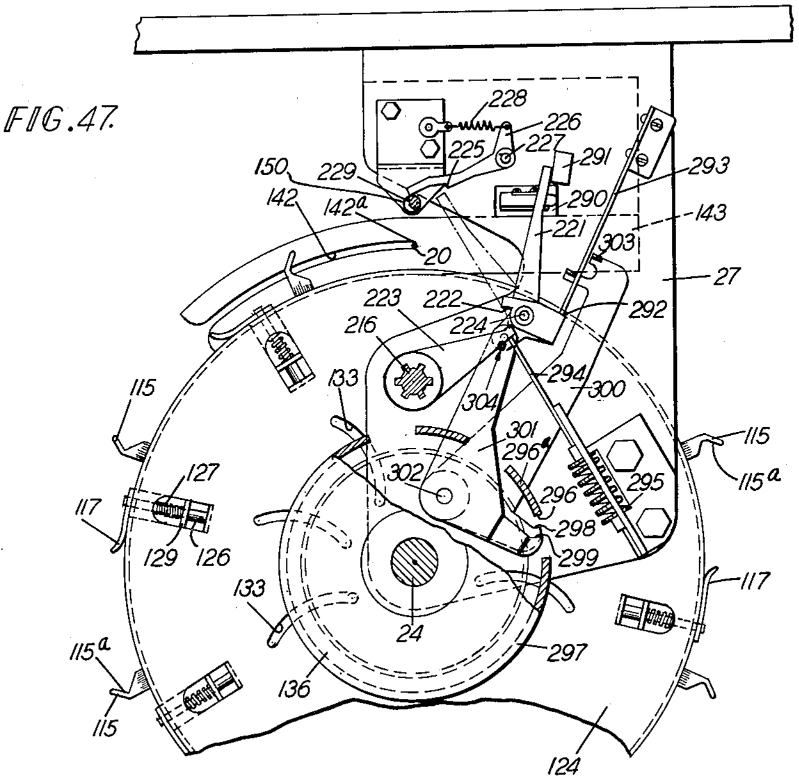
FIG. 47 is a view similar to FIG. 45 but with the parts shown in tripped position.
Figure 48:
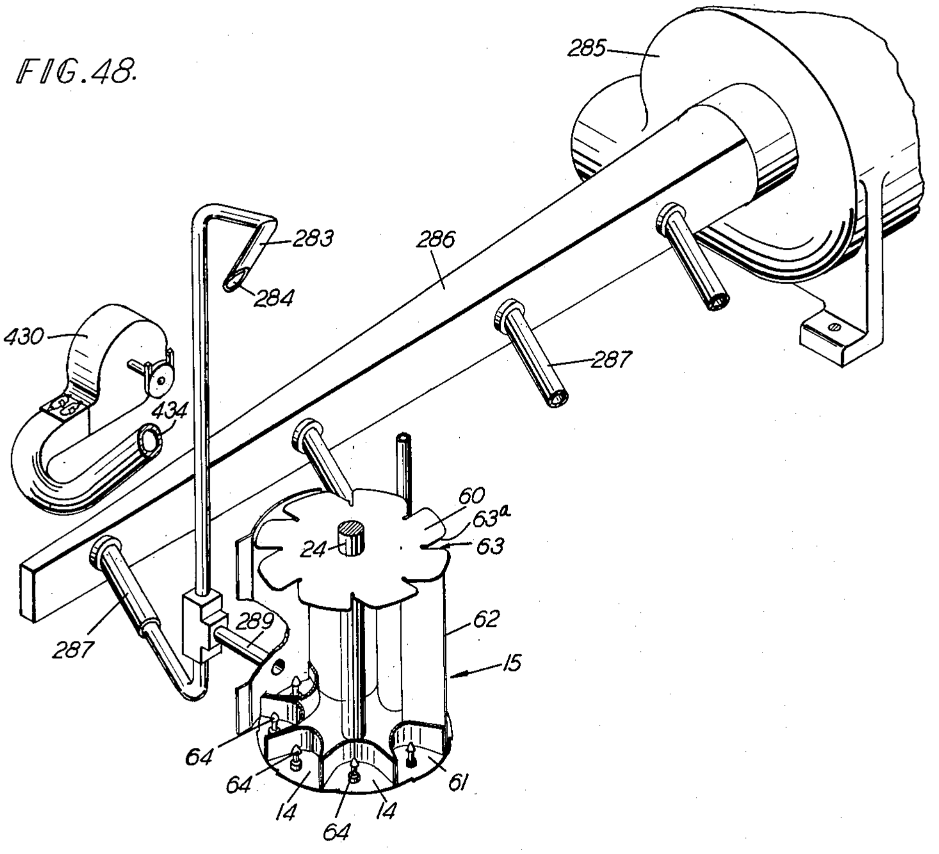
FIG. 48 is a fragmentary perspective of the exhaust and blower systems.

As described above, the knotter and its associated parts are held set in normal running position by the latch 222 which, when released by withdrawal of the detent 226, releases the arm 223 and the knotter shaft 216 as indicated at 223$^a$ (FIG. 63) for turning by the energy stored in the spring 215, the latch being swung onto the switch 290 and against the stop 291 (see FIG. 47). Closure of the switch energizes the solenoid 79 and initiates an indexing motion of the main shaft 24 as previously described. In the swinging of the latch toward and against the stop 291, a lug 292 projecting from the side of the latch opposite the lug 222 bends a leaf spring detent 293 out of the way and passes this detent which, as the latch reaches the stop 291 drops in behind the lug 292 as shown in FIG. 47. The latch is thus held out of the way of the arm 223 during the ensuing automatic positioning of the knotter shaft in the final part of the knotter cycle.

Provision is made for arresting the motion of the knotter shaft 216 after its release in a predetermined angular position which, for reasons to appear later, is approximately the same as the position which the shaft occupies when it has been reset and the actuating spring 215 re-energized preparatory to firing in the next knot-tying cycle.

Figure 45:
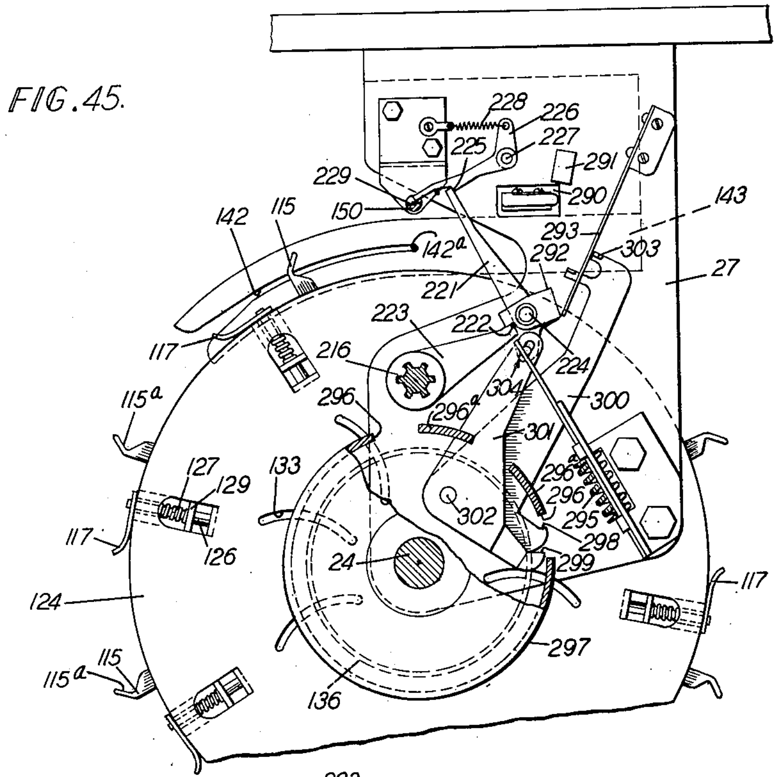
FIG. 45 is a section taken along the line 45—45 of FIG. 2.

Under the influence of the spring 215, the shaft 216 continues to turn through somewhat more than a full revolution during which the spring is completely unwound, the turning continuing until the inertia of the parts has been absorbed by reverse winding up of the spring. By this time, the end of the arm 223 will have passed by the laterally yieldable end of a stop 294 normally positioned as shown in FIG. 45 but slidable endwise on the frame against the action of a buffer spring 295. Under the reverse stress imparted to the knotter spring 215, the arm 223 is swung in a clockwise direction and comes to rest against the end of the stop 294 (FIG. 45) which acts not only as a cushion but also serves to position and hold the knotter shaft and the arm 223 in substantially the same positions they occupy when the actuator spring 215 is wound up and the set position of the shaft is determined by the latch lug 225 (FIG. 45) preparatory to the next firing of the knotter.

Resetting of the load and fire mechanism is effected in the ensuing indexing of the main shaft 24 with which, as set forth above the shaft turns continuously in a direction to rewind the spring 215 from the upper end of the latter. As above described, the indexing is initiated by closure of the switch 290 by the latch 221 as the latter reaches the stop 291. Closure of the switch serving to energize the solenoid 79 (FIG. 13). The resetting, which involves the release of the leaf spring detent 293 and swinging of the latch 221 back past the shoulder 225, is effected by the cam action of angularly spaced shoulders 296 (FIGS. 24, 45 and 47) on the downturned flange 296$^a$ of a cam disk 297 fast on the main shaft 24. Each shoulder engages successively with the tips 298 and 299 on the short arms of bell cranks 300 and 301 swingable about a pivot 302 mounted on the frame bracket 27 adjacent the shaft 24. The long leg of the bell crank 300 projects outward and radially and has lugs 303 at its outer end straddling the leaf spring 293 near the free end thereof. A similarly projecting but shorter arm on the bell crank 301 is coupled through a pin and slot connection 304 to an arm 305 rigid with the latch 221 and projecting beyond the pivot 224 thereof. In the released position of the knotter latch 221, both of the bell crank tips 298 and 299 are disposed in a notch of the cam flange 296$^a$ and thus are adapted for engagement by the next cam shoulder 296.

In the initial part of the indexing motion, a shoulder 296 picks up the tip 298 and rocks the bell crank 300 clockwise at 293$^a$ (FIG. 63) thus releasing the detent 293. Shortly thereafter, the same cam shoulder engages the tip 299 of the bell crank 301 and rocks the latter and the latch 221 counterclockwise as indicated at 221$^a$ (FIG. 63) to carry the tip of the latch back past the shoulder 225 to the position shown in phantom in FIG. 47. The lug 222 on the latch is thus returned to a position for blocking the tip of the knotter release arm 223 before a substantial rewinding of the spring 215 takes place. The arm does turn away from the end of the stop 294 as indicated at 223$^b$ before the latch lug 222 reaches its final position but is swung back immediately as indicated at 223$^c$ (FIG. 63) as the cam 296$^a$ passes over the tip 299. Finally, when the cam rides off from this tip releasing the lever 301, the latch 221 will be swung clockwise under the action of the rewound spring 215, the tip of the latch coming against the shoulder 225 of the trip detent 226. By this time, the latter will have moved back to normal position as permitted by complete resetting of the thread break detector 16 and the turning of its shaft 150 to again present the cam notch 229 to the detent 226 as shown in FIG. 45.

It is important to note that after firing of the knotter in response to the sensing of a break in or exhaustion of the running thread, the shaft 216 and all of the knotter parts come to reset against the end of the stop 294 in substantially normal winding position in which the shaft is positioned by the shoulder 225 and thus set for instantaneous action in tying a new knot. In this position, the knotter bills and other parts involved in tying a knot are so positioned as not to interfere with the proper positioning of the running and reserve threads in the fired knotter during the indexing motion which takes place following manual threading up of the winder and restarting of the winding as will be described later.

Such positioning of the knotter shaft is made possible by reloading or winding up the spring as described above from the end opposite that from which the stored energy is delivered upon firing of the knotter. By selecting the proper ratio of the gears 217 and 218 (FIG. 32) the desired number of turns will be imparted to the upper end of the spring 215, and the latter will be wound up and stressed to the extent necessary for firing of the knotter in the desired short interval.

It will be observed that in firing the knotter, the detector first acts on the trip detent 226 and the latter then releases the latch 221 which in turn fires the knotter. Such use of an additional latching device, that is, the detent 226 is desirable in that the stress in the knotter spring 215 (FIG. 32) may be adjusted as desired without affecting the sensitivity of the thread break detector 16.

*Positioning the new running thread in the knotter (FIGS. 29–33, 45–47, 49–53)*

The instantaneous joining of the broken thread and the next reserve thread by the weaver's knot 23 is made possible by holding these threads in the double crossed relation as above described and therefore in readiness for immediate operation of the knotter bills thereon as soon as a thread break is detected. Then, after a new knot is tied, the new running thread or in other words the long leg 120 of the first reserve thread and the leading end 21 of the next reserve thread are placed in this same double crossed relation (FIGS. 29 and 32) with respect to the knotter bills. This is accomplished in the ensuing indexing of the bobbin magazine during which the first reserve bobbin is transferred into active winding position and the succeeding bobbin into the reserve position.

For an instant after completion of the knotter cycle in the manner above described, the newly tied running thread will include two slack portions, one being that portion of the slack loop 22 (FIG. 43) which is not taken up fully and wound onto the cheese during the knotter cycle. The other loop includes the knot 23 and the adjacent portions of the old and new running threads. As shown in full in FIG. 43, this loop hangs downwardly from the leading edge of the guide flange 116 which supports the unwound thread of the bobbin to be indexed to active winding position.

Figure 55:
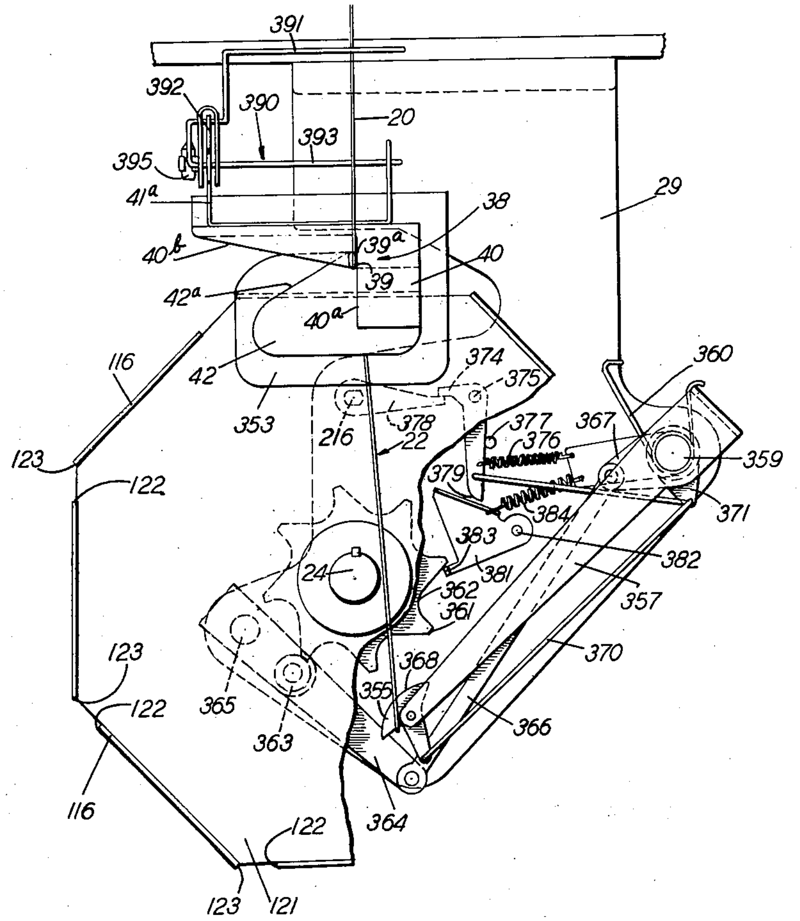
FIG. 55 is a plan view of the slack loop forming mechanism.

As the slack in these loops is taken up by the winding, enough tension is developed due to the drag imposed by the gripper 166 (FIG. 3) to cause the thread to ride up and over the trailing end 123 of the guide flange 116. At this time and before the indexing motion starts, the thread will become taut and extend upwardly in a straight but forwardly inclined line from its finger 115 to the upper guide 38 as shown in phantom in FIG. 43. It will be observed from FIG. 19 that the guide 38 is alined vertically with the axis of the active bobbin and is radially spaced outwardly beyond the supporting flanges 116 (FIG. 55).

With the new running thread held taut and in a definite position determined by the positioning hook 115 and the guide 38 (see FIG. 43) it will be carried into proper association into the knotter in the ensuing indexing motion. That is to say, the thread is spaced outwardly far enough to pass the outer side of a guide finger 310 and be led thereby into the throat 249 (FIGS. 29, 49 and 51) and then in narrowed closed end portion thereof adjacent the stationary shear blade 247. The finger 310 is disposed between the shear 201 and the lower clamp and is formed integral with the plate 248. As shown in FIGS. 29, 31 and 49, its inner arcuate surface is concentric with the index axis and its tip is disposed at a radius greater than that of the clamps 117 but shorter than that of the positioning finger 115.

Early in the indexing of the shaft 24, the follower 132 (FIG. 46) rides off from the cam 135 allowing the spring 134 to swing the positioning finger 115 forwardly as indicated at $115^b$ (FIG. 63) and shown in dot-dash outline in FIG. 49, far enough as determined by the stop 139 to carry the running thread quickly to the winding position at the closed end $142^a$ of the slot 142 (FIGS. 43 and 50). By thus advancing the running thread ahead of the indexing motion, it is carried out of the way of the oncoming leg 120 of the reserve thread thus allowing more of the indexing time in which to perform the more complicated functions involved in positioning the reserve thread in the knotter.

After the rapid advance of the finger 115 and during the continuance of the indexing motion, the follower 132 rides up the stationary incline 139 thus first swinging the finger counterclockwise so as to retract it inwardly at $115^c$ to the position shown in dotted outline in FIG. 49, the thread being released at $115^d$. After passing and dropping off from the outer end of the surface 139 the follower 132 swings back against the cam 135 as indicated at $115^e$. In this way, the running thread is released from the finger which is returned to normal position when the follower 132 passes over the tip 140 of the incline 139.

To insure that the running thread will be in the proper position when the knotter is fired to tie a knot, means is provided for trapping the thread within the heel of the knotter after it has been advanced ahead of the index motion by the finger 115. The means here employed comprises a notch 450 (FIGS. 51 and 53) in the forwardly projecting end 451 of a bell crank lever 452 fulcrumed at 453 on the frame bracket 28 and disposed as shown in FIGS. 29 and 33 between the clamping jaw $200^c$ and a plate 460 shaped and positioned similar to the guide plate $200^b$. The other end 454 constitutes the follower for teeth 314 on a cam wheel 315 fixed to the main shaft 24.

Figures 51, 52, 53:
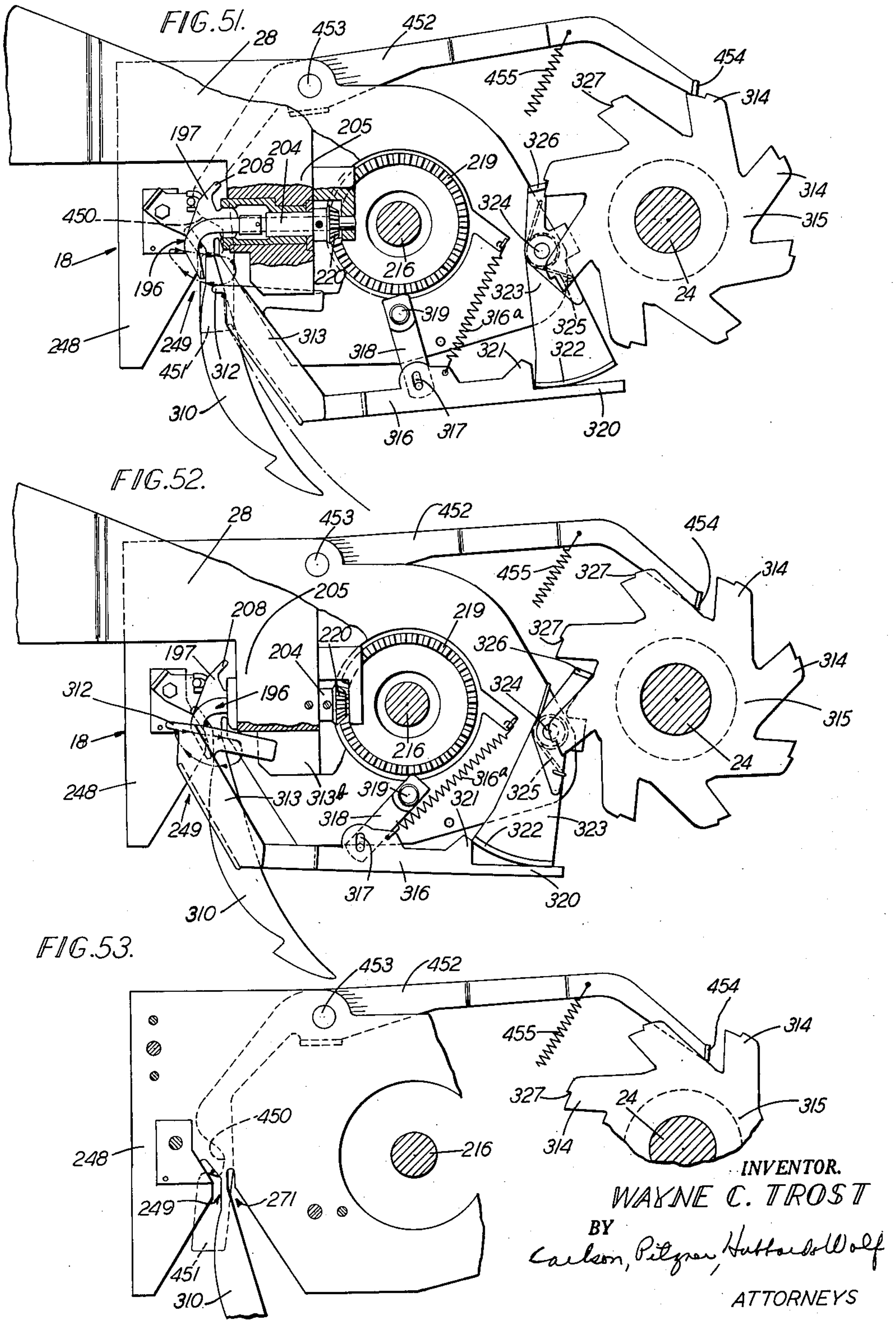
FIGS. 51, 52 and 53 are views similar to FIG. 31 showing the steps in the positioning of the reserve thread in the knotter.
Figure 63:
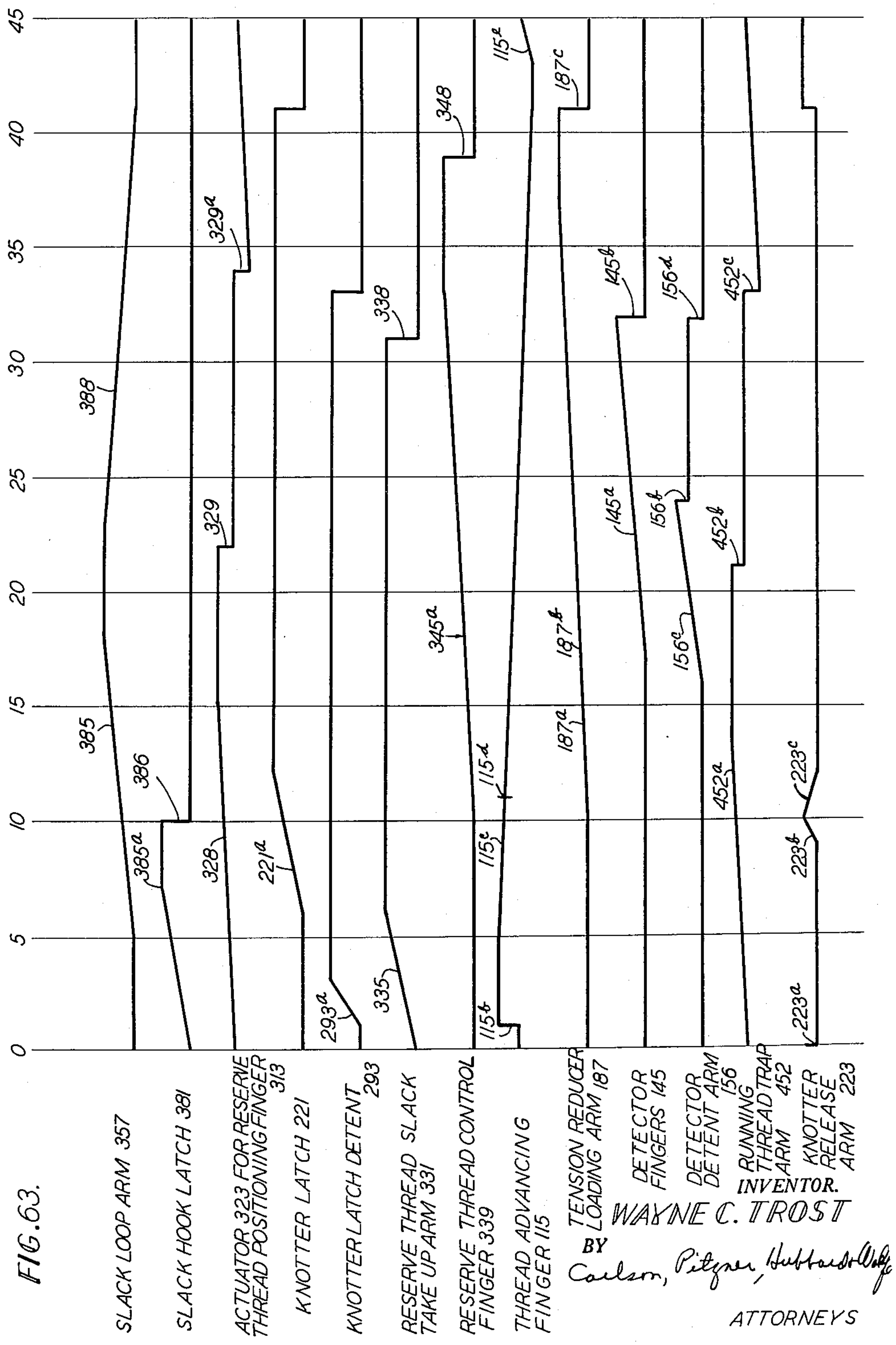
FIG. 63 is a time chart of the bobbin indexing cycle.

The teeth slope backwardly and, when the shaft is at rest, the follower is disposed in the bottom of the notch between adjacent teeth as shown in FIGS. 52 and 53. As the indexing motion progresses, the follower 454 rides up the inclined leading face of one tooth 314 thus rocking the bell crank 452 and retracting the notch 450 to the right and away from the guide slot 247 as indicated $452^a$ (FIG. 63). The notch is shifted forwardly at $452^b$ as the follower passes the shoulder 327 and then is advanced at $454^c$ to active position as the follower passes the tip of the cam tooth and is swung by its spring 455 to the position shown in FIG. 53. In this movement, the notch receives the running thread then disposed in the slot 247 thus enclosing this thread and retaining the same in proper position in the heel of the knotter. In this same movement, the thread is shifted farther into the narrowed end of the notch 249 and thus brought into proper relation to the shear 201.

*Positioning reserve thread in the knotter (FIGS. 19, 29, 31–33, 46 and 49–53)*

As the indexing motion continues following the knotter cycle, the leading end 21 of the thread of the second reserve bobbin is carried into the knotter after the running thread has been advanced to the bill on the inner side thereof, and finally is tensioned and thereby held properly positioned for the next knotter cycle. At the start of the indexing, this thread end will be located in a definite upright position (FIG. 19) and spaced angularly (see FIG. 46) from the winding position by about the index angle and inwardly at a shorter radius than the new running thread. This location is determined by the leading end of its guide flange 116 and its clamp 117. In this position, the indexing motion will carry the reserve thread end inside of the tip of the finger 310 (FIGS. 29 and 49) and into the guide throat 271 in the plate 248 eventually reaching the bottom $271^a$ of the notch. As the motion continues, the thread will be directed inside of the positioning finger 202 (FIG. 29) and into the notch 264 therein. In this motion, the thread is guided by incline 311 on the upper guide plate 231 into the notch 270 defined between this plate and the stripper segment 267. In the indexing motion, the guide flange 116 and the clamp 117 supporting the reserve thread move a short distance past the winding position so as to insure proper seating of the thread in the guide notches 270 and 271.

Just before the thread reaches the tip of the knotter bills but after the spaced portions of the thread have entered the mouths of the guide slots 270 and 271, the intervening portion of the thread encounters the tips 312 of two fingers 313 (FIGS. 32, 51, and 52) which are shifted outwardly to correspondingly bend such intervening portion and lay the same against the outer side of the knotter bills. Such positioning of the thread is effected in this instance by movement of the fingers 313 in an orbital path shown in dotted outline in FIGS. 51 and 52, the stepping of the fingers from one position to another along this path being timed by one lobe 314 on the multiple cam 315 above described.

The fingers 313 are the ends of flanges of a channel $313^a$ (FIG. 32) slidable in a horizontal slot $313^b$ in the frame bracket 28. At its other end the channel is integral with one end of a bar 316 movable endwise to carry the fingers across the knotter bills and also laterally to produce the resultant arcuate movement of the fingers. To this end, the bar is joined intermediate its ends by a pin and slot connection 317 (FIGS. 51 and 52) to one end of a link 318 pivoted at its other end on a fixed stud 319. Short of a tail 320 at its other end, the bar is formed with a lug 321 facing inwardly and coacting with an arcuate segment 322 on the end of a lever 323 fulcrumed intermediate its ends on a stud 324 and urged clockwise by a torsion spring 325. A tension spring $316^a$ acts on the bar between the link 318 and the tail 320 and thus holds the latter and the lug 321 against the arcuate outer surface of the segment 322.

The other end of the lever 323 is bent to form a follower lug 326 (FIGS. 51 and 52) which in the normal rest position of the shaft 24 (FIG. 31) engages the leading inclined surface on the active cam lobe 314 corresponding to the bobbin from which the new running thread is being unwound. At this time, the lug 321 engages the segment 322 so that the fingers 313 are fully retracted (FIG. 31). In the initial part of the indexing motion as indicated at 328 (FIG. 63) the follower 326 rides up the inclined leading face of the active lobe 314 swinging the lever 323 counterclockwise to carry the segment 322 off from the lug 321 and allow the tail 320 to come against the segment as shown in FIG. 51. Then, as the follower reaches the outer end of the lobe and rides over a short ledge 327, the bar 316 will be shifted endwise a short distance indicated at 329 (FIG. 63) carrying the fingers 313 from their normally retracted position (FIG. 51) forwardly a short distance to dispose the tips 312 into the path of the approaching reserve thread.

About the time that the thread reaches the tips the follower 326 will pass the tip of the lobe 314 at 329^a (FIG. 63) and be swung inwardly against the next lobe as shown in FIG. 52. Through the segment 322 acting on the lug 321, this clockwise movement of the lever 323 shifts the bar 316 endwise still farther carrying the fingers with the held thread across and beyond the tips of the knotter bills. By the simultaneous swinging of the link 318, this motion is modified so that the bar 316 is also swung clockwise thus carrying the fingers 313 longitudinally of the bills while the thread is disposed outwardly beyond the bill tips. The advanced position of the fingers and thread is shown in full in FIG. 52.

In the final part of the clockwise swinging of the follower lever 323, the near end of the segment 322 moves past the end of the lug 321 whereupon the spring 316^a retracts the bar 316 as permitted by sliding of the lug along the segment. As a result of this, the fingers 313 are retracted quickly while leaving the reserve thread properly positioned against the outer side of the knotter bills. By this same motion, the bar 316 and other parts of the finger actuator are reset or restored to their normal rest positions (FIG. 31).

*Tensioning of the reserve thread (FIGS. 3, 43, 46, 50 and 63)*

Provision is made for taking up any slack which may exist in the reserve thread after it has been associated with the knotter in the indexing motion as above described. In the present instance, this is accomplished by imposing a frictional drag on the long leg 120 of the thread adjacent its bobbin and in addition drawing a loop 330 (FIGS. 3 and 46) of variable length in the short leg 21 of the thread after the latter has reached its final position in the knotter. The friction drag is derived by gripping the thread between the two jaws (FIGS. 3 and 5) of the gripper 166 which as above described engages the leg 120 of the thread as it comes to rest in the first reserve position.

The loop 330 is drawn in the thread near its clamped end by an elongated arm 331 which is disposed above and normally extends tangentially of the disk 124 and projects from a vertical stud 332 carried by the frame bracket 27 and angularly spaced clockwise from the winding position as shown in FIG. 46. A light torsion spring 333 coiled about the stud urges the arm outwardly so that its outer curved end 334 draws the loop 330 and holds the latter in or adjacent the mouth of the suction tube 283.

Retraction of the arm 331 inwardly to the position shown in phantom in FIG. 46 is effected at 335 (FIG. 63) early in the indexing motion by one of the tabs 129 (FIGS. 4 and 6) integral with a reserve thread clamp 117 and upstanding through the disk 124. The tab engages a finger 336 rigid with the arm and projecting radially and inwardly from the stud 332. In passing the arm, the tab slides along the finger and swings the arm inwardly until the curved inner end portion 336^a of the finger is encountered whereupon the arm dwells in its innermost position until the tab passes the tip of the arm. Thereupon the spring 333 swings the arm reversely as indicated at 338 (FIG. 63), the hooked end 334 picking up the reserve thread just above the clamp 117 and drawing the same outwardly and ahead of the running thread toward the suction tube until all the slack in the J-shaped thread between the gripper 166 and the clamp has been taken up and this portion of the thread is tensioned to a degree determined by the small force capable of being exerted by the spring 333. The size of the loop 330 thus drawn and the extent of its entry into the mouth 284 of the suction tube 283 will be determined by the amount of slack in the thread as it is brought into the knotter. Normally, this will be substantially less than the full range of the arm 330 so that in the rest position of the cam shaft 24, the next actuating tab 129 will be disposed short of the follower arm as shown in FIG. 46.

To enable the reserve thread to be picked up by the tensioning arm 331 and carried outwardly ahead of the running thread, provision is made for drawing a portion 337 (FIG. 50) of the thread inwardly while the arm is retracted and placing this loop in a position to be picked up by the arm as the latter is allowed to swing outwardly at 338 (FIG. 63) near the end of the indexing motion. Herein, this is accomplished by an L-shaped finger 339 (FIGS. 3, 46, 49, 50) fulcrumed at one end on a vertical stud 340 on the frame bracket 27 and urged counter-clockwise by a torsion spring 341 to a normal position in which a projection 342 on the finger engages a stop 343 (FIGS. 3 and 49) on the bracket as shown in full in FIGS. 3, 46 and 49. In this position, the other end of the finger lies along the periphery of the disk 124 with a hook 344 at its end opening outwardly at a point disposed somewhat behind the finger 115 then holding the reserve thread.

During the intermediate portion of the next indexing motion as indicated at 345 (FIG. 63), the adjacent tab 129 (FIGS. 4 and 6) upstanding through the disk 124 engages an L-shaped plate 346 secured to and spaced below the finger 339. In the continued indexing, the finger is swung clockwise carrying the hook 344 in an arcuate path into engagement with the reserve thread at 345^a. As the point of engagement by the tab 129 moves outwardly along the edge 346^a of the plate, the tab finally passes the tip 347 of the finger 339 as the hook moves beyond the position shown in FIG. 50 and in phantom in FIG. 46. When this occurs, the finger 339 is swung backwardly against the stop 343 by its spring as indicated at 348 (FIG. 63) and as shown in FIG. 49.

In its advancing movement, the hook 344 first moves outwardly beyond the end 271^a of the guide notch 271 where the reserve thread is stopped and thus picks up the adjacent portion of the thread and draws the loop 337 therein as shown in FIG. 50. This occurs after inward retraction of the tensioning arm 331 and while the latter is dwelling as its actuating tab 129 is passing the arcuate follower surface 336^a. Then, before the hook is released, the arm 331 is released and swung outwardly by its spring 333 thus stripping the loop 337 off from the hook 344 and carrying this loop into the suction tube as shown in FIG. 3.

It will be observed in FIG. 3 that the loop 330 formed and tensioned by the finger 331 is spaced outwardly and well away from the running thread. This avoids any danger of the end portion of the reserve thread when cut off by the knotter from catching on or becoming tangled with the rapidly running thread 20.

*Release and reforming of slack loop (FIGS. 3, 14, 54–57, 63)*

The slack loop 22 is a V-shaped length, about eight inches, of the running thread disposed in an upright plane in this instance, between the upper thread guide 38 and a guide 350 disposed immediately above the upper disk 121 on the main shaft 24. These two guides are substantially alined vertically with thread guides of the knotter, the loop projecting forwardly from the main frame across and slightly beyond the upper end of the shaft 24.

The guide 350 is defined by the closed end 351 of the short forwardly extending leg of an L-shaped slot 352 formed in a horizontal plate 353 with the long leg extending to the left of the winder and merging with a flaring throat 354 into which a thread may easily be led manually in threading up the winder for restarting. The plate 353 is spaced a short distance (see FIG. 14) below the upper guide 38 and is also attached rigidly to the bracket 41. The throat 354 is alined vertically with the throat $40^b$, $42^a$ of the upper guide so that a thread may, in a single lateral movement to the right, be entered into both of the slots 39 and 352.

Figures 56, 57:
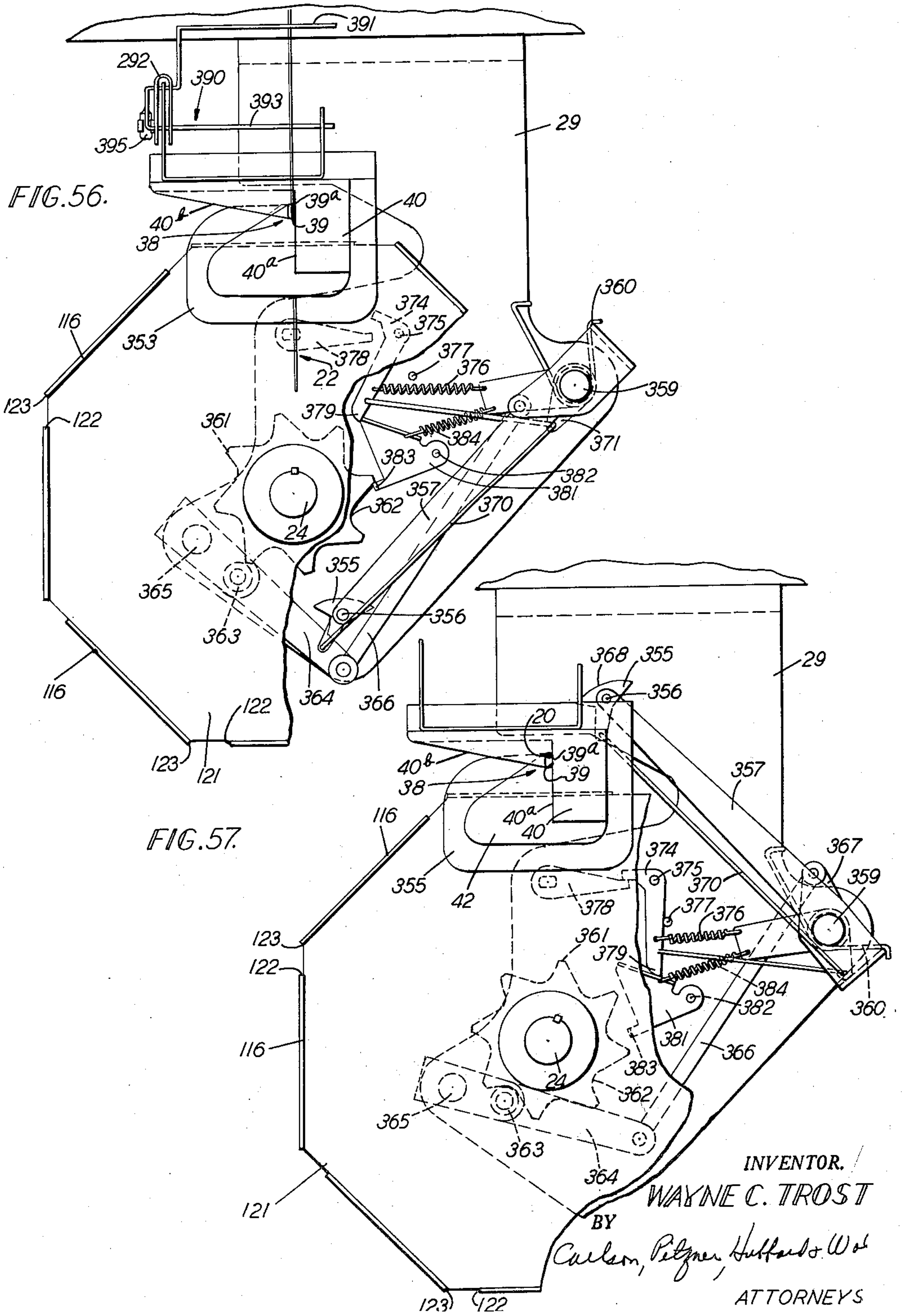
FIGS. 56 and 57 are plan views similar to FIG. 55 showing the parts in different positions.

The apex of the slack loop 22 is formed around a V-shaped hook 355 normally opening outwardly as shown in FIG. 54 but swingable clockwise through about a quarter revolution as shown in FIG. 56 to permit the loop apex to slide out of the hook and off from the tip thereof. To these ends, the hook is pivoted adjacent the apex of its V on an upright pin 356 on the free end of an arm 357 whose J-shaped end 358 (FIG. 54) is fulcrumed on a pin 359 upstanding from the upper frame bucket 29 beyond the periphery of the upper disk 121 and spaced laterally and to the right from the shaft 24. A torsion spring 360 coiled about the pin tends to swing the arm clockwise as viewed in FIGS. 54 and 55. Such swinging is controlled by cam teeth 361 on a disk fast on the shaft 24 just below the upper disk 121. The squared tips of the teeth are inclined backwardly and are separated by intervening rounded notches 362 adapted to receive a follower roller 363 carried intermediate the ends of a horizontal arm 364 fulcrumed on a pin 365 on the side of the cam opposite the pin 359. The free end of the long follower arm 364 is joined by a link 366 to a short leg 367 on the loop arm 357 which, by coaction of the cam and the spring 360 and by virtue of the relative lengths of the arms 357 and 364 is swung forth and back through a large angle as each tooth 361 passes the follower 363 in the unidirectional indexing of the main shaft.

In each rest position of the shaft, the roller 363 engages the tip of a cam tooth 361 (FIGS. 54 and 55) and the arm 357 is swung forwardly to maintain the V-shape of the slack loop. Now in the initial part of the next indexing motion, the follower drops into the next notch 362 permitting the spring 360 to swing the arm 357 backwardly thus carrying the hook 355 slightly beyond the thread guides 38 and 350 as shown in FIG. 57. The vertically disposed thread spanning these guides at this time as a result of completion of the normal knotter, operation or the manual threading later to be described will ride along the curved back surface 368 of the hook, be deflected laterally and to the left and thus cammed out of the way of the advancing hook. Then, after the tip of the hook passes, the thread will be straightened under the prevailing tension and thus brought in front of the hook opening. In both the retracted and the normal running positions of the loop arm 357, the hook 355 thereon is swung counterclockwise to the positions shown in FIGS. 54 and 55, the hook thus opening outwardly so as to retain the apex of the tensioned slack loop (FIG. 54) or to pick up and retain a thread extending directly and vertically between the guides 38 and 350.

Automatically and instantaneously upon the detection of a thread break, the hook 355 is rocked clockwise to the position shown in FIG. 56 thus releasing the apex of the slack loop so that the winding may continue uninterruptedly while the trailing thread end is held in and being operated on by the knotter. Herein, this is accomplished in response to counterclockwise turning of the knotter shaft 216 following a thread break. For this purpose, the long leg 369 of the hook is joined through a link 370 paralleling the loop arm 357 to one end 371 of a bellcrank 372 fulcrumed on the pin 359. With the parallelogram linkage thus formed, the angular position of the hook 355 will not be affected by swinging of the loop arm 357. A second arm on the bell crank 372 is joined by a link 373 to one arm of a bell crank 374 pivoted at 375 on the frame and normally held by a spring 376 against a stop 377, the hook 355 then being in loop retaining position (FIG. 54).

A second arm of the bell crank 374 is disposed in the path of an arm 378 rigid with the upper end of the knotter shaft 216 and disposed close to the arm 357 (FIG. 54) when the knotter shaft is at rest. Now, as this shaft turns counterclockwise at the start of a knotter cycle, the bell cranks 374 and 372 and the hook 355 are rocked clockwise far enough (FIG. 56) to allow the apex of the slack loop to slide off from the short leg of the hook. In this movement, an end 379 of the bell crank 374 engages a flange 380 of a latch 381 fulcrumed at 382 and having a tail 383 normally held by a spring 384 against an inclined trailing side of one of the cam teeth 361 near the tip thereof as shown in FIG. 54. As the arm passes, the tip of the latch moves in behind the arm as shown in phantom in FIG. 56 thus latching the bell crank 374 and therefore the hook 355 in the loop released position. The bell crank 374 is thus held out of the way of the knotter shaft arm 378 which, as described above, turns counterclockwise through a little more than one revolution and then reversely against the stop 294 (FIG. 47).

As a result of such latching of the bell crank 374, the latter does not interfere with the resetting of the knotter shaft. For the same reason the hook 355 remains latched in loop-released position as the parallelogram linkage is swung backwardly to the position shown in FIG. 57 preparatory to picking up the next running thread. This backward motion of the loop arm occurs gradually as indicated at 385 (FIG. 63) when the roller 363 rides into the next cam notch 362 in the first part of the indexing motion. Early in this motion, the passing tip of a cam tooth 361, which normally limits the swinging of the latch 381 by its springs 384, rocks the latch counterclockwise and trips the latch at 385 thereby allowing the bell crank 374 to swing against the stop 377 under the action of the spring 376 and thus swing the hook 355 back to active position by the time it passes the running thread then spanning the guides 38 and 350. After the tip of the tooth passes, the follower 383 and the latch 381 swing against the arm 374 as indicated at 386.

With the hook 355 thus positioned (FIG. 57) and disposed inwardly beyond a thread extending upwardly between the guides 38 and 350 as a result of completion of a knotter cycle or manual threading later to be described, the hook will pick up the thread and draw a new slack loop 22 therein autmatically upon counterclockwise swinging of the arm 357 back to its normal position (FIGS. 54 and 55). This motion indicated at 388 (FIG. 63) is produced as the leading inclined face of the next cam tooth 61 rides under the roller 363 in the latter part of the indexing motion which is interrupted with the roller resting on the tip of the cam lobe 361 (FIG. 55). At the same time, the latch 381 is swung away from the bell crank 374 so as to condition the latter for instantaneous release in the next knotter cycle.

It is important to note that the drawing of the slack loop in a new running thread occurs late in the indexing motion as indicated at 388 (FIG. 63) at a time subsequent to the engagement of the thread with the tension reducing wheel 172. This is accomplished by actuating the arm 187 for loading the tension reducer 17 earlier in the indexing motion as indicated at $187^a$. As a result of such activation or loading of the tension reducer, the rotating wheel thereof exerts a force on the thread tending to advance the latter and thus supply the thread needed for forming the slack loop without danger of increasing the tension of this thread to a value greater than that normally maintained in the detector 16 by the tension reducer 18. This minimizes the possibility of breaking the running thread during drawing of the slack loop therein.

*Auxiliary thread break detector*
*(FIGS. 1, 3, 14, 54 and 55)*

As described above, the numerous operations including rethreading of the main thread break detector 16 incident to conditioning the winder for normal operation are necessarily performed after the knotter has completed its cycle and the winding has been resumed. If the thread breaks or becomes exhausted during this period, that is, during the indexing of the bobbin magazine which requires about one second, one or more of the thread handling devices may become fouled by the oncoming thread drawn from the active bobbin by the tension reducer 17. To alleviate this condition, an auxiliary break detector 390 is located beyond all of the normally acting thread handling devices and is adapted to force a break in the oncoming thread at a point behind the tension reducer.

In the present instance, the auxiliary detector is mounted on a bifurcated extension 41ª of the bracket 41 on the top of the frame 29 immediately below the winding drum and comprises a bail 391 projecting horizontally and laterally from an arm 392 on a shaft 393 journaled in the bracket extension 41ª. Beyond the guide slot 39 in the upper guide 38 the running thread is inclined upwardly and under the bail 391 along which it is free to traverse laterally between the arm 392 and a lug 394 at the free end of the bail.

The bail tends to swing downwardly by gravity but is of such light weight as to respond slowly to changes in the thread tension. Thus owing to the high winding speed of the thread and after the slack loop 22 is released as above described, that portion of the thread between the guide plate 40 and winding drum remains under sufficient tension to hold the bail in the raised position shown in full in FIGS. 1, 14 and 54. In this position, a switch 395 of the mercury type mounted on the bail arm 392 is held open so long as the running thread between the tension reducer and the winding drum is uninterrupted. In the event that the thread in this region breaks or becomes exhausted, the resulting reduction in tension will permit the bail to fall against a stop 396 (FIG. 14) thereby tilting the switch 395 to the closed position shown in phantom in FIG. 14.

Such detection of a thread break is utilized to force a break in the oncoming thread at a point short of the tension reducer 17 thereby preventing the rotary tension reducer from drawing any more thread off from the then active bobbin. In the present instance, such forced breakage is effected by a cutting device 398 (FIGS. 5 and 16) actuated by a solenoid 399 (FIGS. 3 and 5) which is energized through a circuit controlled by the feeler switch 395. The solenoid plunger is joined by a bell crank and a link 400 to the movable blade 401 of the cutter which is of the scissors type and includes a stationary sharpened blade 402 (FIG. 16) fixed to the frame bracket 26 lying alongside the running thread of the indexing motion.

Figures 14, 15, 16:
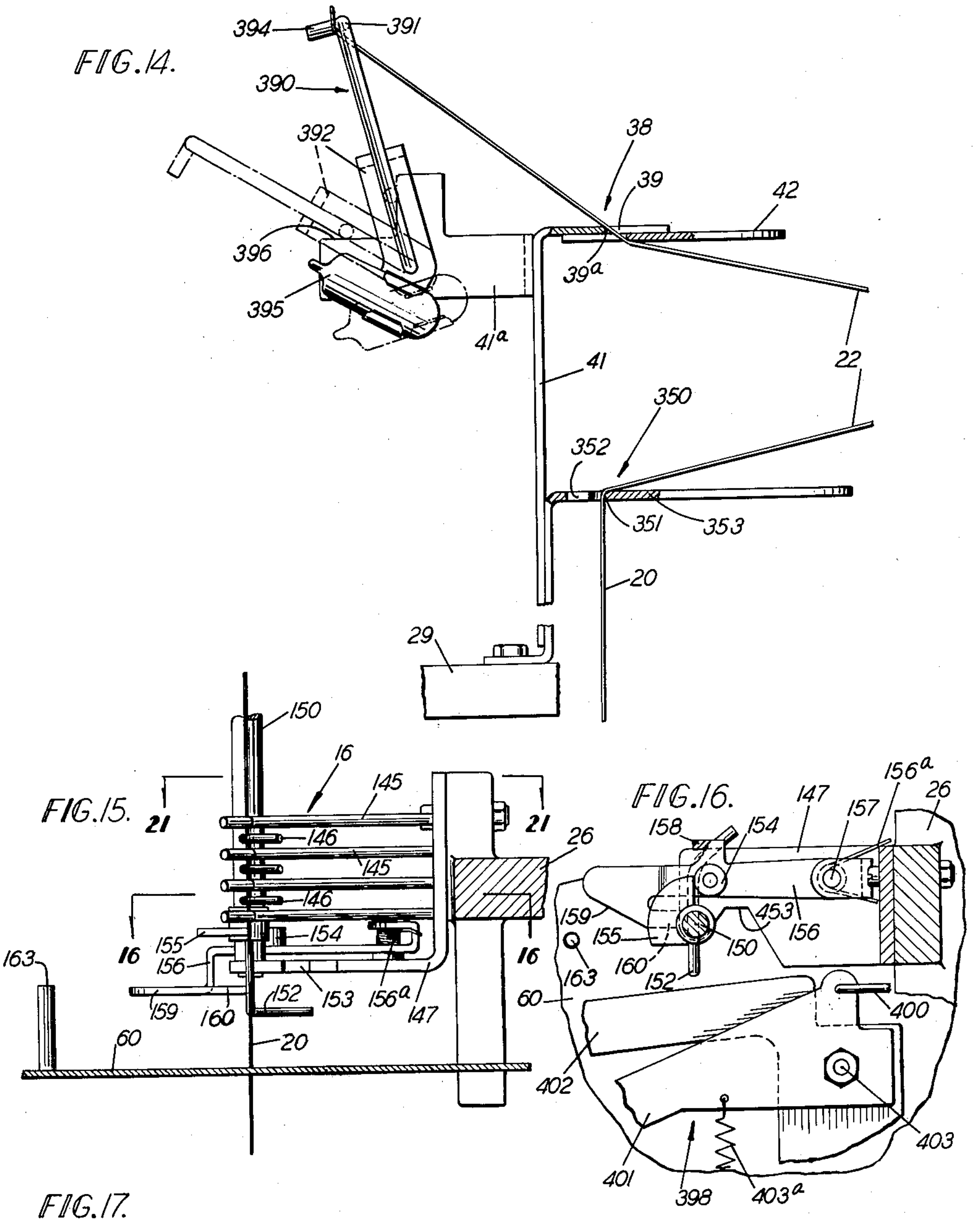
FIG. 14 is a fragmentary side elevational view of the auxiliary thread break detector.
FIG. 15 is a face view of one form of the primary thread break detector, the section being taken along the line 15—15 of FIG. 5.
FIG. 16 is a fragmentary section taken along the line 16—16 of FIG. 15.
Figure 17:
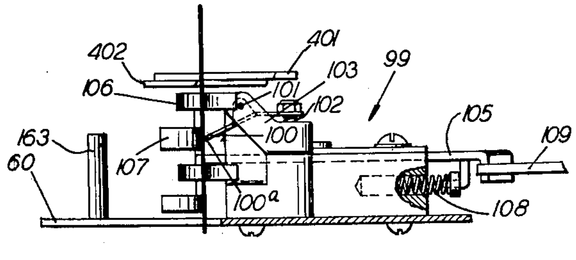
FIG. 17 is a fragmentary sectional view of the yarn cleaner taken on a line 17—17 of FIG. 5.

The movable blade 401 (FIG. 16) is the arm of a bell crank fulcrumed at 403 and having a short arm connected to the link 400. The blades of the shear converge in the direction of the indexing and form an open throat for receiving the thread early in the indexing motion. In response to energization of the solenoid 399, the blade 401 will be swung toward and past the stationary edge 402 thus cutting off the thread. A spring 403ª urges the movable blade 401 away from stationary blade and about the pivot 403 and thus holds the shear open as shown in FIG. 16.

*Automatic stopping of winding by auxiliary thread break detector (FIGS. 7, 8, 9, and 64)*

As pointed out above, closure of the switch 395 by the auxiliary thread break detector 390 results in cutting of the running thread below the tension reducer. Closure of this switch also operates through a suitable circuit (FIG. 64) to stop the motor 32 and energize a solenoid 404 for applying a brake 405 for at least partially slowing down and stopping the winding drum 13.

Herein, the brake is of the friction type comprising a shoe 406 (FIGS. 7, 8 and 9) on one end of a slide 409 slidable along a guide pin 407 and normally urged toward an applied position shown in FIG. 9 as by an inclined weighted arm 408 of a bell crank fulcrumed on one of the pins 407. A short arm of the bell crank is engageable in a notch 409 on the brake slide. A latch 410 engaging a shoulder 411 on the slide normally holds the brake shoe retracted.

When the solenoid 404 is energized, the latch 410 is released (FIG. 9) and the brake shoe urged under the action of the weight 408 against the surface of the winding drum. A friction torque is thus exerted to bring the drum to a relatively quick stop.

The brake is released and its latch 410 reset automatically as an incident to doffing of the cheese. As the arm 48 is swung forwardly to lower the cheese, a lug 412 on the arm turns clockwise as viewed in FIG. 7 and finally engages the lever 408 as shown in FIG. 8. This shifts the brake slide 409 rearwardly far enough to allow the latch 410 to drop in behind the shoulder 411 thus holding the brake shoe retracted when the cheese is swung back up to running position.

*Automatic stopping of winding in response to full cheese signal (FIG. 7)*

As soon as the cheese 12 attains the desired diameter, the winder is stopped automatically by deenergizing the motor 32, applying the brake 405 to the winding drum, and operating the shear 398 (FIGS. 3 and 16) to cut the running thread 20 below the detector 16. These functions are performed in response to the full cheese signal which is evidenced by opening of a normally closed switch 413 which in this instance is of the mercury type and mounted on a flag 414 on one end of a bell crank fulcrumed at 415 (FIG. 7) on the bracket 35 below the drum shaft. The other arm 416 of the bell crank extends upwardly and around the pin 58 with its free end resting as shown in FIG. 7 on a ledge 417 at one edge of a recess 418 in the lower end portion of the link 57.

As the cheese grows during the winding, the pin 46ª on the arm 46 is carried upwardly along the slot 56 and eventually encounters an adjustable stop 418 defining the upper end of the slot. Then, in the continued winding, the pin raises the link 57 as permitted by the slack in the lost motion connection 58, 58ª thereby moving the ledge 417 and allowing the latter to turn clockwise by gravity. The flag 414 is thus swung downwardly into fuller view of the operator and the switch 413 is closed. Through the circuits shown in FIG. 64, closure of this switch deenergizes the relay for the motor 32 and energizes the solenoids 404 and 399, to apply the friction brake 405 and operate the shear 398 in the manner previously described.

*Normal and starting control of thread indexing (FIGS. 13, 14, 18, 20, 26, 28, 45, 47 and 48)*

As set forth above, the various thread handling and tying mechanisms are normally reconditioned for operation in an indexing motion of the bobbin magazine and associated parts following the detection of a thread break. Herein, the firing of the knotter is utilized to initiate the indexing, this being accomplished by closure of the switch 290 (see FIGS. 20, 45 and 64) by the latch arm 221 after it has been tripped by the latch 226 and moves against the stop 291. Such closure energizes the solenoid 79 (FIG. 13) causing an indexing cycle to be executed as detailed above. The switch remains closed until the latch 221 is reset at 221ª (FIG. 63) during the early part of the indexing motion.

The indexing motion is also utilized to automatically condition the thread handling mechanisms to start the winder initially or to restart it after a thread break has been sensed by the auxiliary detector 390. A described more in detail later, such restarting involves the finding of the loose thread end on the cheese 12 and manually tying this end to the leading end 21 of the next reserve thread.

Figure 64:
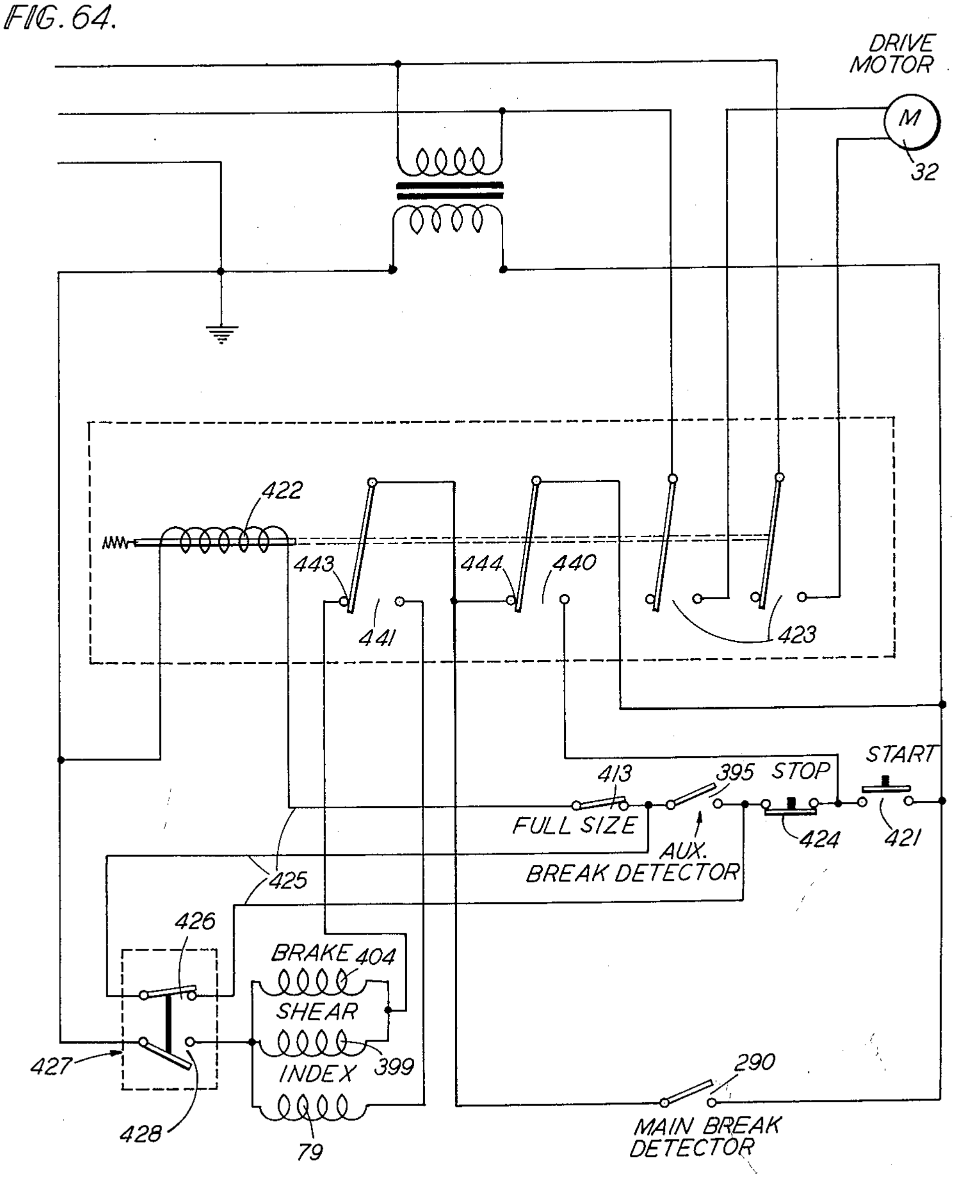
FIG. 64 is an electric circuit diagram.

The motor 32 is then started by closure of a start switch 421 (FIG. 64). As soon as the winding drum and the cheese have attained normal running speed, an indexing motion is executed to carry the bobbin being unwound into active position, the running thread into proper association with the detector 16, the tension reducer 17, and the knotter, and the leading end 21 of the next reserve thread into proper association with the knotter. Such indexing is caused by energization of the solenoid 79 above described by closure of a separate switch 428 preferably actuated by a device 427 which, after starting of the motor, measures a predetermined time interval which is long enough to allow tension to be built up in the running thread and an indexing motion to be completed thereby conditioning the parts for normal operation in response to exhaustion or breakage of the thread.

While the timing device may take various forms, an inexpensive and reliable construction is formed in the present instance by a blower 430 (FIGS. 26 and 28) driven by the motor 32 and operating to deliver air under pressure for actuating the switches 426, 428 (FIG. 64) which as shown are of the mercury type and enclosed in an envelope 437.

The blower shown comprises an impeller 432 fast on the shaft 173 of the tension reducer wheel 172 and rotatable within a housing 433 having a discharge outlet 434. Interposed in the outlet is a vane 435 (FIG. 28) swingable about a fulcrum 436 and tending to swing by gravity in a direction to close the outlet as shown in full in FIG. 28. Upon starting of the motor 32, the discharge pressure builds up gradually overcoming the resistance of the flap 435 until the latter has been swung far enough (see FIG. 28) to open the switch 426 and close the switch 428. As will be described presently, this automatically initiates indexing of the magazine and reconditioning of the detector 16 and the knotter 18 for normal operation.

*Overall operation*

Figure 18:
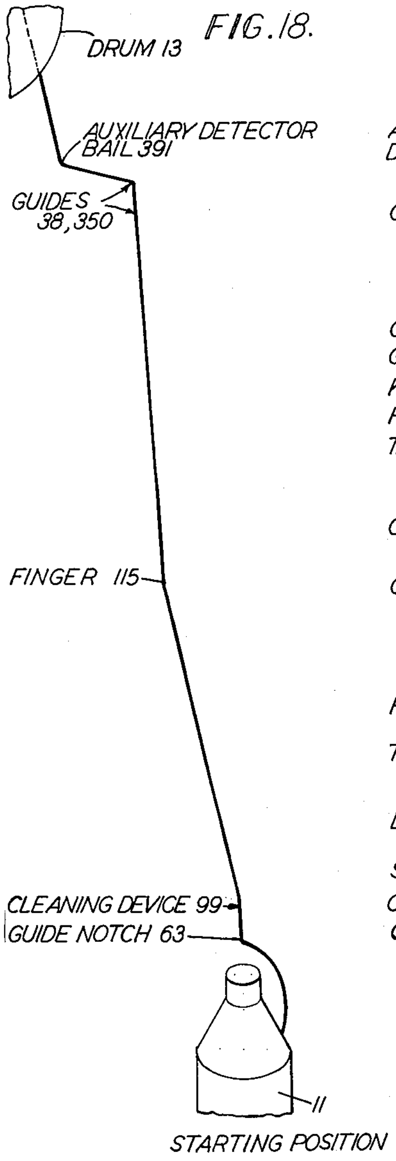
FIG. 18 is a diagrammatic view showing the shape of the running thread preparatory to manual starting of the winder.

*Manual threading up.*—To prepare the winder for operation, a bobbin 11 is placed in each of the pockets of the magazine 15 and the free end of the thread thereof is unwound, drawn upwardly and moved laterally into the associated notch 63 and thread clearing device 99, led around the proper finger 115 and upwardly and around the flange 116 and finally downwardly into the clamp 117. In the case of the bobbin in the first reserve position and next to the active winding position, the thread is drawn upwardly from the finger 115 through the upper guides 38, 350, around the bail 391 of the auxiliary thread detector and wound several times around a cheese core 43 on the spindle 45. The core is then pushed upward to winding position thus resting in driving engagement on the drum 12. By manually turning the core or the drum, the slack is taken up thus shaping the thread as shown in FIG. 18.

It will noted that at this time, the manually tied up thread is disposed in the guide slot 142 but is not engaged by the detector 16, the tension reducer 17 or any of the guiding parts of the knotter 18. The thread is however taut and positioned accurately by the finger 115 and the upper guide 350. Since the detector 16 is released (FIGS. 22, 47), the switch 290 will be closed and the circuit of the solenoid 79 prepared for starting an indexing motion. For the same reason, the knotter shaft 216 will be latched (FIG. 47) in its normal rest position and the bills 196, 197 and other knotter parts will thus be positioned to receive the new running thread.

*Starting the winding.*—The winding operation is initiated by depressing the button (see FIGS. 2 and 64) of a start switch 421 which energizes a relay motor 32 and turning of the winding drum 13. The relay circuit includes a conductor 425 in which is interposed a normally closed stop switch 424, the switch 426 of the time delay relay 427, and the full size switch 413. A switch 440 connected in parallel with the start switch and the switch 426 maintains the relay 422 energized.

The motor 32 also drives the blower 430 thus increasing the pressure exerted on the vane 435 as the motor speed increases. Normal winding speed will be attained by the time the pressure in the blower outlet has built up enough to swing the vane to the position shown in dot-dash outline in FIG. 28. In this movement, the switch 426 is opened and the switch 428 closed thereby completing a circuit for energizing the solenoid 79. This circuit includes a switch 441 then closed by the relay 422 and the switch 290 held closed (FIG. 47) by the knotter shaft latch 221.

The solenoid 79 initiates an indexing motion of the shaft 24 the same as in the automatically initiated cycle described below. By this motion, the first bobbin is advanced to normal winding position, the running thread is carried into the detector, tension reducer, and knotter, and the leading end 21 of the next reserve thread is finally brought into the knotter.

*Positions of running and reserve threads.*—As the winding continues without breaking or exhaustion of the thread, the running and reserve threads will be disposed as shown in FIG. 3 and in engagement with the various parts indicated in FIG. 19. In the knotter, the thread travels in a straight vertical line as shown in FIG. 29 while the stationary reserve thread lies adjacent the running thread but bends outwardly around the knotter bills and crosses the running thread at the two points 265, 266.

*Operation after normal thread break.*—As described above, the portion of the running thread below the tension reducer 17 is maintained under increased tension so that breakage of the thread will normally occur in the region of the detector 16 and therefore well below the knotter. In response to such a break and the resulting swinging of the detector shaft 150, the latch 221 is tripped thus releasing the shaft 216 to the action of the spring 215 for instantaneous execution of the knotter cycle charted in FIG. 62.

In the first part of the movement, the arm 378 (FIG. 55) thereon trips the latch 374 thus swinging the hook 355 to release the slack loop 22. The thread of the latter is thus made available for continuing the winding at full speed while the running thread is clamped and held against movement during tying of the knot. In the first revolution of the shaft, the running thread is clamped and the knotter bills and the associated guiding and cut off devices are actuated to form and release a knot 23. The knot is stripped from the knotter bills as illustrated in FIG. 43 before all of the available slack of the loop 22 is used up. The remainder of this loop and the downwardly hanging loop containing the newly formed knot are then taken up so that the new running thread becomes tensioned. Withdrawal of thread from the new bobbin is thus initiated while the bobbin is still in the reserve position. It will be remembered that the knotter shaft comes to rest precisely in the normal position as determined by the stop 294 and shown in FIG. 47. The knotter bills and other parts are thus positioned to properly receive both the running thread and the reserve thread in the ensuing indexing of the bobbin magazine.

As an incident to firing of the knotter, the shaft 24 is indexed one step to bring the reserve bobbin into winding position and to associate the leading end of the next reserve thread with the knotter. This is effected by closure of the switch 290 in the releasing movement of the latch 221 for the knotter shaft 216. Closure of this switch completes a circuit for the solenoid 79 through the switch 428 of the time delay relay 427, a switch 441 of the relay and the then closed switch 290.

In addition to bringing the bobbin of the new running thread into the winding position and vertical alinement with the knotter parts, the indexing motion performs the numerous other functions above described and charted in FIG. 63. To summarize, these include:

(*a*) Reloading of the knotter actuator by rewinding the spring 215 from its upper end while the knotter bills are held in normal position.

(*b*) Drawing a slack loop in the new running thread by resetting the latch 381 and swinging the arm 357 backwardly to pick up the new thread and then forwardly to draw a new loop 22 near the end of the magazine indexing (FIGS. 53–57).

(*c*) Release and resetting the knotter latch 221 and the catch 293 therefore before substantial rewinding of the spring 215 occurs (FIGS. 45, 47).

(*d*) Advance the new running thread into the knotter by swinging the finger 115 ahead of the indexing motion (FIGS. 46, 49), the thread then being trapped in this position by the notch 450 (FIG. 53).

(*e*) Actuate the fingers 313 to lay the reserve thread outside of the knotter bills and across the running thread as the thread comes into the knotter (FIGS. 31, 51, 52).

(*f*) Take up slack in the new reserve thread by locating this thread (FIG. 50) in a position to be picked up by the tensioning arm 331 (FIGS. 3, 46).

(*g*) Reset the main thread detector 16 by reversely swinging and then releasing of the fingers 145 (FIGS. 20–23).

(*h*) Activate the tension reducer 17 by laying the new running thread over the wheel 172 (FIGS. 24, 25).

(*i*) Activate the thread cleaner 99 (FIGS. 5, 17) which is disposed in active winding position.

(*j*) Release the cut off end of the reserve thread by the cam 128[a] (FIGS. 6, 46) opening the clamp 117 to free the thread for disposal through the suction tube 283 (FIG. 43).

(*k*) Reset the indexing control latch 77 (FIG. 11) preparatory to the initiation of the next indexing cycle.

*Operation after an abnormal thread break.*—It will be observed from the foregoing that during starting up of the winder and for a substantial part of the indexing motion, the detector 16 is out of action. If the running thread 21 breaks or becomes exhausted at this time, the resulting reduction in the thread tension will allow the bail 391 of the auxiliary detector 390 to swing and open its switch 395 (FIG. 64). This breaks the holding circuit for the relay 422 and the resulting deenergization of the latter deenergizes the motor 32 by opening the switches 423 and also applies the brake 406 to decelerate the winding drum 13 and actuates the auxiliary shear 398 (FIG. 3) to cut off the oncoming running thread 21 at a point below the tension reducer.

To perform these secondary functions, the windings of the shear and brake solenoids 399 and 404 are connected in parallel (FIG. 64) and interposed in an energizing circuit which includes the switch 428 of the delay relay 427, this switch remaining closed until the motor has slowed down substantially. The circuit also includes a conductor 442 and switches 443 and 444 which are closed when the relay 422 becomes deenergized.

In response to breaking of the running thread above the detector 16 and the ensuing cutting of the oncoming thread by the shear 398, the finger 145 of the detector 16 will be released the same as in the case of a normal thread break. As a result, the latch 221 will be tripped and the knotter fired in the regular way, the bills being stopped in the normal set position and thus prepared to receive new running and reserve threads during indexing of the bobbin magazine following manual tying and restarting of the winder as above described.

*Operation in response to full size signal.*—The attainment of the desired full size of the cheese is, as described above, indicated by opening of the switch 413 (FIG. 7) and swinging of the flag 414 into full view. As an incident to this, the winder is stopped automatically. That is to say, the circuit for the relay 422 is interrupted by opening of the switch 413 hereby opening the motor switches 423. At the same time, closure of the relay switches 443, 444 energizes the brake solenoid 404 as above described to decelerate the winding drum and the solenoid 79 to actuate the shear 398 and cut off the oncoming running thread 21 below the tension reducer.

*Modified winder*

By modifying certain of the mechanisms above described, it has been possible to omit some of the parts and simplify the construction of others thus reducing the overall cost of the improved winder while at the same time increasing its accuracy and reliability to the end that the number of thread breaks occurring during winding of a cheese are reduced substantially. In the following description of these modifications illustrated in FIGS. 65 to 77, the parts in common with the winder above described are indicated by corresponding reference numerals even though the size or shape of such parts may be somewhat different.

Figures 70, 71:
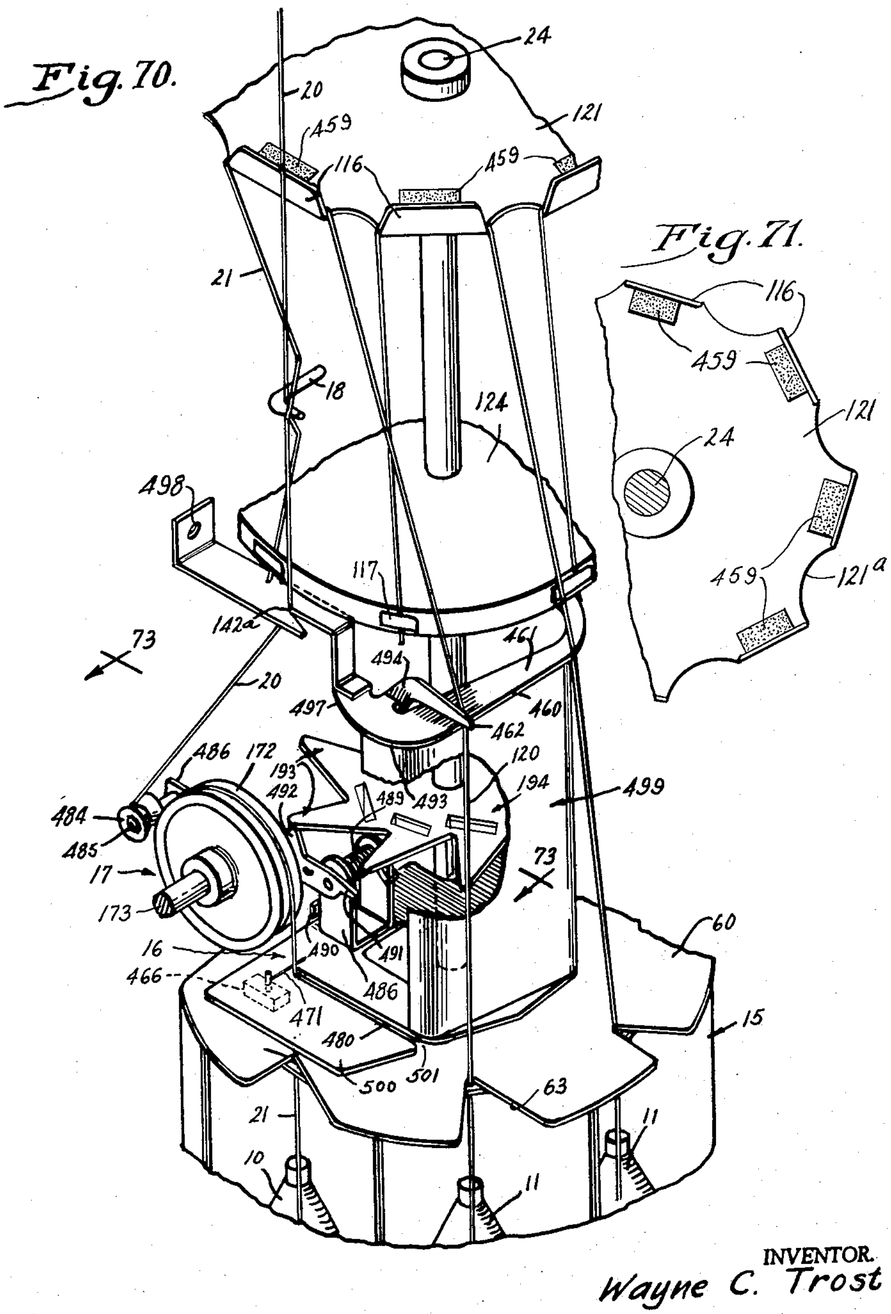
FIGS. 70 and 72 are fragmentary perspective views of the tensioning mechanism and related parts of the winder showing different positions of the parts.
FIG. 71 is a fragmentary plan view taken on the line 71—71 of FIG. 65.
Figure 78:
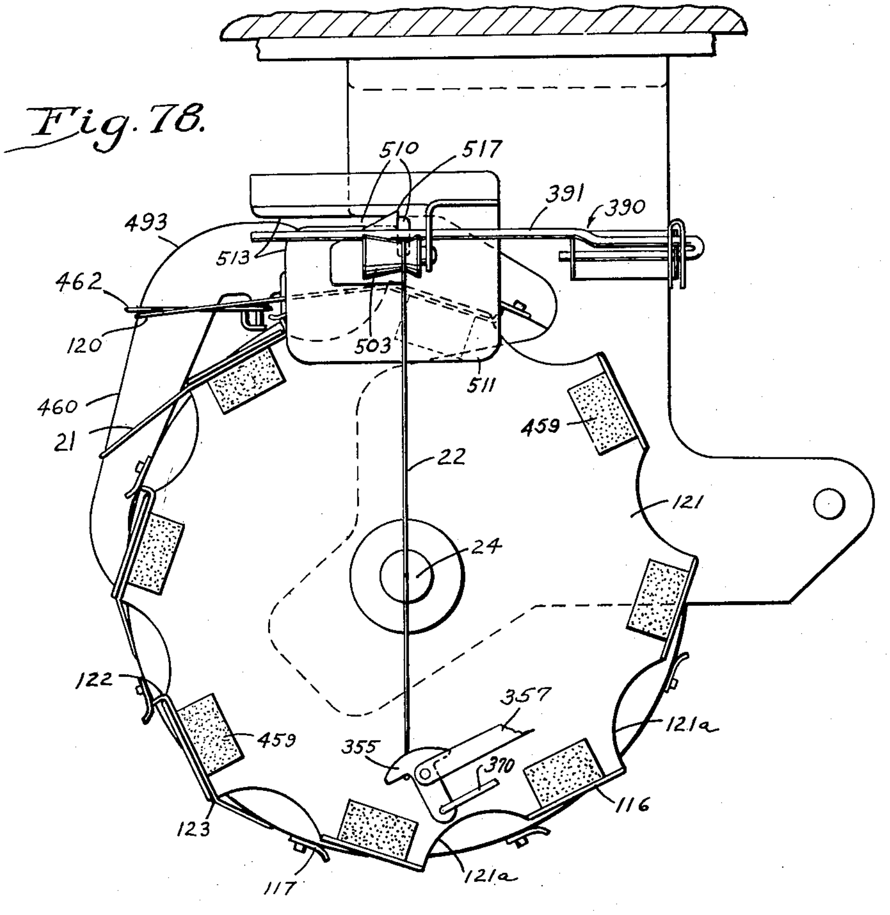
FIG. 78 is a fragmentary sectional view taken along the line 78—78 of FIG. 65.

*Reserve thread hang-up.*—As before, the unwound portions of the threads 21 of the reserve bobbins 11 in the magazine pockets 15 are hung up around the flanges 116 and held in the clamps 117 so as to form inverted J's. Also, flanges are disposed as shown in FIGS. 70, 71 and 78 so as to dispose their leading ends 122 outwardly at a somewhat shorter radius than the trailing ends 123 and correspondingly space the short and long legs of the J's from the magazine axis or shaft 24. Preferably, the friction drag imposed on the thread passing across the top of the disk in the course of a tying operation is increased somewhat by securing pads 459 of abrasive cloth to the top of the disk immediately behind the fingers 116.

This spacing of the parts of the J's permits the fingers 115 above described to be omitted and the long leg 120 of the first reserve thread to lie against and ride along against the edge 460 of a stationary guide 461 (FIGS. 64 and 70) as the thread of the successive bobbins is indexed into the first reserve position. The guide is a horizontal plate disposed just below the magazine disk 124 and secured at 498 (FIG. 70) to the winder frame and fixed to the upper end of an upright shield 499 (FIG. 70) which follows the curvature of but is set inwardly from the guide 460. At its lower end, the shield is fixed to a plate 500 also secured to the frame just above the top plate 60 of the magazine 15. In the final part of the index, the thread leg 120 comes against and is stopped by a retractible finger 462 disposed just above and projecting outwardly a short distance beyond the guide edge 460. Thus, the first reserve thread is shaped as shown in FIG. 70 when the magazine comes to rest at the end of each index step. In this position, air discharged from the periphery of the tension reducing roll is intercepted by the shield 499 and prevented from flowing the thread outwardly and unwinding additional thread from the bobbin.

*Two step indexing of bobbin magazine.*—The final and major portion of the indexing movement of the magazine 15 is produced by the crank actuated mechanism above described. A short initial part of the motion occurs with a quick snap action substantially instantaneously after a thread break and simultaneously with the completion of the cycle of the knotter 18 as above described. Herein, the torque for snapping the magazine ahead from its rest position is derived from the inertia of the knotter and the parts coupled thereto as the torsion spring 215 becomes unwound and then is wound reversely to absorb the energy and arrest the motion of the knotter and the parts connected thereto.

Figure 75:
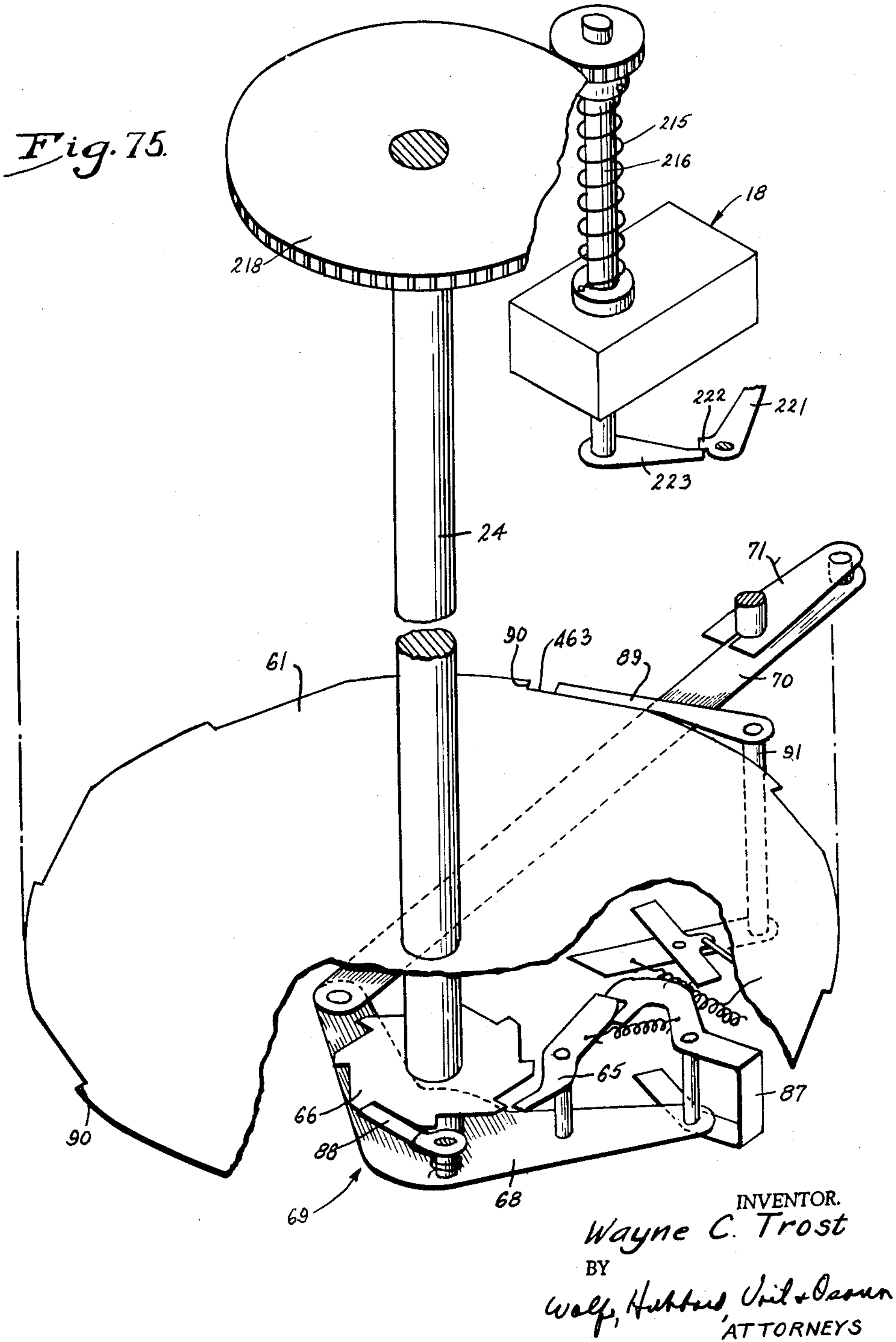
FIG. 75 is a schematic perspective view of the magazine indexing mechanism of the modified winder.

For this purpose, the pawl 89 formerly used to hold the magazine against the detent 88 as shown in FIG. 13 is shortened as shown in FIG. 75 to provide a relatively short clearance 463 between the pawl end and the opposing shoulder 90. The angle, about ten degrees, included by the clearance determines the distance through which the magazine will be advanced away from the retaining detent 88 and clockwise as viewed in FIG. 75 after the spring 215 becomes fully unwound and the energy of the rapidly moving knotter parts is being absorbed by reverse winding of this spring. During the latter, enough torque is exerted on the magazine to turn it ahead and take up the clearance 463. This occurs in a small fraction of a second because of the shortness of the knotter cycle and before initiation of the regular indexing of the magazine by the motor actuated pawl 65. As will appear later, this short and rapid movement of the bobbin magazine achieved by a simple change in the length of the pawl 89 can be used as later described to perform several functions required in restarting the winding after a thread break thus enabling numerous parts of the winder first described to be omitted.

*Firing the knotter.*—A substantial simplification in construction is achieved by firing the knotter electrically instead of mechanically as described above. For this purpose, the detent 226 (FIG. 69) for tripping the knotter release latch 221 is thickened to form the armature of a magnet 464 which is energized to withdraw the latch by closure of a switch 465 in response to breaking of the running thread sensed by the detector 16. The movable contact 467 of this switch cooperates with another contact to form a switch 468 included in the series in an alternating current circuit with a condenser 469, a resistor R and a rectifier S. During normal operation, the switch 468 is held closed by the thread break detector 16 thus charging the condenser. Upon closure of the switch 465, the energy stored in the condenser is discharged through the magnet 464 thus energizing the latter momentarily to withdraw the detent 226 and permit the latch 221 to move as before agianst the stop 291. After receiving the momentary pulse, the magnet becomes deenergized and the detent is returned by the spring 228 to its normal position against a stop 226ª. The detent thus becomes conditioned quickly for resetting of the knotter latch 221.

Figures 66, 67, 68, 69:
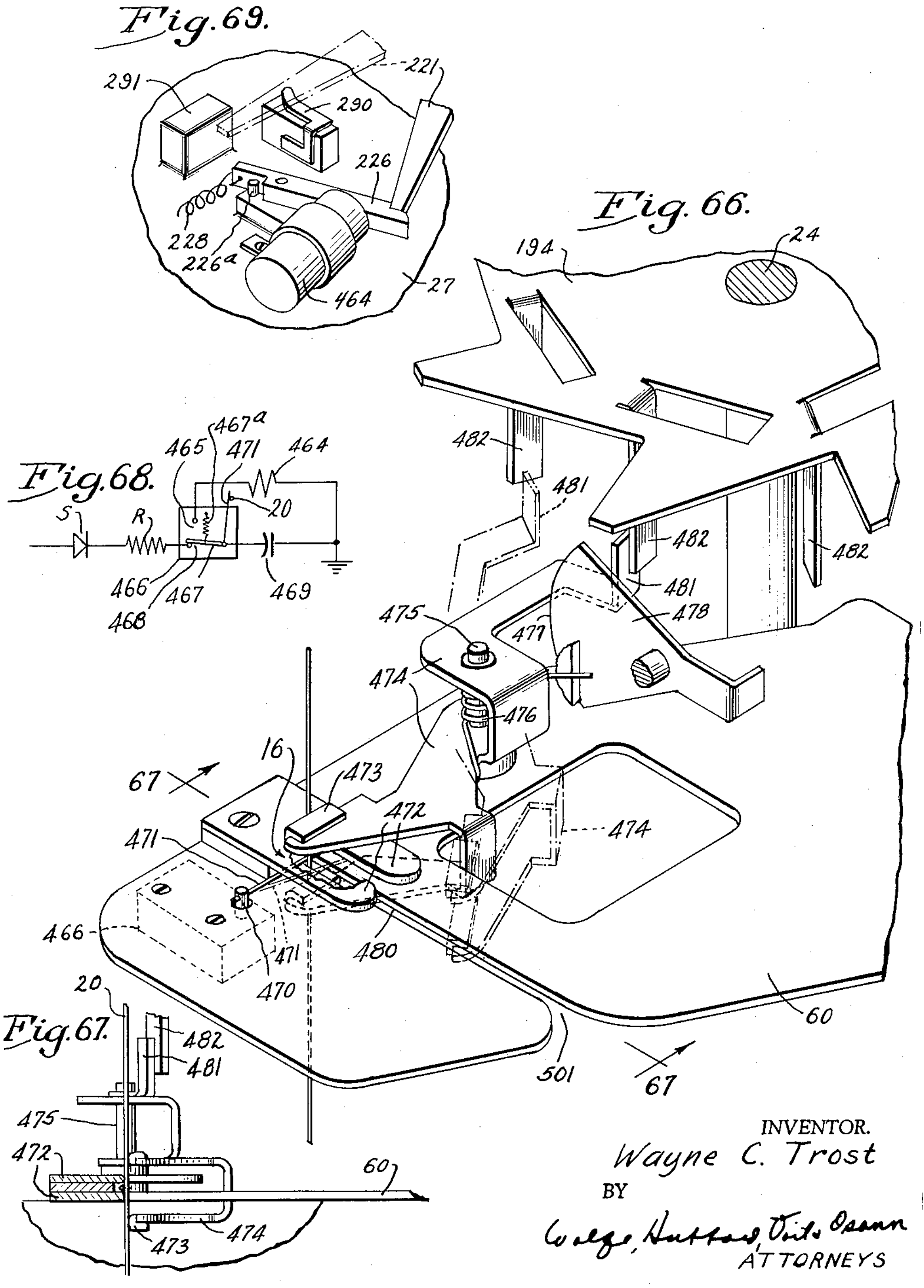
FIG. 66 is a fragmentary perspective view of the thread break detector of the modified machine.
FIG. 67 is a fragmentary section taken along the line 67—67 of FIG. 66.
FIG. 68 is a fragmentary view of the electric circuit controlled by the modified thread break detector.
FIG. 69 is a fragmentary perspective of a part of FIG. 20 but showing the modified winder.

*Modified thread break detector.*—The switch 465 is disposed within a casing 466 mounted on the stationary plate 500 as shown in FIGS. 66 and 70 and adjacent the thread 20 running upwardly from the active bobbin to the tension reducer 17. The movable contact of the switch is on an arm urged by a spring 467ª within the casing away from the normal position shown in FIG. 68 in which the spring is overcome by the running thread 20 and a switch 468 held closed. A rockshaft 470 carrying the arm projects upwardly from the switch casing and carries a wire feeler finger 471 which projects laterally between two vertically spaced plates 472 whose edges cooperate with ceramic pads 473 to define the path of the running thread which is at the closed inner end of an elongated slot extension 480 of a guide notch 501 (see FIG. 66). The latter is positioned angularly and radially to receive the leg 120 of the first reserve thread as the latter, while disposed in the inner end of the magazine notch 63, is advanced from the rest position (FIG. 70) in the initial part of the magazine indexing. The pads 473 are disposed above and below the plate 60 and on the bifurcated end of a lever 474 fulcrumed on a stud 475 and urged clockwise (FIG. 66) by a torsion spring 476 to the normal position shown in FIG. 67 as determined by a stop formed by a cam surface 477 acting on the other end of the lever. The cam is on a lever 478 which may be adjusted to position the pads 473 for accommodating different sizes of thread and vary the extent of bending of the thread around the edges of the plates 472 and therefore the tensioning of the thread as it passes through the detector 16.

The pads 473 bear against the running thread above and below the plates 472 and thus hold the thread against the edges of the plates 472. In its active position, the detector finger 471 extends transversely of and substantially at right angles to the path along which the first reserve thread is advanced sidewise along the slot 480 during indexing of the magazine. The spring 467ª (FIG. 68) urges the finger reversely along this path so as to bear between the plates against the thread running upwardly across the pads 473 and the edges of the plate. In this way, these four guide edges position the thread accurately and sustain the forces incident to whipping or ballooning of the thread below or above the feeler. The area of contact between the latter and the thread is thus maintained constant and the position of the feeler is determined accurately in accordance with the thread tension which is minimized by virtue of the light loading of the feeler in the modified winder. Whenever the thread breaks at any point between the bobbin and the tensioning roll 17, the feeler swings outwardly between the plates 472 and the pads 473 to the position shown in phantom in FIG. 66, this being determined by a suitable stop such as the contact forming the switch 465.

To rethread the detector with the new running thread advanced as above described into the notch 63 and along the slot 477 during the indexing of the magazine 15, an upright lug 481 on the inner end of the lever 474 is disposed in the path of lugs 482 depending from the underside of the cam disk 194 and angularly spaced according to the lengths of index motion. In the initial part of each motion, one lug 462 engages the lug 481 and carries the lever away from the stop 477 thus swinging the lever counterclockwise until the pads 473 have moved across the slot 480 to the position shown in phantom in FIG. 66. Then after the new running thread has been advanced into the notch and the slot, the actuating lug 482 passes the lug 481 thus releasing the lever 474 which is then swung reversely and in behind the new thread then under tension so as to carry the latter against the finger 471 and swing the latter to normal active position (FIGS. 66 and 67) as the lever comes against the stop 477.

*Positioning reserve thread in knotter.*—Various mechanisms, other than the one above described, may be employed to cause the fingers 312 to catch the short leg of the first reserve thread and traverse the orbital path shown by the arrows in FIGS. 51 and 52 so as to lay the thread properly around the knotter bill 196 in the latter part of the indexing motion. One alternate form of this mechanism forms the subject matter of my copending application Serial No. 32,991, filed May 31, 1960.

*Rethreading the tension reducer.*—During normal operation of the modified winder and as shown in FIG. 70, the running thread extends upwardly through the detector 16 and over the tensioning roll 17, around a grooved roller 484 (FIGS. 71 to 74) and then upwardly through the guide 142ª past the knotter. The roller is journaled on a stud 485 projecting laterally from the free end of an arm 486 which is somewhat longer than the diameter of the roll 17 and fast on a rockshaft 487 journaled on a bracket 488 on the machine frame to locate the arm alongside the roll 17 with guide roller 484 disposed in the plane of the roll.

Figure 72:
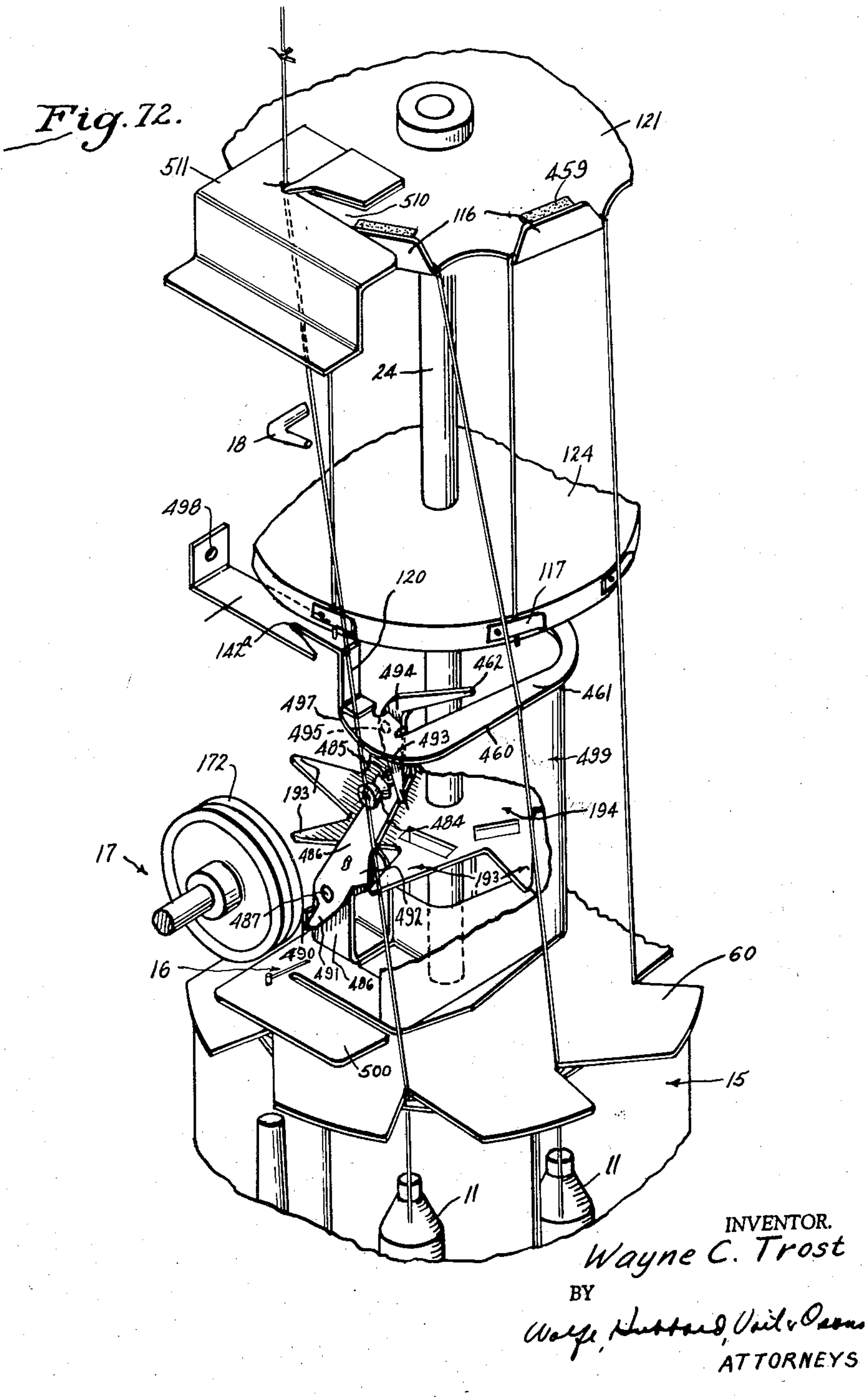
Figure 73:
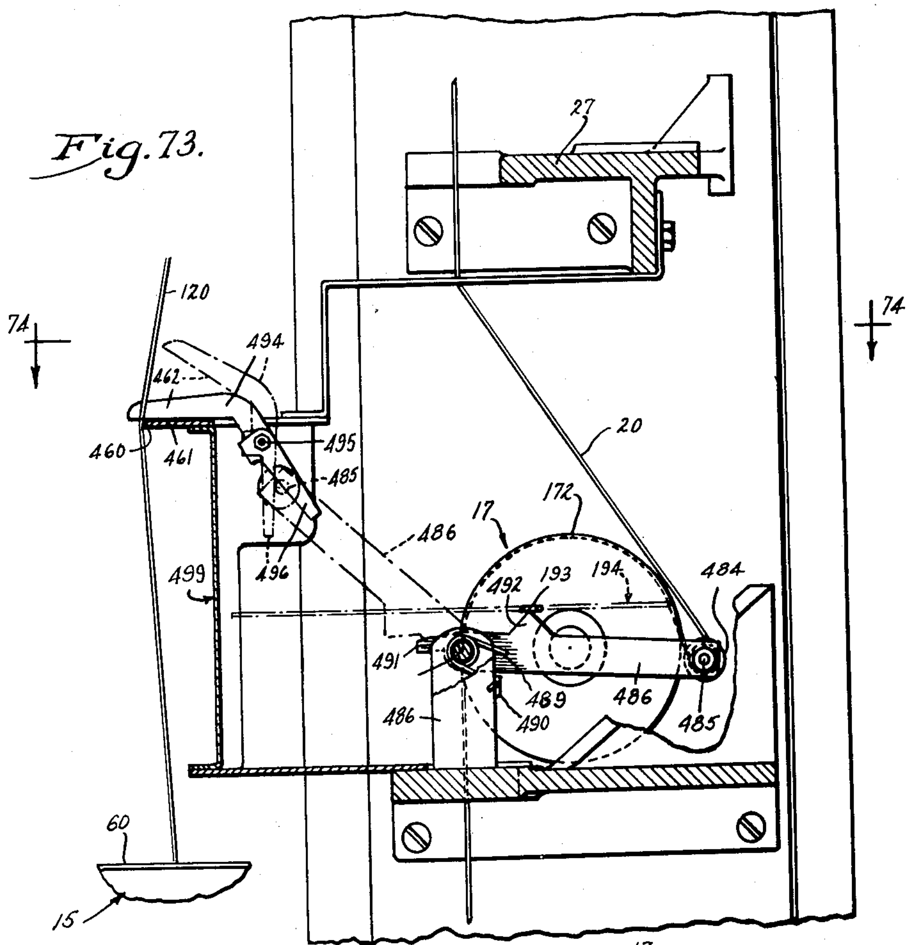
FIG. 73 is a fragmentary section taken along the line 73—73 of FIGS. 70 and 74.
Figure 74:
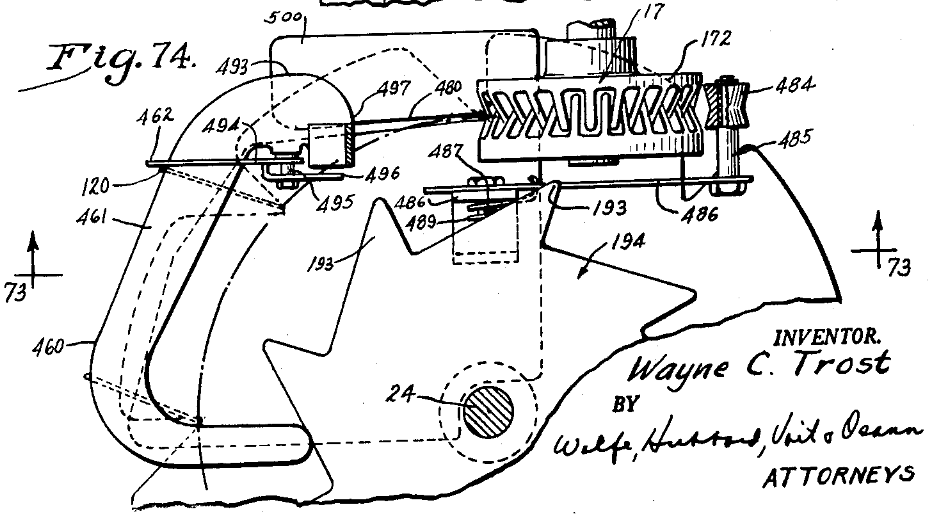
FIG. 74 is a fragmentary section taken along the line 74—74 of FIG. 4.

A torsion spring 489 wound around the rockshaft acts on the arm to swing the latter counterclockwise and toward the retracted position shown in phantom in FIG. 73. This motion is limited by a stop lug 490 on the bracket 488 engageable with an extension 491 of the arm as shown in FIG. 72. Reverse turning of the arm 486 and releasable latching thereof in the advanced or running position is effected by the cam action of the teeth 193 above described which project from the disk 194 fast on the magazine shaft 24 to turn clockwise therewith (FIG. 74) in each of the indexing movements. In the rest position of the shaft, the tip of one tooth overlies a V-shaped projection 492 on the upper edge of the arm 486 and latches the idler roller 484 down in the running position (FIGS. 70, 73 and 74) against the action of the spring 489. This position is maintained so long as the thread remains unbroken.

As the bobbin magazine jumps ahead to take up the clearance 463 (FIG. 75) as above described, the tip of the active tooth 193 on the cam disk is moved quickly and clockwise out of engagement with the projection 492 thereby releasing the arm for counterclockwise swinging by the spring 489, the extension of the arm coming to rest against the stop 490 as shown in FIG. 72. The final part of this movement is utilized to retract the thread stop 462 and allow the new running thread as it becomes tensioned to slide along the guide edge 460 and around an inwardly curving portion 493 of the guide plate 461 to a position (FIG. 72) ahead of the retracted roller 484.

To these ends, the stop 462 comprises one arm of an L-shaped lever 494 fulcrumed on a pin 495 and having an arm 496 lighter than the arm 462 which normally rests on top of the plate 461. The arm 496 is thus inclined downwardly and inwardly as shown in full in FIG. 73, and is disposed in the path of the pin 485 supporting the roller 484 and in a position to be engaged by this pin as the arm 486 approaches the retracted position (FIG. 72). The arm 496 is thus depressed to the position shown in phantom in FIG. 73, thereby swinging the stop 462 upwardly and inwardly beyond the guide edge 460. The thread leg 120 of the reserve thread is thus freed and, under its existing light tension, moves along the edge 460 and around the curve 493 and the reversely curved inner end 497 thereof thus becoming disposed in the plane of the retracted roller 484 and ahead of the latter.

Such positioning of the thread is produced by its tensioning after tying of a broken running thread to the leading end 21 of the first reserve thread following a thread break and as the thread starts to unwind from its bobbin 11 early in the indexing cycle. At this time, the position of the tensioned thread is determined as shown in FIG. 72 by the guide notch 63 on the bobbin magazine, the upper guide 38 (FIG. 65) and the edge 460 of the guide plate 461 which extends along and is disposed outwardly beyond the circular path traversed by the guide notch 63. Thus, the thread is bent outwardly as shown in FIG. 73 in passing upwardly around the edge 460 which curves inwardly beyond the second reserve bobbin, first gradually and then more abruptly at 493 and reversely to or across the plane of the roller 484 as indicated at 497 so as to guide an oncoming thread around the end of the roller to a position between the latter and the tension roll 17.

Shortly after the new running thread reaches this position and in the continuance of the magazine indexing, the leading edge of the next tooth 193 on the cam disk 194 comes into engagement with the arm 486 above the projection 492 thus initiating reverse or clockwise swinging of the arm to slowly carry the roller 484 over the top of and around the roll 17 and finally down to the running position (FIG. 73). When the indexing movement terminates, the tip 193 of the new cam tooth 52 is disposed above the projection 492 thus latching the arm 486 with the roller 484 disposed in normal winding position. These motions of the arm 486 are repeated by the different teeth 193 as they come into association with the arm in the successive indexing movements of the bobbin magazine.

The resetting of the thread tensioning device 17 is greatly simplified and the extraneous friction on the running thread is reduced substantially by maintaining the arm 486 in the advanced position during the winding operation and utilizing the initial part of the indexing motion to condition the arm for picking up the new thread before the latter reaches the pick up position. This makes possible the use of the rotating idler roller 484 to guide the thread beyond the tensioning roll 17 and also provides for more positive control of the new thread with a minimum of operating parts. The stop 462 disposed as above described in the path the leg 120 of the first reserve thread prevents the latter from creeping around the guide edge 460 during operation of the winder or moving into the loading position before the arm roller 486 has been retracted and thus prepared to pick up the thread when swung reversely later in the indexing step.

Figure 76:
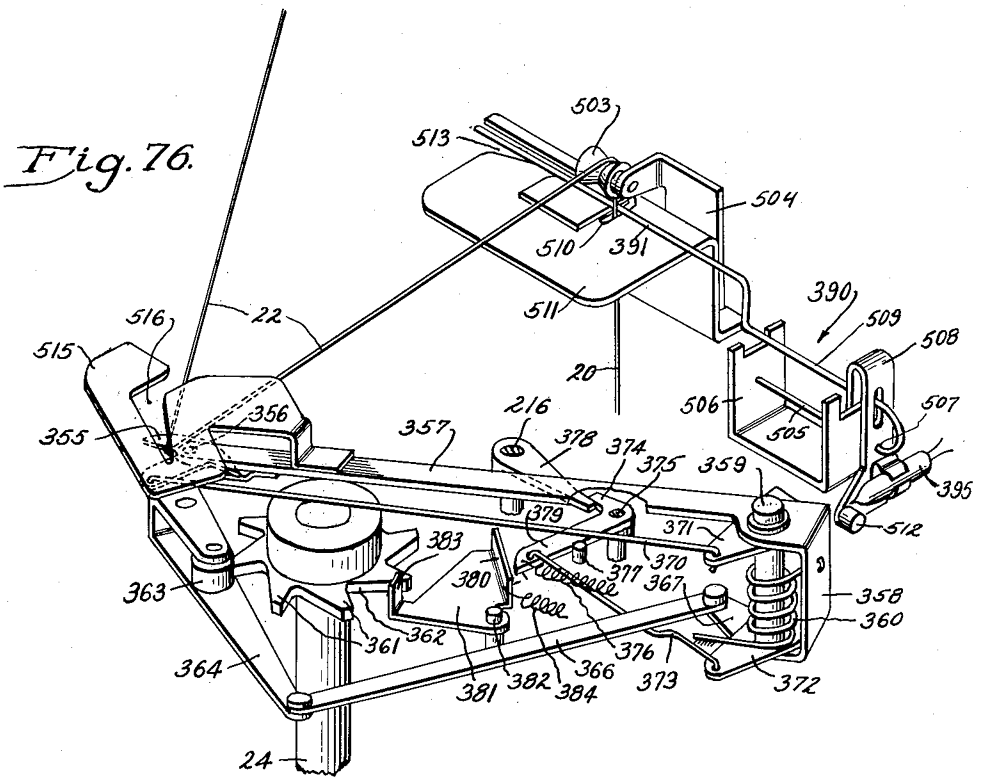
FIG. 76 is a fragmentary perspective view similar to FIG. 54 but showing a modification of the slack loop drawing mechanism.
Figure 77:
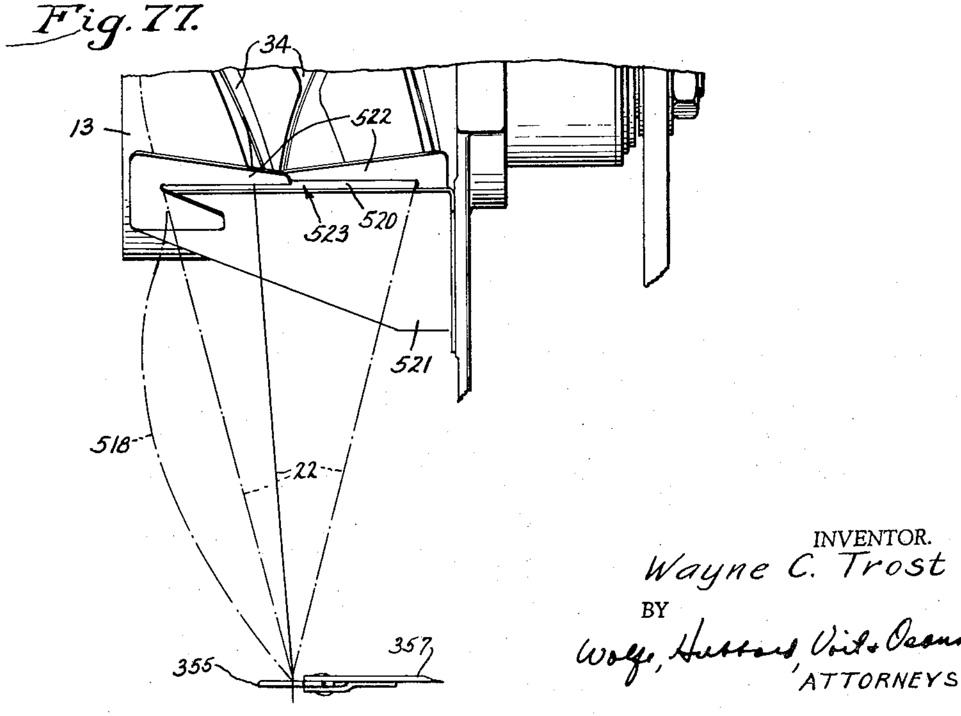
FIG. 77 is a fragmentary view taken substantially along the line 77—77 of FIG. 65.

*Simplified slack loop former.*—In the modified winder as illustrated in FIGS. 76 and 78, a single guide in the form of a grooved roller 503 is substituted for the two guides 38 and 350 above described and associated in a novel way with the bail 391 of the auxiliary thread break detector 390 in order to reduce the friction on and the tension in the running thread 21 as it traverses the loop 22.

Figure 65:
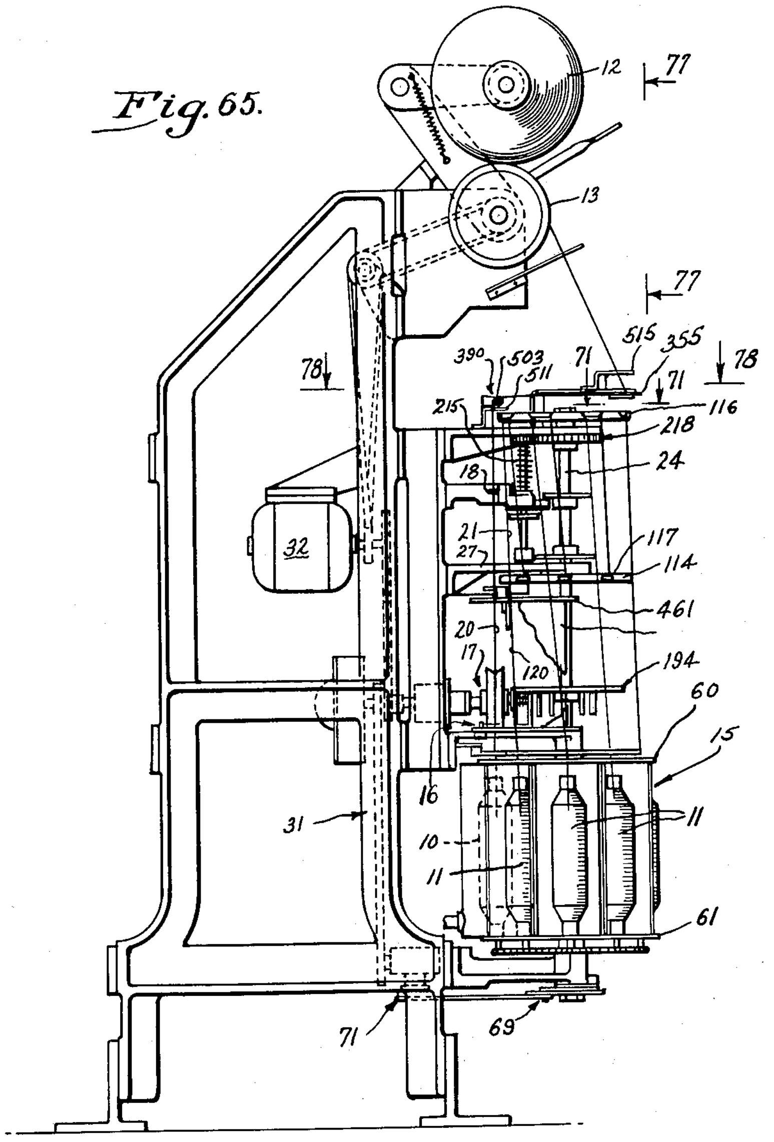
FIG. 65 is a side view similar to FIG. 1 showing a modified form of the winder.

In this instance, the roller 503 is journaled on a bracket 504 just above the bail 391 which is formed by one end of a wire bent into a U at its other end with one leg 505 fulcrumed in a bracket 506 and providing a pivot at 507 for a bar 508 carrying the mercury switch 395 at its weighted lower end 512. The upper end of the bar is pivotally connected to the leg 509 of the U. The roller 503 is disposed directly above the knotter from which the running thread extends upwardly through a slot 510 (FIGS. 72, 76 and 78) in a plate 511, then around the front of the bail 391 and finally upwardly around the rear side and forwardly over the top of the roll 503. From the latter, the thread extends forwardly and horizontally to the hook 355, around the latter and then upwardly and directly to the drum 13 as shown in FIG. 65. As a result, the V-shaped slack loop is formed by contact with only two guides, that is, the freely rotatable roll 503 and the hook 355.

Preparatory to starting the winder, the long leg 120 of the first reserve thread lies against the guide edge 460 as shown in FIGS. 72 and 78. Threading of the auxiliary break detector is accomplished by manually drawing this thread upwardly and then sidewise into the outwardly opening end 513 of the slot 510 and against the bail 391. The latter is swung rearwardly as the thread is moved in along the slot, around the overlying tip 517 of a plate fixed to the plate 511. The thread is drawn upwardly behind the roll 503 and manually tied onto the loose end of the thread on the cheese. The winder is then started in the manner previously described.

To insure that the running thread will be held properly in the groove of the roll 503 as the slack of the released loop 22 is taken up, a guide plate 515 is secured and spaced above the free end of the arm 357 of the loop former. A notch 516 is formed in this plate in a position to overlie the roll 503 in the retracted position (see FIG. 57) of the arm. The thread of the loose loop 22 is thus trapped in this notch and properly held in the plane of the roll 503 as the slack is taken up just before the arm 357 is advanced to draw a loop in the new running thread.

*Limiting thread traverse.*—While the slack in the released loop 22 is being taken up, the thread thereof is, due to its high speed of travel, subject to some back and forth whipping and may at certain positions across the winding drum bulge outwardly as indicated at 518 (FIG. 77) beyond the normal traverse range. To insure that this part of the thread will remain properly seated in the groove 34 of the cheese driving roll 13, that portion of the thread approaching the roll is trapped in a slot 520 defined by a plate 521 mounted on the machine frame and disposed immediately in front of the driving roll 13. The top edge of the slot 520 is defined by arms 522 which are offset at their inner ends as indicated at 523 to permit entry of the thread into the slot preparatory to starting up the winder. The slot 520 parallels the axis of the driving roll 13 and its length corresponds to the length of the traversing groove 34 and the length of the cheese to be formed. As a result and irrespective of the whipping of the thread as the slack in the released loop is being taken up, the thread is guided properly onto the winding drum and held in the groove thereof and therefore prevented from slipping off from the end of the cheese. Thus, the latter is formed with accurately defined ends with no danger of loose lengths of the thread being left at these ends.

This application is a continuation-in-part of my applications Serial No. 669,234, filed July 1, 1957, now abandoned, and Serial No. 32,714, filed May 31, 1960, now abandoned. The knotter per se shown in FIGS. 29–42 forms the subject matter of my application Serial No. 838,669 filed October 22, 1959.

I claim as my invention:

1. In a winding machine, the combination of, an upright rotatable shaft, a magazine on said shaft supporting a plurality of bobbins angularly spaced apart around said shaft, means for indexing said shaft step by step to carry said bobbins one by one to an active winding position, the others being reserve bobbins, a knotter disposed above said magazine in said winding position, means for drawing thread off from said active bobbin along an upright path past said knotter, means actuated by said shaft and operable in the indexing thereof to transfer the leading end portion of the thread of the first reserve bobbin to and dispose the same alongside said running thread and in operative association with the knotter while angularly spacing an adjacent portion of the thread behind said running thread, a detector engaging the running thread below the level of said leading thread portion and adapted to sense a break in or exhaustion of the running thread, and an actuator for said knotter controlled by said detector and adapted when activated to tie said running and said first reserve threads together.

2. In a winding machine, the combination of, an upright rotatable shaft, a magazine on the lower end of said shaft supporting a plurality of bobbins angularly spaced apart around the shaft, means for indexing said shaft step by step to carry said bobbins one by one to an active winding position, the others being reserve bobbins, winding mechanism for drawing the thread of the active bobbin upwardly along a predetermined path, means on said shaft supporting unwound lengths of the threads of said reserve bobbins in upright inverted J-shape with the short leg of each J spaced ahead of the long leg and the short leg of the first reserve thread disposed at said winding position alongside said path, a knotter disposed at said winding position in operative association with said running thread and said short leg of said first reserve thread and adapted, when actuated, to tie such threads together, said knotter having a rotary bill projecting across said path generally tangentially but reversely of the path of advance of said reserve threads and lying adjacent the outer side of the thread running along said upright path, and two guides respectively engageable with the long and short legs of the first and second reserve threads during indexing of said magazine, one of said guides directing the long leg of said first reserve thread inside of said bill into the heel thereof as such thread becomes the running thread, and the other guide incorporating means operable during the approach of the short leg of said second reserve thread to the tip of said bill to bend an intermediate portion of such leg outwardly and across the running thread and deposit the same on the outer side of said bill.

3. In a winding machine, the combination of, a magazine movable about an upright axis and supporting a plurality of parallel bobbins spaced around said axis, means for indexing said magazine step by step to carry said bobbins one by one to an active winding position, the others being reserve bobbins, winding mechanism for drawing the thread of the bobbin in said active position upwardly along a predetermined path, means supporting the unwound length of the thread of at least the first of said reserve bobbins in upright inverted J-shape with the short leg of the J spaced ahead of the long leg and lying alongside the thread running along said path, a knotter disposed in operative association with said running thread and the short leg of the thread of the first reserve bobbin and adapted when actuated to tie such threads together, and guides operable during each advance of said magazine to direct the long and short legs of the first and second reserve threads into said operative association with said knotter.

4. A winder as defined by claim 3 in which said thread supporting means includes means for holding said long and short thread legs of each reserve thread spaced different radial distances from said axis whereby the two legs advance to the knotter along different arcuate paths.

5. A winder as defined by claim 3 in which the short leg of each reserve thread is angularly spaced from the bobbin of such thread a distance at least equal to one of said index steps.

6. A winder as defined by claim 5 in which the long leg of one reserve thread lies alongside but ahead of the short leg of the succeeding reserve thread.

7. A winder as defined in claim 4 in which the short leg of the J of each reserve thread is disposed at a lesser radius than the long leg of such thread.

8. For winding thread from a succession of bobbins to form a cheese, the combination of, a rotary drum for turning the cheese and drawing a running thread along a predetermined upright path off from a bobbin in an active position in said path, a magazine for supporting said active bobbin and a plurality of reserve bobbins in spaced relation, means for indexing said magazine step by step to carry the active bobbin out of said position and the first reserve bobbin into such position, a knotter including a rotary shaft projecting transversely of said path and a laterally projecting bill coacting with the shaft to enclose said running thread, and means actuated in the indexing movement of said magazine and supporting the thread of the first of said reserve bobbins in the form of an inverted J with at least part of the short leg of the J of said first reserve thread lying alongside said path and outside of said bill but crossing said running thread above and below the bill, the long leg of the J of said first reserve thread being angularly spaced from said path.

9. In a winding machine, the combination of, an upright rotatable shaft, a magazine on said shaft supporting a plurality of bobbins angularly spaced apart around said shaft, means for indexing said shaft step by step to carry said bobbins one by one to an active winding position, the others being reserve bobbins and successively spaced angularly behind such position, a knotter disposed above said magazine at said winding position, a thread break detector disposed adjacent said winding position between said magazine and said knotter, means including a winding drum for drawing thread from said active bobbin along an upright normal path past said detector and knotter, a stationary guide disposed above said knotter and engaging the thread running along said path, a guide below the level of said knotter movable with said magazine and cooperating with said stationary guide to define a second path spaced from said knotter and detector and along which thread may be drawn by said drum off from the first reserve bobbin, and mechanism actuated by said shaft during the indexing of said first reserve bobbin and its thread to said active position to present such thread into operative association with said detector and knotter.

10. In a winding machine, the combination of, an upright rotatable shaft, a magazine on said shaft supporting a plurality of bobbins angularly spaced apart around said shaft, means for indexing said shaft step by step to carry said bobbins one by one to an active winding position, the others being reserve bobbins successively spaced behind such position, a knotter disposed above said magazine at said winding position, a thread break detector disposed adjacent said winding position, means including a winding drum for drawing thread from said active bobbin along an upright normal path past said detector and knotter, stationary guide means disposed above said knotter and engaging the thread running along said path, a guide movable with said magazine and cooperating with said stationary guide means to define a second path spaced from said knotter and detector and along which thread may be drawn by said drum off from the first reserve bobbin, and mechanism actuated by said shaft during the indexing of said first reserve bobbin and its thread to said active position to present such thread into operative association with said detector and knotter and also draw a loop in the thread running between said guide means and said drum.

11. In a winding machine, the combination of, an upright rotatable shaft, a magazine on said shaft supporting a plurality of bobbins angularly spaced apart around said shaft, means for indexing said shaft step by step to carry said bobbins one by one to an active winding position, the others being reserve bobbins successively spaced behind such position, a knotter disposed above said magazine at said winding position, a thread break detector disposed adjacent said winding position and spaced below said knotter, means including a winding drum for drawing thread from said active bobbin along an upright normal path past said detector and knotter, a stationary guide disposed above said knotter and engaging the thread running along said path, a guide below said knotter movable with said magazine and cooperating with said stationary guide to define a second path for the drawing of thread by said drum off from the first reserve bobbin, mechanism actuated by said shaft during the indexing of said first reserve bobbin and its thread to said active position to present such thread into operative association with said detector and knotter, a power actuator for driving said drum and indexing said shaft, and an auxiliary detector engageable with the thread running along each of said paths between said stationary guide and said drum for interrupting the operation of said actuator in response to the sensing of breakage or exhaustion of such running thread.

12. In a winding machine, the combination of, an upright rotatable shaft, a magazine on said shaft supporting a plurality of bobbins angularly spaced apart around said shaft, means for indexing said shaft step by step to carry said bobbins one by one to an active winding position, the others being reserve bobbins, upper and lower wheels fixed to said shaft and spaced along the latter above said magazine, a knotter disposed in said winding position at a level intermediate said disks, a plurality of pairs of angularly spaced shoulders upstanding from the outer periphery of said upper wheel and angularly spaced apart to correspond to the spacing of said bobbins, a corresponding number of clamps spaced around the outer periphery of said lower wheel and disposed below the leading shoulders of said pairs, the unwound portion of each reserve thread extending upwardly from its bobbin and around the associated pair of shoulders and then downwardly from the leading shoulder to the associated one of said clamps.

13. A winder as defined in claim 12 in which the leading shoulder of each of said pairs and the associated clamp are angularly disposed relative to said shaft to present the leading end of the first reserve thread to said knotter when the shaft is at rest.

14. In a winding machine, the combination of, a magazine supporting a plurality of bobbins in spaced relation, means for indexing said magazine step by step to carry said bobbins one by one to an active winding position, the others being reserve bobbins successively spaced behind such position, a knotter, a thread break detector, means including a winding drum for drawing thread from said active bobbin along a normal path past said detector and knotter, a first guide disposed adjacent said drum and engaging the thread running along said path, a second guide movable with said magazine and cooperating with said first guide to define a second path for the drawing of thread by said drum off from the first reserve bobbin, means operable during indexing of said magazine to carry such thread to said active position and bring the thread into operative association with said detector and knotter, a power actuator for driving said winding drum, means for measuring a time interval for said actuator upon starting to attain a desired speed in the drawing of thread along said second path off from said first reserve bobbin, and control means operable automatically after the lapse of said interval to initiate indexing of said magazine.

15. For winding thread from a succession of bobbins to form a cheese, the combination of, an upright shaft, a magazine carried by said shaft and supporting an annular series of bobbins, means for indexing said shaft step by step to move the bobbins successively to an active position for unwinding of the thread thereof along an upright path spaced from said shaft, a rotary knotter engageable with said running thread for tying the same to an adjacent thread, a torsion spring coupled at one end to said knotter and normally biasing the same in a direction to tie a knot, means coupling the opposite end of said spring to said shaft for winding the spring during one of said indexing steps, a latch holding said knotter in a predetermined angular position but releasable to permit operation of the knotter under the force of said spring, said latch being biased toward released position, a detent engageable with said latch and normally latching the latter in set position, a thread break detector having a member engageable with said running thread and movable upon breakage of the thread, means operable in response to movement of said detector member to release said detent and thereby release said latch, and means actuated by the indexing motion of said shaft to reset said detent and return said latch to active position before substantial rewinding of said spring.

16. In a winder, the combination of, a magazine mounted to turn about an upright axis and having outwardly opening pockets for receiving and supporting supply bobbins in upright positions, said magazine having a top wall with outwardly opening guide notches matching said pockets, a cleaning blade for each pocket facing outwardly and disposed above the notch thereof for engagement with a thread drawn upwardly from the bobbin and through the notch, means for indexing said magazine step by step to present the bobbins successively to a position for unwinding the thread thereof, and means operable during the approach of a bobbin to said unwinding position to move the thread thereof into cleaning engagement with the associated blade and maintain such engagement during unwinding of the bobbin.

17. A winder as defined in claim 16 in which each of said cleaning blades comprises an arcuate series of outwardly projecting teeth rigid with said magazine and said last mentioned means comprises an arcuate shoe disposed adjacent and opposite the toothed blade in said unwinding position.

18. In a winder, the combination of, a magazine mounted to turn about an upright axis and having outwardly opening pockets for receiving and supporting supply bobbins in upright positions, a thread cleaner for each of said pockets comprising a blade facing outwardly and a coacting guide finger, said blade and finger being mounted for movement into and out of operative association, and means operating automatically during turning of said magazine to shift said finger and blade toward and away from each other.

19. For winding thread from a succession of bobbins to form a cheese, the combination of, an upright rotatable shaft, a magazine rotatable with said shaft and supporting a plurality of bobbins angularly spaced around said shaft, one of said bobbins being disposed in an active position and the others being reserve bobbins, means for indexing said shaft step by step to present the first reserve bobbin and the thread thereof in said active position, means for drawing a running thread along a predetermined upright path off from said active bobbin, a thread break detector having relatively movable fingers swingable toward each other to press said running thread between them and movable relative to and past each other to sense interruption of the thread, mechanism controlled by said detector and operable in response to breakage of said thread to initiate operation of said indexing means, and means operable during such indexing to separate said fingers and open the detector for receiving the next reserve thread and then close the fingers on such thread.

20. For winding thread off from a succession of bobbins to form a cheese, the combination of, a magazine mounted to move about a fixed axis and supporting a plurality of bobbins in angularly spaced relation around said axis, means on said magazine supporting unwound lengths of the threads of said bobbins with such lengths extending along said axis, means for indexing said magazine step by step to carry said bobbins and their unwound threads sidewise along a predetermined path and present the bobbins successively to an active winding position, the threads of the other bobbins being reserve threads, means for drawing the thread off from the bobbin in said active position along a predetermined line extending longitudinally of said axis, a feeler extending transversely of and disposed in said path of the first of said reserve threads and engaged thereby as the thread is indexed to said active position, fingers engageable with said active thread at spaced points on the side thereof opposite said feeler, means mounting said fingers for relative swinging transversely of the engaged thread, means normally urging said feeler and said fingers toward each other and against the thread and for movement past each other upon breaking of the thread, means responsive to movement of said feeler and fingers past each other to initiate operation of said indexing means, and mechanism operating during indexing of said magazine to swing said fingers out of said path and then, after the advancing thread passes, to swing the fingers reversely against the thread and hold the latter against said feeler.

21. A winder as defined in claim 20 in which said feeler is disposed between two stationary members having edges engageable with the running thread on the same side as said feeler and at points spaced along the thread from the points of engagement of the thread by said fingers.

22. A winder as defined in claim 20 in which said feeler extends generally radially across said thread path and is urged yieldably in a direction opposite to the advance of the thread along said path.

23. A winder as defined in claim 22 in which said feeler after moving past said fingers in response to breaking of the thread remains disposed in said path and is moved reversely by the next reserve thread in the advance thereof by said fingers during the next indexing step.

24. In a winding machine, the combination of, a magazine supporting a plurality of bobbins in angularly spaced relation, means for indeving said magazine step by step to carry said bobbins one by one to an active winding position, the others being reserve bobbins successively spaced behind such position, a knotter, a thread break detector, means including a winding drum for drawing thread from the bobbin in said active position along a normal path past said detector and knotter, a stationary guide engaging said running thread at a point along said path between said knotter and said drum, a device engageable with the running thread between said detector and knotter for reducing the tension in said thread passing said knotter as compared to that passing said detector, mechanism actuated during indexing of said magazine to carry said first reserve bobbin and its thread to said active position to present such thread to said detector, said device and said knotter, and activate the device and detector, means actuated during such indexing but subsequent to activation of said reducing device to draw a slack loop in said running thread between said guide and said drum.

25. In a winding machine, the combination of, an upright rotatable shaft, a magazine on the lower end of said shaft supporting a plurality of bobbins angularly spaced apart around the shaft, means for indexing said shaft step by step to carry said bobbins one by one to an active winding position, the others being reserve bobbins, means on said shaft supporting unwound lengths of the threads of said reserve bobbins in upright positions angularly spaced apart around said shaft and above said magazine, the first reserve thread being disposed in said active position, winding mechanism for drawing the thread of the active bobbin upwardly along a predetermined path, a knotter disposed at said winding position in operative association with said running thread and said first reserve thread and adapted, when actuated, to tie such threads together, said knotter having a rotary bill projecting across said path and generally tangentially but reversely of the path of advance of said reserve threads, and means actuated by the indexing motion of said shaft and operable in the approach of each of said reserve threads to said knotter to engage the thread at points above and below said bill and bend the intervening length of thread outwardly past the tip of the bill and deposit the thread on the outer side of the bill as said indexing motion is concluded.

26. For winding thread off from a succession of bobbins to form a cheese, the combination of, a magazine mounted to turn about a fixed axis and supporting a plurality of parallel bobbins in angularly spaced relation about said axis, means on said magazine supporting unwound lengths of the threads of said bobbins with such lengths extending along said axis, means for indexing said magazine step by step to present the bobbins and their unwound threads successively to an active winding position, the threads of the other bobbins being reserve threads with the first reserve thread disposed at said active position, winding mechanism for drawing thread off from the bobbin at said active position along a predetermined path extending longitudinally of said axis and alongside said first reserve thread, a knotter disposed at said winding position outside of said path and adapted when actuated to tie the running and first reserve threads together, said knotter having a rotary bill disposed outside of the running thread and projecting across said path generally tangentially but reversely of the path of advance of said reserve threads to said active position, a pair of fingers operable in the approach of each reserve thread to said knotter to intercept such thread at points above and below said bill, and means actuated by the indexing of said magazine to move said fingers in an orbit surrounding the tip of said knotter bill and thereby bend the intervening length of thread outwardly around said tip and deposit the thread on the outer side of the bill.

27. In a winding machine, the combination of, an upright rotatable shaft, a magazine on the lower end of said shaft supporting a plurality of bobbins angularly spaced apart around the shaft, means for indexing said shaft step by step to carry said bobbins one by one to an active winding position, the others being reserve bobbins, means on said shaft supporting unwound lengths of the threads of said reserve bobbins in upright positions angularly spaced apart around said shaft and above said magazine, winding mechanism for drawing the thread of the active bobbin upwardly along a predetermined path alongside the first reserve thread, a knotter adapted when actuated to tie said running thread and said first reserve thread together, the unwound end of the second reserve thread being advanced to said knotter in the indexing step of said shaft following tying of the knot, a member yieldably engageable with the reserve thread in said winding position, and means operated by said shaft near the end of the indexing motion to move said member against said first reserve thread until the latter becomes taut.

28. For winding thread from a succession of bobbins to form a cheese, the combination of, an upright rotary shaft, a magazine carried by said shaft and supporting an annular series of bobbins, means for indexing said shaft step by step to move the bobbins successively from a first reserve position to an active position for unwinding of the thread thereof along an upright path spaced from said shaft, a knotter spaced above the bobbins in said active position and operatively associated with said running thread, means supporting the unwound threads of each reserve bobbin with a portion of the thread of the first reserve bobbin disposed at said active position in operative association with the knotter, said last mentioned means including a releasable clamp disposed adjacent said knotter and normally gripping said reserve thread, means operable as an incident to actuation of said knotter to sever said reserve thread at a point spaced from said clamp, a suction tube having a mouth positioned to receive the cut-off end of said reserve thread and hold the same during the initial part of the succeeding one of said indexing steps, and means operable during the indexing to release said clamp and free said cut-off thread.

29. In a winder of the character described, the combination of, a rotary shaft, a normally stressed spring coupled to said shaft for turning the same, a latch normally holding said shaft in a predetermined angular position but releasable to permit the shaft to turn under the force of said spring, a knotter coupled to said shaft and having a laterally projecting bill for tying a knot during turning of said shaft from said position, a stop operable after tying of said knot to arrest the movement of said shaft substantially in said predetermined position, and means operable to initiate resetting of said latch and restressing of said spring while said shaft is positioned by said stop.

30. In a winder of the character described, the combination of, a rotary shaft, a normally stressed torsion spring coupled to said shaft for turning the same, means for stressing said spring, a latch normally holding said shaft in a predetermined angular position but releasable to permit the shaft to turn first in one direction until the force of said spring has been dissipated and the spring partially rewound reversely, said shaft then turning in the opposite direction, and means to intercept the shaft during such reverse turning and stop the shaft substantially in said predetermined position.

31. For winding thread from a succession of bobbins to form a cheese, the combination of, a shaft, a magazine carried by said shaft and supporting an annular series of bobbins, means for indexing said shaft step by step to move the bobbins successively to an active position, means for unwinding the thread of the bobbin in said active position upwardly along a path spaced from said shaft, means supporting the thread of the adjacent reserve bobbin alongside said running thread, a rotary knotter having a laterally projecting bill engageable with said running thread for tying the same to said adjacent thread, a torsion spring coupled at one end to said knotter for turning the same to tie a knot, a latch normally holding said knotter with said bill disposed in a predetermined angular position but releasable to permit operation of the knotter under the force of said spring, means coupling the opposite end of said spring to said shaft for rewinding the spring during one of said indexing steps, and means actuated by the indexing motion to return said latch to active position before substantial rewinding of said spring.

32. For winding thread from a succession of bobbins to form a cheese, the combination of, a rotary drum for turning the cheese and drawing a thread along a predetermined path off from a bobbin in an active position, a guide engaging the running thread at a point along said path spaced from said drum, an arm mounted to swing back and forth between said drum and said guide transversely of and through said path between advanced and retracted positions, a hook carried on said arm and movable relative thereto between thread holding and releasing positions, means including a latch for holding said hook releasably in said holding position when said arm is in said advanced position, a detector for sensing a break in said running thread, means controlled by said detector for releasing said latch and said thread in response to breakage of the running thread and forming a new running thread along said path, and mechanism operable as an incident to formation of such new thread to swing said arm to said retracted position, return said hook to said holding position, and finally return the arm to said advanced position and thereby draw a new loop in the thread between said guide and said drum.

33. In a winding machine, the combination of, a rotatable shift, a magazine on said shaft supporting a plurality of bobbins angularly spaced apart around the shaft, means for indexing said shaft step by step to carry said bobbins one by one to an active winding position, mechanism for drawing the thread off from the active bobbin along a predetermined path including a rotary winding drum, a guide engaging the running thread and at a point along said path from said drum, an arm mounted between said drum and said guide to swing back and forth transversely of said path through an advanced position spaced from and on one side of said path and a retracted position adjacent but on the opposite side of the path, a book carried by said arm and movable relative thereto between thread holding and releasing positions, said hook normally coacting with said guide to maintain a loop in said running thread between the guide and said drum, means including a latch for holding said hook releasably in said holding position and maintaining said loop when said arm is in said advanced position, a detector for sensing a break in said running thread, means controlled by said detector for releasing said latch and said thread in response to breakage of the running thread and to tie the thread of another of said bobbins to the trailing end of the broken thread, and mechanism operable during indexing of said shaft to reset said hook, move said arm to said retracted position, and then swing the arm reversely to said advanced position to draw a loop in the new running thread.

34. In a winding machine, the combination of, means supporting a plurality of bobbins, mechanism including a rotary drum for drawing thread from one of said bobbins along a predetermined path and winding the same onto a cheese, a guide engaging said thread at a point spaced from said drum, means operable in response to breakage of said thread to tie the thread of another of said bobbins to the trailing end of the broken thread and continue the winding without interruption, an arm swingable back and forth between said guide and said drum from an advanced position to a retracted position, a hook on the free end of said arm releasably holding said thread to maintain a loop therein while the arm is in said advanced position, means responsive to breakage of said thread to release said hook and thread, and means subsequently acting to actuate said hook and said arm to draw a new loop in the new running thread.

35. In a winder, the combination of, a rotary cheese, a supply bobbin, a reserve bobbin, winding mechanism for drawing a thread off from said supply bobbin and along a predetermined path and winding the thread onto said cheese, said path extending through a break detector and a tension reducer, thread uniting mechanism controlled by said detector and operable in response to breakage or exhaustion of the running thread in the region of said supply bobbin to unite the trailing end of the broken thread with the leading end of the thread on said reserve bobbin during continued winding of said running thread onto said cheese, secondary weans for detecting breakage of the running thread in a portion of said path between said knotter and said cheese, and mechanism controlled by said secondary means and operable upon detection of a thread break to force breaking of the thread at a point in advance of said tension reducer.

36. A winder as defined by claim 35 in which said last mechanism comprises a cutter associated with said running thread adjacent said detector and having a power actuator activated by said secondary detecting means.

37. In a winder of the character described, the combination of, means for unwinding thread from a bobbin, drawing the same along a predetermined path, and winding the thread onto a cheese including a roll engaging a length of the running thread, an arm disposed adjacent but offset from the plane of said roll, a roller journaled on and projecting laterally from said arm, means supporting said arm to swing said roller in said plane and through an arc extending around the periphery of said roll from a retracted position beyond one side of said periphery to an active position adjacent to and beyond the opposite side, means for supporting a length of a running thread and, following breakage of said first thread, advancing the second thread sidewise into said path and to a loading position between said roll and said roller in said retracted position, means operable in timed relation to the advance of said second thread to move said arm to said retracted position in advance of the arrival of said thread at said loading position and after such arrival to move the arm reversely and carry said roller and thread around the periphery of said roll to said active position.

38. A winder as defined in claim 37 including spring means normally urging said arm toward said retracted position, and a latch normally holding said arm in said active position and releasable automatically as an incident to advance of said second thread to permit the arm to move to said retracted position before arrival of the thread in said loading position.

39. Mechanism as defined by claim 38 including means operable in the initial movement of said thread advancing means to release said latch.

40. Mechanism for controlling the tension in a running thread comprising a rotary roll having an arcuate peripheral surface engaging said thread, a rotary idler roller disposed in the plane of said roll, a member supporting said roller to move in said plane along a path extending around said roll between running and retracted positions on opposite sides of the axis of said roll, means for moving a length of a second thread sidewise into said path when said roll is disposed in said retracted position, and means operable after the arrival of said second thread between said roll and the retracted roller to move said member from the retracted position to said running position.

41. In a winding machine, the combination of, a magazine supporting a plurality of bobbins around an axis with unwound lengths of the threads of the bobbins extending along and spaced around said axis, means for indexing said magazine step by step to present the successive bobbins to a winding position, the threads of the other bobbins being reserve threads, a retractable stop urged toward and normally disposed in an active position in the path of the sidewise advance of the first reserve thread and engaging the latter in the rest position of said magazine, means for drawing thread off from the bobbin in said winding position, a rotary roll for contacting the running thread to control the tension therein, a member movable back and forth around said roll between retracted and running positions and operable in moving away from said retracted position to pick up the first reserve thread and lay the same around said roll, a guide engaging the leading thread in its advance beyond said stop and directing the thread sidewise into a loading position in the plane of said roll and ahead of said member in said retracted position, means for holding said member in said running position during the continued running of the thread around said roll, and means operable as an incident to movement of said member to said retracted position to retract said stop and release the leading reserve thread for movement along said guide during indexing of said magazine.

42. For winding thread off from a succession of bobbins to form a cheese, the combination of, a magazine supporting a plurality of bobbins in angularly spaced relation about said axis, means for indexing said magazine step by step to successive rest positions and thereby present the bobbins successively to an active position, means for drawing thread off from said active bobbin and winding the same onto a cheese, mechanism operable in response to breakage of the running thread to tie the thread of the next bobbin to the trailing end of the broken thread and initiate operation of said indexing means, said mechanism including a torsion spring, a knotter coupled to one end of said spring, means normally holding said knotter against actuation by said spring and releasing the knotter in response to breakage of said running thread, means coupling the other end of said spring to said magazine to effect rewinding of the spring during one of said indexing steps, the inertia of said knotter acting after unwinding of said spring to effect some reverse winding of the spring and the application of a torque to said magazine in a direction to advance the same rapidly from its rest position.

43. For winding thread off from a succession of bobbins to form a cheese, the combination of, a magazine supporting a plurality of bobbins in angularly spaced relation about said axis, means for indexing said magazine step by step to successive rest positions and thereby to present the bobbins successively to an active position, means for drawing thread off from said active bobbin and winding the same onto a cheese, mechanism operable in response to breakage of the running thread to tie the thread of the next bobbin to the trailing end of the broken thread and initiate operation of said indexing means, said mechanism including a spring normally stressed in one direction and releasable to impart its energy to said knotter to actuate the same, said spring being stressed reversely in stopping said knotter after dissipation of said energy, and means for converting the reverse stress of said spring into a torque applied to said magazine to advance the same rapidly through part of one of said steps.

44. For winding thread off from a succession of bobbins to form a cheese, the combination of, a magazine mounted to move about a fixed axis and supporting a plurality of bobbins in spaced relation around said axis, means on said magazine supporting unwound lengths of the threads of said bobbins with such lengths extending along the axes of the respective bobbins, means for indexing said magazine step by step to carry said bobbins and their unwound threads sidewise along a predetermined path and present the bobbins successively to an active winding position, the threads of the other bobbins being reserve threads, means for drawing thread off from said active bobbin along a predetermined line extending longitudinally of said axis through a thread break detector, a rotary tension reducer, a knotter, and means rendered operative automatically in said indexing motions to engage the unwound portion of the first reserve thread adjacent said magazine and apply a friction drag thereto to resist unwinding of the thread from its bobbin during dwelling thereof in the first reserve position.

45. For winding thread off from a succession of bobbins to form a cheese, the combination of, a magazine mounted to move about a fixed axis and supporting a plurality of parallel bobbins in spaced relation about said axis, means on said magazine supporting unwound lengths of the threads of said bobbins with such lengths extending along said axis, means for indexing said magazine step by step to carry said bobbins and their unwound threads sidewise along a predetermined path and present the bobbins successively to an active winding position, the threads of the other bobbins being reserve threads, a tension reducing roll rotatable about a horizontal axis and spaced beyond the end of the bobbin in said winding position and substantially tangent to the axis of such bobbin, a thread break detector between the active bobbin and said roll, a thread guide disposed on the opposite side of said roll, a second guide spaced beyond said first guide, means including a winding drum spaced beyond said second guide for drawing thread off from the active bobbin through said detector to said roll, over the top of the latter and around said second guide to said winding drum, and means for maintaining the thread between said second guide and said drum in a V-shape releasable loop.

46. For winding thread off from a succession of bobbins to form a cheese, the combination of, a magazine mounted to turn about a fixed axis and supporting a plurality of parallel bobbins in auguarly spaced relation about said axis, means for indexing said magazine step by step to carry said bobbins sidewise along tn arcuate path and present the bobbins successively to an active winding position, the other bobbins being reserve bobbins, means for drawing thread off from said active bobbin along a predetermined line extending longitudinally of said axis, a knotter having a bill disposed when in a normal rest position adjacent and extending across said running thread with its tip pointing generally tangentially of said arcuate path but in a direction opposite to the indexing of said magazine, means supporting unwound portions of the threads of said reserve bobbins extended from the bobbins along said axis and angularly spaced around said path according to the lengths of said indexing steps and from said axis a distance approximately equal to the radial position of said knotter bill, means engageable with the first reserve thread during indexing of said magazine and acting automatically to move such thread beyond the tip of said knotter bill and into operative association therewith and dispose the thread on the side of the bill opposite said running thread, and mechanism operable automatically as in incident to breaking of said running thread to actuate said knotter and tie the running and first reserve threads together without further positioning of such threads.

47. A winder as defined in claim 46 including means operating in the final part of each indexing motion of said magazine to guide the unwound portion of said reserve thread to the side of said knotter bill opposite said running thread.

48. A winder as defined in claim 47 in which said reserve thread in the final rest position of said magazine crosses said running thread at points spaced along said magazine axis and disposed on opposite sides of said knotter bill.

49. In a winding machine, the combination of, an upright rotatable shaft, a magazine on said shaft supporting a plurality of bobbins angularly spaced apart around said shaft, means for indexing said shaft step by step to carry said bobbins one by one to an active winding position, the others being reserve bobbins, a knotter disposed above said magazine in said winding position, means for drawing thread off from said active bobbin along an upright path past said knotter, means actuated by said shaft and operable in the indexing thereof to transfer the leading end portion of the thread of the first reserve bobbin to and dispose the same alongside said running thread and in operative association with the knotter while angularly spacing an adjacent portion of the thread behind said running thread, a detector engaging the running thread below the level of said leading thread portion and adapted to sense a break in or exhaustion of the running thread, and an actuator for said knotter controlled by said detector and adapted when activated to tie said running and said first reserve threads together, said knotter including a rotary bill projecting, when disposed in a normal rest position, in a direction opposite to the indexing motion of said shaft and the unwound thread of said first reserve bobbin comprising an inverted loop extending first upwardly from the first reserve bobbin beyond said knotter and then downwardly alongside said running thread and past said knotter bill for immediate engagement by the latter upon turning away from said normal rest position.

50. A winder as defined in claim 49 in which the downwardly extending portion of said first reserve thread lies in contact with said knotter bill on the side opposite said running thread and extends across the latter at points above and below the said bill.

51. A winder as defined in claim 50 in which said downwardly extending portion of said first reserve thread is disposed close to but spaced from said running thread in a direction opposite to the indexing movement of said magazine shaft.

No references cited